US011874986B2

United States Patent
Kwak et al.

(10) Patent No.: US 11,874,986 B2
(45) Date of Patent: Jan. 16, 2024

(54) ELECTRONIC DEVICE INCLUDING TOUCH CIRCUIT AND OPERATING METHOD THEREFOR

(71) Applicant: Samsung Electronics Co., Ltd., Gyeonggi-do (KR)

(72) Inventors: Sanghun Kwak, Gyeonggi-do (KR); Daehyun Yoo, Gyeonggi-do (KR); Changjin Kim, Gyeonggi-do (KR); Sangheon Park, Gyeonggi-do (KR); Mansung Kim, Gyeonggi-do (KR); Aram Song, Gyeonggi-do (KR); Ilyong Yu, Gyeonggi-do (KR); Kyoungtaek Lee, Gyeonggi-do (KR); Wonil Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 110 days.

(21) Appl. No.: 17/406,608

(22) Filed: Aug. 19, 2021

(65) Prior Publication Data

US 2021/0389839 A1 Dec. 16, 2021

Related U.S. Application Data

(63) Continuation of application No. PCT/KR2020/002242, filed on Feb. 17, 2020.

(30) Foreign Application Priority Data

Feb. 19, 2019 (KR) .................. 10-2019-0019422
Dec. 26, 2019 (KR) .................. 10-2019-0175377

(51) Int. Cl.
*G06F 3/01* (2006.01)
*G06F 3/041* (2006.01)
*G09G 3/00* (2006.01)

(52) U.S. Cl.
CPC ............ *G06F 3/0416* (2013.01); *G06F 3/017* (2013.01); *G09G 3/00* (2013.01); *G09G 2330/027* (2013.01)

(58) Field of Classification Search
CPC ........ G06F 3/011; G06F 3/017; G06F 3/0416; G06F 3/041662; G06F 3/0488;
(Continued)

(56) References Cited

U.S. PATENT DOCUMENTS

| | | | |
|---|---|---|---|
| 6,301,098 B1 | 10/2001 | Kim | |
| 2013/0023248 A1* | 1/2013 | Lee | ............. H04W 4/60 455/414.1 |
| 2013/0183946 A1* | 7/2013 | Jeong | ............. H04M 1/271 455/414.1 |
| 2014/0099992 A1* | 4/2014 | Burns | ............. G06F 3/04883 455/550.1 |

(Continued)

FOREIGN PATENT DOCUMENTS

| KR | 10-1999-00308070 | 5/1999 |
|---|---|---|
| KR | 10-2010-0059585 | 6/2010 |

(Continued)

OTHER PUBLICATIONS

PCT/ISA/210 Search Report issued on PCT/KR2020/002242 pp. 4.
PCT/ISA/237 Written Opinion issued on PCT/KR2020/002242 pp. 6.

*Primary Examiner* — Ryan A Lubit
(74) *Attorney, Agent, or Firm* — The Farrell Law Firm, P.C.

(57) ABSTRACT

Electronic devices including touch circuits and method of operating the electronic devices are provided. An electronic device includes a display; a touch circuit configured to detect a touch put on the display; a processor; and a memory. The touch circuit is further configured to acquire touch sensing information representing the sensitivity levels of (Continued)

inputs to respective multiple nodes of the touch circuit, identify information associated with a user's ear touching the electronic device, on the basis of the touch sensing information; and transfer, to the processor, the information associated with the ear touching. The memory stores instructions, which when executed, cause the processor to control the display to an on-state and to control the display to switch the display from the on-state to an off-state based on the information associated with the ear touching, which is obtained from the touch circuit.

17 Claims, 47 Drawing Sheets

(58) Field of Classification Search
CPC .. G06F 3/14; G06F 1/1684; G06F 2203/0381; G09G 3/00; G09G 3/2092; G09G 5/003; G09G 2330/027; G09G 2354/00; H04M 2250/22; H04M 1/72454
See application file for complete search history.

(56) References Cited

U.S. PATENT DOCUMENTS

| | | | |
|---|---|---|---|
| 2015/0161459 A1 | 6/2015 | Boczek | |
| 2016/0191097 A1* | 6/2016 | Huh | H04R 1/025 455/575.1 |
| 2016/0313875 A1* | 10/2016 | Williams | G06F 1/163 |
| 2017/0031511 A1 | 2/2017 | Westerman et al. | |
| 2018/0248991 A1* | 8/2018 | Ryu | H04M 1/72469 |

FOREIGN PATENT DOCUMENTS

| | | |
|---|---|---|
| KR | 10-2014-0137189 | 12/2014 |
| KR | 10-2015-0065829 | 6/2015 |
| KR | 10-2015-0099100 | 8/2015 |
| WO | WO 2008-085404 | 7/2008 |

* cited by examiner

| 901 | | | | | | | 902 | | | | | | | | |
|---|---|---|---|---|---|---|---|---|---|---|---|---|---|---|---|
| 6 | 17 | 27 | 41 | 23 | 9 | 16 | 44 | 84 | 171 | 233 | 31 | 18 | 7 | 11 | 8 | 6 |
| 5 | 9 | 12 | 16 | 18 | 11 | 2 | 9 | 14 | 21 | 89 | 48 | 13 | 5 | 0 | 1 | -2 |
| 2 | 3 | 6 | 6 | 9 | 6 | 4 | 5 | 3 | 21 | 21 | 35 | 14 | 4 | 0 | -2 | -3 |
| -1 | 3 | 2 | 1 | 3 | 4 | 1 | 2 | 2 | 3 | 8 | 17 | 10 | 2 | 2 | 0 | 0 |
| 3 | 0 | 3 | 1 | 0 | 4 | 2 | 2 | 3 | 2 | 4 | 8 | 7 | 3 | 3 | 1 | -1 |
| 2 | 0 | 1 | 1 | 1 | 0 | 0 | 3 | 0 | 0 | 2 | 3 | 5 | 0 | 2 | 3 | 0 |
| 0 | -1 | 0 | -2 | 0 | 1 | 0 | 2 | 3 | 1 | 0 | 3 | 1 | 1 | -2 | 1 | 0 |
| -4 | 1 | 0 | -2 | 0 | -1 | -2 | 0 | 4 | 1 | 0 | 2 | 0 | -3 | 0 | 1 | 4 |
| -4 | 1 | 0 | 0 | -2 | 0 | -2 | 0 | -2 | 1 | 1 | 1 | -1 | 0 | -1 | 0 | 0 |
| 0 | -1 | 0 | 0 | 0 | -1 | -1 | -1 | -1 | -1 | 0 | -2 | -1 | 0 | -1 | 1 | -2 |
| -3 | 0 | 0 | 0 | 1 | 0 | 0 | -1 | -2 | -4 | 0 | -1 | -1 | -3 | -2 | 0 | 0 |
| -3 | 0 | -2 | 2 | 0 | -2 | -2 | -2 | 1 | -1 | -1 | -2 | -2 | -4 | 0 | -4 | -1 |
| -1 | -5 | -3 | -1 | 0 | 0 | -1 | 4 | -2 | 0 | -1 | 0 | -1 | -3 | -1 | 0 | 0 |
| -4 | -2 | -1 | 1 | 0 | -1 | 0 | 0 | 0 | 0 | -1 | -2 | -3 | -3 | -2 | 0 | -1 |
| 0 | -4 | -1 | 0 | 1 | -2 | 1 | 0 | -2 | 0 | -1 | -1 | 0 | -4 | -3 | 0 | 3 |
| 0 | -2 | -1 | 0 | 0 | 0 | 0 | -3 | -3 | -2 | 0 | 0 | -3 | -3 | -2 | 0 | 1 |
| -3 | -1 | -3 | -5 | -2 | -1 | -1 | -3 | -2 | 0 | 0 | 1 | 0 | -4 | 0 | -2 | 1 |
| 0 | 0 | -2 | -2 | -1 | -2 | 0 | -1 | -1 | -2 | -2 | -1 | -2 | -3 | 0 | 1 | 6 |
| 4 | -3 | 0 | -1 | -1 | -2 | -2 | -3 | -3 | -3 | 0 | -2 | -3 | 0 | -1 | 1 | 11 |
| 16 | 0 | 0 | 0 | 2 | -1 | 1 | 0 | -3 | -3 | 0 | -2 | -1 | 1 | 1 | 0 | 18 |
| 41 | 8 | 2 | 1 | 2 | 3 | 6 | 2 |  | 0 | 1 | 1 | 0 | 0 | 3 | 5 | 30 |
| 35 | 5 | 2 | 1 | 0 | 0 | 2 | 2 | 2 | 2 | -1 | 1 | 0 | 1 | 3 | 1 | 17 |
| 14 | 3 | 0 | 0 | -2 | -1 | 0 | 0 | -1 | 0 | -2 | 0 | 0 | 0 | 3 | -1 | 8 |
| 3 | 0 | -3 | -1 | 0 | 0 | 1 | -3 | -1 | -1 | -1 | -2 | 0 | -4 | -2 | 0 | 2 |
| 0 | 0 | 1 | -2 | 0 | -1 | -1 | 1 | 0 | 1 | -2 | 1 | 0 | -1 | -1 | -2 | 4 |
| 5 | 0 | 0 | -4 | -2 | -1 | -2 | 0 | -1 | -4 | -2 | -1 | 1 | 2 | 0 | -1 | 2 |
| 16 | 3 | 0 | 1 | 0 | 1 | 2 | -2 | 3 | -1 | 0 | 0 | 0 | 2 | 0 | 3 | 2 |
| 37 | 7 | 0 | 3 | 3 | 2 | 0 | 1 | 1 | 0 | 0 | 3 | 3 | 1 | 0 | 1 | 3 |
| 22 | 2 | 3 | 0 | 3 | -2 | 0 | 1 | 2 | 1 | 2 | 0 | 0 | 0 | 0 | 0 | 3 |
| 6 | 1 | 0 | 2 | 0 | 2 | 0 | 0 | 0 | 1 | 0 | 0 | 0 | 0 | 0 | 2 | -2 |
| 4 | 2 | 0 | -3 | -1 | 0 | -1 | -1 | 5 | 0 | 0 | -2 | 3 | -2 | 0 | -1 | -4 |
| 1 | -2 | 0 | 0 | 1 | 0 | 0 | 1 | 1 | 1 | 1 | 1 | -2 | -1 | -1 | 0 | -3 |
| -3 | -4 | 1 | 0 | -2 | 1 | 0 | 0 | -1 | -1 | 0 | 0 | 0 | 2 | 2 | -2 | -1 |
| -3 | 3 | -1 | 1 | -1 | 0 | 0 | 0 | 1 | 1 | 1 | 1 | 2 | 2 | -4 | 1 | -2 |
| 0 | 0 | -5 | 1 | 0 | 0 | 1 | 1 | 1 | 0 | 2 | 0 | 0 | 2 | 0 | 0 | -2 |
| 1 | 0 | 0 | -1 | -1 | 3 | 1 | 2 | 1 | 2 | 0 | 1 | 0 | -1 | 0 | 1 | -1 |

| 3 | 2 | 3 | 2 | -1 | 9 | 22 | 71 | 43 | 14 | 0 | 3 | 0 | 1 | 0 | 3 | 0 |
|---|---|---|---|---|---|---|---|---|---|---|---|---|---|---|---|---|
| 0 | 0 | 3 | 3 | 0 | 0 | 8 | 12 | 9 | 5 | 0 | 0 | 1 | -2 | 0 | 2 | 0 |
| 3 | 1 | 0 | 2 | -1 | 2 | 3 | 3 | 1 | 3 | 1 | 0 | 0 | 1 | 3 | 1 | 2 |
| -2 | 1 | 0 | 0 | 1 | 2 | 2 | 0 | 0 | 1 | 0 | 0 | 1 | 0 | 0 | 5 | -2 |
| 0 | 1 | -1 | -1 | 0 | 0 | -1 | 1 | 1 | 0 | 1 | 3 | 1 | 0 | 0 | 0 | 0 |
| 0 | 0 | 1 | 3 | 0 | -1 | 1 | 1 | 0 | 0 | 0 | 0 | 2 | 2 | 1 | 1 | -1 |
| 0 | -1 | 0 | 3 | 0 | 1 | 4 | 0 | 0 | 0 | 0 | 3 | 0 | 0 | 1 | -1 | 0 |
| 0 | -2 | -1 | 0 | 1 | -3 | 1 | 0 | -1 | -1 | -2 | -2 | -1 | -4 | 0 | -2 | -3 |
| 0 | 1 | 0 | 0 | 0 | 0 | 0 | -2 | 0 | 1 | 2 | -1 | -1 | 0 | 1 | 0 | -1 |
| -1 | 0 | -1 | -1 | 0 | -1 | -2 | 1 | 3 | 0 | 1 | -1 | 0 | 0 | -2 | -1 | 0 |
| 1 | 0 | 0 | 0 | 2 | -1 | -2 | 0 | 0 | -1 | 1 | 0 | -1 | 0 | 0 | 1 | 0 |
| 0 | -3 | -2 | 2 | 0 | 3 | 0 | 3 | -1 | 0 | 3 | 0 | 0 | 0 | 0 | -1 | -1 |
| -1 | 1 | 1 | -2 | 1 | 0 | 0 | -1 | -1 | -2 | -1 | 0 | 0 | 2 | -1 | 1 | 0 |
| -2 | 2 | 0 | -1 | -1 | 2 | 0 | 0 | -1 | -1 | -2 | -1 | -5 | 2 | 0 | -1 | 1 |
| 1 | -1 | 0 | -2 | 1 | 1 | 1 | 0 | 0 | 0 | 0 | 0 | -2 | 2 | 0 | 1 | 4 |
| 0 | 0 | -1 | 1 | -2 | 0 | -2 | 0 | 0 | -1 | -2 | 1 | 4 | -2 | 0 | -2 | 2 |
| 0 | 0 | 1 | 0 | 0 | -3 | -1 | 1 | -1 | 1 | 0 | 0 | 3 | 0 | 0 | 0 | -4 |
| -1 | 3 | 1 | 1 | 0 | -1 | 0 | -2 | 0 | -1 | 0 | -2 | -1 | 1 | -5 | -1 | 0 |
| -2 | 0 | 0 | 0 | 0 | -1 | -3 | 0 | 0 | 0 | 0 | -3 | -1 | 1 | -1 | 0 | -2 |

FIG.9B

| 7 | 2 | 0 | 3 | -4 | 3 | 7 | 0 | 0 | 2 | 3 | 2 | 0 | -4 | 2 | 2 | 2 |
|---|---|---|---|---|---|---|---|---|---|---|---|---|---|---|---|---|
| 2 | 4 | 5 | 9 | 0 | 3 | 5 | 6 | 6 | 7 | 5 | 7 | 6 | 9 | 5 | 2 | 0 |
| 4 | 3 | 7 | 8 | 45 | 27 | 12 | 6 | 4 | 11 | 6 | 17 | 101 | 173 | 58 | 10 | 2 |
| 2 | 8 | 15 | 97 | 295 | 238 | 38 | 16 | 10 | 15 | 14 | 43 | 278 | 340 | 237 | 23 | 9 |
| 4 | 10 | 16 | 132 | 315 | 303 | 60 | 13 | 9 | 16 | 16 | 30 | 169 | 287 | 144 | 20 | 8 |
| 0 | 6 | 12 | 46 | 171 | 138 | 31 | 15 | 7 | 9 | 11 | 11 | 32 | 45 | 23 | 9 | 3 |
| 3 | 4 | 10 | 20 | 30 | 29 | 16 | 7 | 6 | 7 | 6 | 10 | 11 | 12 | 5 | 7 | 4 |
| 2 | 5 | 4 | 5 | 12 | 10 | 10 | 5 | 3 | 5 | 2 | 5 | 9 | 5 | 2 | 4 | 3 |
| 4 | -1 | 4 | 3 | 6 | 7 | 6 | 1 | 1 | 3 | 5 | 4 | 7 | 2 | 3 | 2 | 1 |
| 1 | -1 | 2 | 6 | 3 | 6 | 1 | 8 | 1 | 2 | 2 | 5 | 3 | 2 | 1 | 0 | 1 |
| 0 | 3 | 2 | 3 | 3 | 3 | 3 | 1 | 0 | 2 | 1 | 1 | 1 | 1 | 1 | 1 | 1 |
| 1 | 0 | 0 | 0 | 2 | 2 | 1 | 0 | 1 | 3 | 1 | 1 | 3 | 1 | 4 | 1 | 0 |
| 2 | 0 | 0 | 0 | 5 | -1 | 0 | 0 | 0 | -2 | 0 | 0 | 0 | 1 | 1 | 0 | -1 |
| -1 | 0 | 0 | 2 | 1 | 0 | 1 | 2 | 1 | 2 | 0 | -2 | 0 | 0 | 1 | -3 | 0 |
| -1 | -4 | 0 | -1 | 0 | 4 | 0 | 1 | 1 | 0 | -1 | 1 | 3 | 0 | 1 | 3 | 0 |
| 0 | 0 | 0 | 0 | 0 | 1 | -1 | 0 | 5 | 0 | -2 | 0 | 3 | 2 | 1 | -2 | 0 |
| 0 | -1 | -1 | -1 | -1 | 0 | 0 | 0 | -1 | 1 | -1 | -1 | 2 | -1 | -4 | -1 | -3 |
| 1 | 0 | 0 | -2 | -1 | 1 | 1 | -3 | 0 | 0 | 0 | 0 | 0 | -1 | 0 | -2 | -2 |
| -3 | -3 | -2 | 0 | 2 | 1 | 0 | -4 | -2 | 0 | -3 | -1 | 2 | -2 | 0 | 0 | -1 |

FIG.9D 1201, 1203, 1202, 1204

| 11 | 12 | 15 | 28 | 120 | 164 | 128 | 126 | 112 | 37 | 11 | 6 | 1 | -1 | 2 | 11 | 4 |
|---|---|---|---|---|---|---|---|---|---|---|---|---|---|---|---|---|
| 9 | 8 | 34 | 150 | 158 | 61 | 66 | 66 | 65 | 66 | 51 | 8 | 2 | -4 | -3 | 7 | 1 |
| 8 | 12 | 90 | 179 | 35 | 32 | 41 | 40 | 28 | 25 | 25 | 11 | 7 | -4 | 0 | 2 | 4 |
| 9 | 14 | 141 | 183 | 25 | 24 | 55 | 145 | 141 | 68 | 28 | 18 | 11 | 2 | 2 | 5 | 2 |
| 9 | 16 | 85 | 117 | 18 | 16 | 43 | 247 | 336 | 314 | 199 | 42 | 20 | 6 | 5 | 7 | 8 |
| 8 | 13 | 30 | 45 | 20 | 15 | 31 | 68 | 76 | 100 | 227 | 278 | 49 | 13 | 5 | 4 | 5 |
| 5 | 5 | 13 | 22 | 21 | 14 | 12 | 9 | 13 | 13 | 36 | 242 | 188 | 23 | 7 | 4 | 4 |
| 2 | 1 | 10 | 9 | 10 | -10 | 6 | 5 | 4 | 5 | 11 | 80 | 129 | 22 | 10 | 3 | 3 |
| -1 | 3 | 3 | 5 | 4 | 6 | 2 | 5 | 1 | 4 | 4 | 18 | 23 | 20 | 6 | 5 | 4 |
| 2 | 0 | 2 | 3 | 0 | 2 | 7 | 2 | 6 | 4 | 10 | 14 | 15 | 14 | 10 | 3 | 0 |
| 1 | -1 | 3 | 0 | 3 | 1 | 3 | 4 | 5 | 8 | 6 | 8 | 12 | 13 | 5 | 2 | 2 |
| -2 | 0 | 1 | 3 | 0 | 2 | 4 | 0 | 0 | 4 | 0 | 6 | 10 | 4 | 3 | 0 | 1 |
| 0 | 0 | 1 | 1 | -2 | 1 | 5 | 1 | 0 | 5 | 1 | 1 | 3 | 0 | 3 | 2 | -2 |
| 0 | -1 | 0 | 0 | 0 | -1 | 1 | 0 | -1 | 0 | 1 | 0 | 2 | -6 | 0 | -1 | -3 |
| -3 | -2 | -2 | 1 | -1 | 0 | -1 | 1 | 2 | 0 | -2 | -1 | 0 | -5 | -1 | 0 | -1 |
| -1 | -1 | 4 | -1 | -6 | 0 | 0 | 0 | 0 | 1 | -2 | 0 | 0 | -7 | -3 | -4 | -2 |
| 1 | 2 | 1 | 10 | 9 | 10 | 10 | -7 | -8 | -8 | -10 | -18 | -12 | -8 | -10 | -2 | -3 |
| -4 | -1 | 3 | 3 | 5 | 4 | 6 | -9 | -10 | -12 | -14 | -16 | -13 | -9 | -9 | 4 | 18 |
| 9 | 2 | -3 | -2 | -1 | 1 | -2 | 0 | 2 | -3 | 0 | 0 | -15 | -13 | -15 | 10 | 14 |
| 9 | 1 | 9 | 9 | 9 | 9 | 11 | 13 | 9 | 14 | 12 | 14 | 4 | 5 | 8 | 6 | 8 |
| 16 | 10 | -3 | -3 | -3 | -1 | -5 | 1 | -5 | 0 | -2 | 0 | 0 | 0 | 4 | 0 | 6 |
| 17 | 9 | -6 | -6 | -6 | -5 | -9 | -7 | -9 | -6 | -2 | -8 | 1 | 0 | 5 | 1 | 1 |
| 2 | 1 | -4 | -6 | -4 | -7 | -9 | -5 | -9 | -9 | -7 | -5 | 4 | 14 | 6 | 2 | 14 |
| -1 | 3 | 2 | 6 | 4 | 3 | 3 | 5 | 4 | 6 | 2 | 5 | 1 | 7 | 3 | -1 | 11 |
| 14 | 6 | 4 | 4 | 3 | 0 | 2 | 4 | -1 | -6 | 0 | 0 | 0 | 0 | 1 | 0 | 9 |
| 13 | 3 | -1 | 3 | 0 | 2 | 4 | 1 | 10 | 9 | 10 | 10 | 6 | 5 | 4 | -5 | 6 |
| 16 | 10 | 6 | 12 | 8 | 12 | 10 | 3 | 3 | 5 | 4 | 6 | 2 | 5 | 1 | 7 | 15 |
| 17 | 9 | 5 | 7 | 4 | 8 | 10 | 0 | 2 | 3 | 0 | 2 | 7 | 2 | 6 | 4 | 13 |
| 16 | 4 | 6 | 6 | 7 | 5 | 5 | 5 | -2 | 4 | 6 | 8 | 14 | 14 | 6 | 2 | 14 |
| 6 | 1 | 0 | 2 | 0 | 2 | 0 | 0 | -5 | 1 | 3 | 7 | 9 | 7 | 3 | -1 | 11 |
| 14 | 6 | 4 | 4 | 3 | 5 | 5 | 1 | 5 | 0 | 0 | -2 | 3 | -2 | 0 | -1 | -4 |
| 13 | 3 | -1 | 3 | 0 | 2 | 4 | 2 | -8 | -2 | -2 | -4 | 1 | -7 | -3 | -5 | 6 |
| 11 | 3 | -1 | 5 | 2 | 4 | 2 | 0 | -5 | -5 | -3 | -5 | -4 | -6 | -4 | -2 | 5 |
| 12 | 2 | 2 | 0 | -4 | 2 | 2 | 0 | -7 | -5 | -7 | -3 | -3 | -7 | -7 | -5 | 5 |
| 9 | 1 | 1 | 3 | -1 | 3 | -1 | 1 | -9 | -5 | -5 | -7 | -5 | -7 | -9 | -5 | 7 |
| 8 | -2 | -4 | 2 | -3 | -1 | -1 | -1 | -9 | -7 | -7 | -7 | -3 | -11 | -9 | -3 | 5 |

FIG.12A

| 9 | 14 | 141 | 191 | 25 | 24 | 55 | 145 | 124 | 68 | 28 | 18 | 11 | 2 | 2 | 5 | 2 |
|---|---|---|---|---|---|---|---|---|---|---|---|---|---|---|---|---|
| 9 | 18 | 85 | 117 | 18 | 16 | 43 | 230 | 330 | 293 | 199 | 42 | 20 | 6 | 5 | 7 | 8 |
| 8 | 13 | 30 | 45 | 20 | 15 | 31 | 68 | 76 | 100 | 45 | 278 | 49 | 13 | 5 | 4 | 5 |
| 5 | 5 | 13 | 22 | 21 | 14 | 12 | 9 | 13 | 13 | 36 | 242 | 188 | 23 | 7 | 4 | 4 |
| 2 | 1 | 10 | 9 | 10 | 10 | 6 | 5 | 4 | 5 | 11 | 80 | 129 | 22 | 10 | 3 | 3 |
| -1 | 3 | 3 | 5 | 4 | 6 | 2 | 5 | 1 | 4 | 4 | 18 | 23 | 20 | 6 | 5 | 4 |
| 2 | 0 | 2 | 3 | 0 | 2 | 7 | 2 | 6 | 4 | 10 | 14 | 15 | 14 | 10 | 3 | 0 |
| 1 | -1 | 3 | 0 | 3 | 1 | 3 | 4 | 5 | 8 | 6 | 8 | 12 | 13 | 5 | 2 | 2 |
| 0 | 0 | -2 | -2 | 1 | -1 | 0 | -1 | 1 | 2 | 0 | -2 | -1 | 0 | -5 | -1 | 0 |
| 1 | -3 | -1 | 4 | -1 | -6 | 0 | 0 | 0 | 0 | 1 | -2 | 0 | 0 | -7 | -3 | -4 |
| 0 | 0 | 2 | 1 | 10 | 9 | 10 | 10 | -7 | -8 | -8 | -10 | -18 | -12 | -8 | -10 | -2 |
| 1 | 3 | -1 | 3 | 3 | 5 | 4 | 6 | -9 | -10 | -12 | -14 | -16 | -13 | -9 | -9 | 4 |
| 0 | 4 | 2 | -3 | -2 | -1 | 1 | -2 | 0 | 2 | -3 | 0 | 0 | -15 | -13 | -15 | 10 |
| 5 | 2 | 1 | 9 | 9 | 9 | 9 | 11 | 13 | 9 | 14 | 12 | 14 | 4 | 5 | 8 | 6 |
| 0 | 0 | 10 | -3 | -3 | -3 | -1 | -5 | 1 | -5 | 0 | -2 | 0 | 0 | 0 | -4 | 0 |
| 0 | 0 | 9 | -6 | -6 | -6 | -5 | -9 | -7 | -9 | -6 | -2 | -8 | 1 | 0 | 5 | 1 |
| -1 | -6 | -5 | -9 | -7 | -9 | -6 | -2 | -8 | 1 | 0 | 5 | -5 | 4 | 14 | 6 | 2 |
| 2 | -4 | -7 | -9 | -5 | -9 | -9 | -7 | -5 | 4 | 14 | 6 | 5 | 1 | 7 | 3 | -1 |
| 18 | 4 | 3 | 3 | 5 | 4 | 6 | 2 | 5 | 1 | 7 | 3 | 0 | 0 | 0 | 1 | 0 |

FIG.12B

| 7 | 2 | 0 | 3 | -4 | 3 | 7 | 0 | 0 | 2 | 3 | 2 | 0 | 4 | 2 | 2 | 2 |
|---|---|---|---|---|---|---|---|---|---|---|---|---|---|---|---|---|
| 2 | 4 | 5 | 9 | 0 | 3 | 5 | 6 | 6 | 7 | 5 | 7 | 6 | 9 | 5 | 2 | 0 |
| 4 | 3 | 7 | 18 | 45 | 27 | 12 | 6 | 4 | 11 | 6 | 17 | 101 | 173 | 58 | 10 | 2 |
| 2 | 8 | 15 | 97 | 295 | 238 | 38 | 16 | 10 | 15 | 14 | 43 | 278 | 340 | 237 | 23 | 9 |
| 4 | 10 | 16 | 132 | 315 | 303 | 60 | 13 | 9 | 16 | 16 | 30 | 169 | 287 | 144 | 20 | 8 |
| 0 | 6 | 12 | 46 | 171 | 138 | 31 | 15 | 7 | 9 | 11 | 11 | 32 | 45 | 23 | 9 | 3 |
| 3 | 4 | 10 | 20 | 30 | 29 | 16 | 7 | 6 | 7 | 6 | 10 | 11 | 12 | 5 | 7 | 4 |
| 2 | 5 | 4 | 5 | 12 | 10 | 10 | 5 | 3 | 5 | 2 | 5 | 9 | 5 | 2 | 4 | 3 |
| 3 | -1 | 4 | 3 | 6 | 7 | 6 | 1 | 1 | 3 | 4 | 4 | 7 | 2 | 3 | 2 | 1 |
| 1 | -1 | 2 | 6 | 3 | 6 | 1 | 8 | 1 | 2 | 2 | 5 | 3 | 2 | 1 | 0 | 1 |
| 0 | 3 | 2 | 3 | 3 | 3 | 3 | 1 | 0 | 2 | 1 | 1 | 1 | 1 | 1 | 1 | 1 |
| 1 | 0 | 0 | 0 | 2 | 2 | 1 | 0 | 1 | 3 | 1 | 1 | 3 | 1 | 4 | 1 | 0 |
| 2 | 0 | 0 | 0 | 5 | -1 | 0 | 0 | 0 | -2 | 0 | 0 | 0 | 1 | 1 | 0 | -1 |
| -1 | 0 | 0 | 2 | 1 | 0 | 1 | 2 | 1 | 2 | 2 | -2 | 0 | 0 | 1 | -3 | 0 |
| -1 | -4 | 0 | -1 | 0 | 4 | 0 | 1 | 1 | 0 | -1 | 1 | 3 | 0 | 1 | 3 | 0 |
| 0 | 0 | 0 | 0 | 0 | 1 | -1 | 0 | 5 | 0 | -2 | 0 | 3 | 2 | 1 | -2 | 0 |
| 0 | -1 | -1 | -1 | -1 | 0 | 0 | 0 | -1 | 1 | -1 | -1 | 2 | 2 | -4 | -1 | -3 |
| 1 | 0 | 0 | -2 | -1 | 1 | 1 | -3 | 0 | 0 | 0 | 0 | -1 | 0 | -2 | -2 |
| -3 | -3 | -2 | 0 | 2 | 1 | 0 | -4 | -2 | 0 | -3 | -1 | 2 | 2 | 0 | 0 | -1 |

FIG.12C

| 9 | 2 | 1 | 3 | 2 | 1 | 3 | -9 | -7 | -9 | -6 | -2 | -8 | 1 | 0 | 5 | 2 |
|---|---|---|---|---|---|---|---|---|---|---|---|---|---|---|---|---|
| 9 | 0 | 10 | 2 | 0 | 10 | 2 | -9 | -5 | -9 | -9 | -7 | -5 | 4 | 14 | 7 | 8 |
| 8 | 0 | 9 | -6 | 0 | 9 | -6 | 3 | 5 | 4 | 6 | 2 | 5 | 1 | 7 | 4 | 5 |
| 5 | -6 | -5 | -9 | -6 | -5 | -9 | 2 |  | -1 | -6 | 0 | -5 | 4 | 0 | 4 | 4 |
| 2 | -4 | -7 | -9 | -4 | -7 | -9 | -4 | -7 | -9 | 11 | -6 | 5 | 1 | 10 | 3 | 3 |
| -1 | 3 | 3 | 5 | 33 | 109 | 122 | 58 | 121 | 145 | 124 | 68 | 28 | 18 | 11 | 2 | 4 |
| 2 | 0 | 2 | 3 | 85 | 117 | 18 | 16 | 143 | 150 | 192 | 221 | 212 | 42 | 20 | 6 | 0 |
| 1 | 2 | 1 | 3 | 30 | 45 | 20 | 15 | 31 | 68 | 76 | 122 | 301 | 251 | 49 | 13 | 2 |
| 0 | 0 | 10 | 2 | 13 | 22 | 21 | 14 | 12 | 9 | 13 | 13 | 36 | 218 | 188 | 23 | 0 |
| 1 | 0 | 9 | -6 | 10 | 9 | 10 | 10 | 6 | 5 | 4 | 5 | 11 | 80 | 120 | 22 | -4 |
| 0 | -6 | -5 | -9 | 3 | 5 | 4 | 6 | 2 | 5 | 1 | 4 | 4 | 18 | 23 | 20 | -2 |
| 1 | -4 | -7 | -9 | 2 | 3 | 0 | 2 | 7 | 2 | 6 | 4 | 10 | 14 | 15 | 14 | 4 |
| 0 | 4 | 2 | 10 | 9 | 10 | 10 | 6 | 5 | 4 | 5 | 11 | -6 | -8 | 22 | -15 | 10 |
| 5 | 2 | 1 | 3 | 5 | 4 | 6 | 2 | 5 | 1 | 4 | 4 | -6 | -8 | 20 | 8 | 6 |
| 0 | 0 | 10 | 2 | 3 | 0 | 2 | 7 | 2 | 6 | 4 | 10 | -12 | -14 | 14 | 4 | 0 |
| 0 | 0 | 9 | -6 | -6 | -6 | -5 | -9 | -7 | -9 | -6 | -2 | -8 | 1 | 0 | 5 | 1 |
| -1 | -6 | -5 | -9 | -7 | -9 | -6 | -2 | -8 | 1 | 0 | 5 | -5 | 4 | 14 | 6 | 2 |
| 2 | -4 | -7 | -9 | -5 | -9 | -9 | -7 | -5 | 4 | 14 | 6 | 5 | 1 | 7 | 3 | -1 |
| 18 | 4 | 3 | 3 | 5 | 4 | 6 | 2 | 5 | 1 | 7 | 3 | 0 | 0 | 0 | 1 | 0 |

FIG.12D

| | | | | | | | | | | | | | | | |
|---|---|---|---|---|---|---|---|---|---|---|---|---|---|---|---|
| 1 | 3 | 3 | 7 | 18 | 21 | 18 | 14 | 27 | 22 | 20 | 11 | 11 | 5 | -4 | -10 | -15 |
| 6 | 4 | 6 | 12 | 56 | 40 | 16 | 6 | 31 | 28 | 18 | 12 | 13 | 9 | 3 | -8 | -4 |
| 3 | 5 | 5 | 34 | 122 | 25 | 6 | 10 | 31 | 27 | 19 | 19 | 14 | 6 | 4 | -5 | -7 |
| 3 | 5 | 7 | 73 | 178 | 16 | 8 | 8 | 36 | 32 | 27 | 19 | 19 | 9 | 5 | -6 | -6 |
| 3 | 7 | 13 | 46 | 86 | 13 | 7 | 9 | 39 | 40 | 55 | 35 | 23 | 11 | 7 | -8 | -3 |
| 1 | 5 | 11 | 30 | 59 | 17 | 6 | 8 | 31 | 33 | 51 | 148 | 44 | 19 | 11 | -2 | -6 |
| 2 | 2 | 6 | 15 | 41 | 28 | 3 | -2 | 22 | 19 | 26 | 248 | 150 | 37 | 16 | -5 | -3 |
| 2 | 6 | 8 | 10 | 20 | 16 | 5 | -2 | 20 | 14 | 16 | 198 | 238 | 62 | 27 | -2 | -5 |
| 4 | 8 | 8 | 6 | 9 | 11 | 7 | 5 | 23 | 16 | 20 | 101 | 181 | 90 | 57 | -1 | 0 |
| 8 | 9 | 5 | 1 | 7 | 11 | 15 | 18 | 28 | 20 | 28 | 66 | 62 | 159 | 111 | 4 | -5 |
| 5 | 0 | 3 | -2 | 2 | 6 | 17 | 102 | 61 | 10 | 84 | 218 | 190 | 255 | 151 | 7 | 0 |
| 2 | 2 | 0 | -5 | -2 | 5 | 13 | 114 | 74 | 12 | 216 | 304 | 298 | 278 | 126 | 6 | 1 |
| 18 | 19 | 11 | 10 | 21 | 38 | 59 | 70 | 59 | 27 | 168 | 149 | 114 | 244 | 89 | 0 | -5 |
| 40 | 32 | 26 | 23 | 40 | 82 | 153 | 136 | 73 | 35 | 38 | 41 | 120 | 284 | 45 | 3 | 0 |
| 62 | 47 | 36 | 27 | 51 | 116 | 211 | 225 | 139 | 53 | 38 | 79 | 262 | 143 | 20 | 2 | 2 |
| 140 | 90 | 53 | 40 | 48 | 106 | 177 | 237 | 240 | 114 | 52 | 101 | 136 | 25 | 12 | 2 | 0 |
| 236 | 199 | 114 | 73 | 59 | 74 | 115 | 194 | 267 | 199 | 85 | 38 | 25 | 10 | 10 | 4 | 2 |
| 272 | 255 | 195 | 165 | 153 | 135 | 115 | 146 | 249 | 251 | 142 | 39 | 16 | 8 | 14 | 4 | 6 |
| 274 | 253 | 241 | 226 | 247 | 253 | 224 | 224 | 265 | 257 | 164 | 49 | 19 | 4 | 16 | 10 | 4 |
| 259 | 229 | 229 | 247 | 250 | 271 | 256 | 247 | 283 | 267 | 156 | 55 | 21 | 10 | 18 | 8 | 7 |
| 114 | 178 | 241 | 261 | 270 | 274 | 267 | 256 | 274 | 258 | 163 | 56 | 24 | 11 | 13 | 7 | 3 |
| 35 | 127 | 234 | 258 | 276 | 272 | 266 | 257 | 272 | 274 | 161 | 60 | 22 | 7 | 13 | 5 | 0 |
| 25 | 107 | 227 | 263 | 267 | 269 | 270 | 262 | 287 | 285 | 202 | 65 | 25 | 8 | 17 | 2 | -3 |
| 57 | 154 | 244 | 255 | 258 | 263 | 263 | 260 | 279 | 284 | 211 | 64 | 26 | 7 | 13 | 1 | -1 |
| 129 | 204 | 271 | 255 | 263 | 261 | 258 | 255 | 278 | 276 | 221 | 68 | 21 | 4 | 8 | 8 | 5 |
| 84 | 179 | 257 | 260 | 263 | 269 | 261 | 247 | 281 | 286 | 203 | 59 | 19 | 4 | 15 | 6 | 3 |
| 18 | 91 | 154 | 243 | 268 | 270 | 264 | 259 | 296 | 285 | 158 | 44 | 11 | 0 | 8 | 2 | 3 |
| -2 | 24 | 67 | 187 | 254 | 269 | 265 | 267 | 290 | 248 | 101 | 33 | 15 | 2 | 8 | 4 | 2 |
| -6 | 10 | 32 | 97 | 233 | 268 | 275 | 273 | 274 | 267 | 59 | 23 | 11 | 4 | 4 | 2 | -4 |
| -1 | 8 | 20 | 48 | 106 | 186 | 221 | 212 | 182 | 82 | 45 | 23 | 10 | 6 | 4 | -1 | -1 |
| 2 | 11 | 16 | 27 | 48 | 71 | 85 | 83 | 83 | 50 | 36 | 18 | 15 | 6 | 2 | -5 | -5 |
| 6 | 9 | 11 | 16 | 26 | 33 | 38 | 34 | 49 | 35 | 28 | 15 | 13 | 6 | 0 | -5 | -1 |
| 2 | 2 | 11 | 13 | 16 | 24 | 18 | 17 | 39 | 30 | 23 | 10 | 15 | 4 | 6 | -7 | -4 |
| 2 | 4 | 6 | 9 | 15 | 15 | 13 | 11 | 36 | 23 | 19 | 10 | 10 | 8 | 2 | -5 | -5 |
| -1 | 2 | 4 | 2 | 9 | 13 | 8 | 2 | 29 | 20 | 20 | 9 | 9 | 4 | 2 | -5 | -6 |
| 1 | 3 | 6 | 1 | 9 | 9 | 7 | 5 | 27 | 20 | 15 | 5 | 9 | 4 | 0 | -7 | -6 |

| | | | 1511 | | | | | | | | | | | | |
|---|---|---|---|---|---|---|---|---|---|---|---|---|---|---|---|
| -1 | 1 | 3 | 19 | 28 | 17 | 8 | 6 | -3 | -1 | 2 | 10 | 0 | 3 | -10 | -2 | -1 |
| 4 | 6 | 10 | 76 | 61 | 9 | 5 | 11 | 0 | -2 | 1 | 11 | 0 | 4 | -9 | -3 | -2 |
| 1 | 5 | 28 | 196 | 51 | 5 | 5 | 13 | 8 | 4 | 6 | 12 | 1 | 3 | -6 | -4 | -6 |
| 5 | 7 | 43 | 232 | 45 | 7 | 7 | 26 | 27 | 28 | 22 | 16 | 7 | 3 | 0 | -4 | -7 |
| 2 | 12 | 57 | 124 | 28 | 7 | 15 | 40 | 45 | 51 | 112 | 44 | 13 | 9 | -6 | -2 | -2 |
| 5 | 16 | 56 | 150 | 83 | 14 | 14 | 21 | 14 | 18 | 154 | 217 | 22 | 14 | -1 | -3 | -3 |
| 5 | 16 | 35 | 121 | 233 | 90 | 6 | 8 | -2 | -4 | 68 | 327 | 55 | 28 | 2 | 0 | -2 |
| 8 | 9 | 18 | 33 | 74 | 62 | 10 | 8 | -2 | -6 | 32 | 319 | 71 | 46 | 7 | -2 | -5 |
| 8 | 11 | 13 | 18 | 14 | 19 | 21 | 10 | -5 | -1 | 23 | 105 | 56 | 89 | 11 | 1 | -2 |
| 14 | 12 | 14 | 13 | 5 | 24 | 86 | 48 | 2 | 0 | 96 | 119 | 88 | 173 | 30 | 0 | -5 |
| 8 | 16 | 14 | 7 | 8 | 30 | 195 | 284 | 24 | 17 | 274 | 274 | 258 | 266 | 31 | 6 | -2 |
| 27 | 30 | 21 | 17 | 15 | 42 | 132 | 224 | 26 | 59 | 310 | 270 | 166 | 266 | 24 | 6 | -2 |
| 54 | 47 | 35 | 39 | 47 | 72 | 89 | 100 | 26 | 43 | 89 | 61 | 157 | 210 | 16 | -1 | -4 |
| 73 | 65 | 56 | 50 | 68 | 90 | 80 | 58 | 34 | 25 | 25 | 48 | 233 | 119 | 4 | 2 | -4 |
| 83 | 66 | 53 | 59 | 70 | 88 | 78 | 56 | 29 | 17 | 25 | 69 | 97 | 24 | 1 | -2 | 0 |
| 172 | 81 | 62 | 59 | 59 | 82 | 82 | 67 | 30 | 19 | 21 | 35 | 20 | 5 | -4 | 0 | -1 |
| 271 | 136 | 82 | 65 | 56 | 74 | 91 | 79 | 48 | 28 | 16 | 15 | 9 | 9 | 0 | 0 | -2 |
| 286 | 184 | 114 | 88 | 71 | 79 | 88 | 95 | 65 | 37 | 22 | 13 | 12 | 4 | 0 | 2 | -1 |
| 277 | 188 | 145 | 130 | 109 | 102 | 93 | 94 | 68 | 44 | 23 | 15 | 7 | 5 | 3 | 1 | -3 |
| 176 | 137 | 139 | 152 | 154 | 140 | 108 | 95 | 66 | 43 | 26 | 13 | 10 | 8 | -1 | 2 | -2 |
| 49 | 77 | 117 | 155 | 193 | 175 | 129 | 99 | 64 | 42 | 22 | 15 | 6 | 4 | -1 | 0 | -5 |
| 20 | 48 | 82 | 133 | 175 | 190 | 147 | 99 | 64 | 38 | 28 | 13 | 8 | 4 | -1 | -3 | -7 |
| 11 | 40 | 66 | 104 | 162 | 212 | 181 | 106 | 64 | 40 | 29 | 16 | 12 | 4 | -1 | -3 | -7 |
| 16 | 38 | 62 | 100 | 148 | 188 | 155 | 103 | 62 | 38 | 25 | 16 | 9 | 3 | -6 | 0 | -4 |
| 16 | 32 | 57 | 86 | 107 | 124 | 115 | 80 | 54 | 32 | 21 | 15 | 6 | 6 | -7 | -1 | -4 |
| 12 | 24 | 40 | 58 | 69 | 75 | 73 | 58 | 35 | 24 | 17 | 11 | 6 | 6 | -3 | -5 | 3 |
| 6 | 13 | 22 | 35 | 38 | 40 | 42 | 38 | 25 | 14 | 9 | 9 | 0 | 1 | -8 | -6 | 0 |
| 6 | 8 | 15 | 22 | 24 | 26 | 22 | 26 | 11 | 8 | 6 | 8 | 4 | 0 | -5 | -3 | -6 |
| 4 | 6 | 4 | 18 | 12 | 16 | 12 | 16 | 5 | 7 | 5 | 7 | -2 | 1 | -8 | -4 | -2 |
| -3 | 0 | 6 | 11 | 5 | 7 | 9 | 10 | 0 | 0 | 1 | 5 | 1 | 3 | -4 | -6 | -6 |
| -1 | -1 | 2 | 4 | 6 | 4 | 0 | 8 | 0 | -1 | 0 | 4 | 1 | 3 | -10 | -4 | -6 |
| 0 | -2 | 1 | 7 | 0 | 4 | 0 | 6 | -4 | -4 | 3 | 7 | -1 | -3 | -7 | -7 | -6 |
| 7 | -3 | 0 | 6 | -2 | 5 | 1 | 5 | -6 | -4 | 0 | 1 | -3 | 0 | -11 | -9 | -3 |
| 0 | -2 | 1 | 7 | 0 | -2 | -4 | 1 | -6 | -8 | -2 | 3 | 0 | -1 | -9 | -9 | -4 |
| -2 | -2 | -2 | 5 | -1 | -3 | -1 | 2 | -7 | -10 | -3 | -1 | 1 | 1 | -8 | -8 | -5 |
| -3 | -1 | -5 | 2 | 0 | -3 | -1 | 0 | -8 | -8 | -3 | 2 | -1 | -1 | -8 | -3 | -2 |

1512 indicates the lower bold box region.

FIG.15B

| | | | | | | | | | | | | | | | |
|---|---|---|---|---|---|---|---|---|---|---|---|---|---|---|---|
| -1 | 5 | 1 | -3 | -3 | -1 | -1 | -5 | 11 | 14 | 11 | 7 | 8 | 4 | 2 | -7 | 11 |
| -2 | 0 | 0 | -2 | -2 | -2 | 0 | 0 | 14 | 14 | 10 | 8 | 9 | 5 | 5 | -6 | 15 |
| -2 | -4 | 0 | -2 | 0 | -3 | 2 | -3 | 11 | 9 | 9 | 7 | 11 | 5 | 5 | -8 | 12 |
| 0 | -4 | 0 | 0 | 0 | -1 | -1 | -1 | 13 | 11 | 13 | 7 | 8 | 8 | 4 | -5 | 11 |
| -1 | -1 | 0 | -1 | 1 | -2 | 0 | -4 | 14 | 10 | 12 | 6 | 10 | 6 | 4 | -9 | 13 |
| -1 | -3 | 0 | 0 | 1 | 0 | 0 | -2 | 14 | 16 | 10 | 10 | 7 | 9 | 3 | -6 | 11 |
| 1 | -2 | -2 | 1 | 0 | 1 | 3 | -2 | 13 | 15 | 13 | 11 | 12 | 8 | 4 | -5 | 11 |
| 0 | -1 | 0 | 0 | 5 | 5 | 7 | 3 | 20 | 17 | 15 | 7 | 11 | 5 | 5 | -4 | 11 |
| 0 | 0 | 0 | 0 | 10 | 14 | 14 | 8 | 18 | 16 | 18 | 14 | 12 | 6 | 4 | -7 | 13 |
| 1 | 1 | 3 | 3 | 20 | 22 | 11 | 5 | 20 | 16 | 16 | 14 | 10 | 8 | 2 | -5 | 10 |
| 0 | -1 | 4 | 12 | 39 | 22 | 5 | 3 | 19 | 19 | 20 | 13 | 12 | 12 | 6 | -3 | 11 |
| -1 | 0 | 0 | 15 | 55 | 13 | 3 | 5 | 18 | 24 | 24 | 22 | 15 | 11 | 9 | -2 | 9 |
| 2 | 0 | 4 | 11 | 31 | 13 | 5 | 1 | 19 | 25 | 31 | 42 | 31 | 16 | 10 | -3 | 11 |
| 0 | -1 | 2 | 6 | 21 | 11 | 4 | 0 | 15 | 14 | 21 | 71 | 131 | 30 | 19 | -2 | 11 |
| 0 | 0 | 0 | 0 | 12 | 12 | 3 | -4 | 5 | 7 | 11 | 59 | 305 | 58 | 37 | 4 | 11 |
| 2 | 0 | 0 | 0 | 0 | 2 | 2 | -5 | 4 | 8 | 6 | 39 | 315 | 79 | 71 | 8 | 12 |
| 1 | 1 | 1 | -2 | 0 | 0 | 4 | 2 | 12 | 12 | 12 | 25 | 121 | 88 | 185 | 18 | 11 |
| 4 | 2 | 0 | -3 | -3 | 0 | 6 | 11 | 20 | 9 | 18 | 60 | 71 | 170 | 271 | 29 | 14 |
| 4 | 4 | -3 | -9 | -11 | -12 | -3 | 34 | 91 | 9 | 61 | 253 | 233 | 326 | 271 | 31 | 15 |
| 10 | 7 | 0 | -8 | -7 | -1 | 13 | 43 | 96 | 14 | 149 | 291 | 275 | 234 | 247 | 22 | 16 |
| 15 | 13 | 9 | 2 | 10 | 25 | 64 | 123 | 158 | 46 | 97 | 95 | 77 | 244 | 193 | 18 | 13 |
| 26 | 27 | 18 | 14 | 27 | 72 | 182 | 265 | 273 | 159 | 44 | 30 | 100 | 285 | 111 | 14 | 8 |
| 50 | 54 | 36 | 19 | 38 | 113 | 212 | 260 | 277 | 259 | 144 | 119 | 277 | 187 | 22 | 7 | 2 |
| 157 | 149 | 92 | 48 | 41 | 76 | 150 | 228 | 267 | 283 | 247 | 181 | 215 | 46 | 7 | 7 | 9 |
| 267 | 272 | 239 | 170 | 110 | 74 | 77 | 141 | 250 | 272 | 274 | 182 | 48 | 18 | 7 | 11 | 14 |
| 215 | 270 | 260 | 248 | 235 | 232 | 177 | 177 | 238 | 271 | 264 | 207 | 54 | 20 | 11 | 18 | 19 |
| 68 | 172 | 238 | 250 | 254 | 263 | 258 | 254 | 263 | 272 | 263 | 202 | 77 | 28 | 11 | 16 | 19 |
| 21 | 75 | 182 | 259 | 266 | 266 | 268 | 261 | 265 | 277 | 264 | 222 | 106 | 35 | 12 | 17 | 16 |
| 19 | 67 | 169 | 263 | 269 | 274 | 276 | 265 | 268 | 273 | 263 | 232 | 124 | 43 | 15 | 17 | 15 |
| 27 | 88 | 209 | 264 | 268 | 277 | 279 | 268 | 273 | 282 | 280 | 248 | 139 | 43 | 15 | 17 | 11 |
| 21 | 89 | 227 | 264 | 265 | 268 | 280 | 270 | 276 | 285 | 281 | 268 | 149 | 42 | 14 | 18 | 11 |
| 6 | 56 | 193 | 260 | 265 | 272 | 279 | 271 | 270 | 279 | 280 | 276 | 173 | 47 | 14 | 18 | 11 |
| 5 | 35 | 141 | 267 | 273 | 276 | 282 | 274 | 285 | 292 | 289 | 283 | 175 | 53 | 16 | 20 | 9 |
| 7 | 30 | 98 | 253 | 275 | 275 | 284 | 280 | 285 | 294 | 294 | 283 | 171 | 47 | 14 | 6 | 11 |
| 15 | 36 | 78 | 225 | 279 | 279 | 290 | 283 | 295 | 302 | 308 | 293 | 159 | 40 | 11 | 14 | 8 |
| 18 | 54 | 113 | 231 | 265 | 270 | 284 | 284 | 287 | 306 | 306 | 298 | 148 | 42 | 24 | 33 | 24 |

1521 (indicates bordered region)

FIG.15C

| 11 | 12 | 15 | 28 | 120 | 164 | 128 | 126 | 112 | 37 | 11 | 6 | 1 | -1 | 2 | 11 | 4 |
|---|---|---|---|---|---|---|---|---|---|---|---|---|---|---|---|---|
| 9 | 8 | 34 | 150 | 158 | 61 | 66 | 66 | 65 | 66 | 51 | 8 | 2 | -4 | -3 | 7 | 1 |
| 8 | 12 | 90 | 179 | 35 | 32 | 41 | 40 | 28 | 25 | 25 | 11 | 7 | -4 | 0 | 2 | 4 |
| 9 | 14 | 141 | 183 | 25 | 24 | 55 | 145 | 141 | 68 | 28 | 18 | 11 | 2 | 2 | 5 | 2 |
| 9 | 16 | 85 | 117 | 18 | 16 | 43 | 247 | 336 | 314 | 199 | 42 | 20 | 6 | 5 | 7 | 8 |
| 8 | 13 | 30 | 45 | 20 | 15 | 31 | 68 | 76 | 100 | 227 | 278 | 49 | 13 | 5 | 4 | 5 |
| 5 | 5 | 13 | 22 | 21 | 14 | 12 | 9 | 13 | 13 | 36 | 242 | 188 | 23 | 7 | 4 | 4 |
| 2 | 1 | 10 | 9 | 10 | -10 | 6 | 5 | 4 | 5 | 11 | 80 | 129 | 22 | 10 | 3 | 3 |
| -1 | 3 | 3 | 5 | 4 | 6 | 2 | 5 | 1 | 4 | 4 | 18 | 23 | 20 | 6 | 5 | 4 |
| 2 | 0 | 2 | 3 | 0 | 2 | 7 | 2 | 6 | 4 | 10 | 14 | 15 | 14 | 10 | 3 | 0 |
| 1 | -1 | 3 | 0 | 3 | 1 | 3 | 4 | 5 | 8 | 6 | 8 | 12 | 13 | 5 | 2 | 2 |
| -2 | 0 | 1 | 3 | 0 | 2 | 4 | 0 | 0 | 4 | 0 | 6 | 10 | 4 | 3 | 0 | 1 |
| 0 | 0 | 1 | 1 | -2 | 1 | 5 | 1 | 0 | 5 | 1 | 1 | 3 | 0 | 3 | 2 | -2 |
| 0 | -1 | 0 | 0 | 0 | -1 | 1 | 0 | -1 | 0 | 1 | 0 | 2 | -6 | 0 | -1 | -3 |
| -3 | -2 | -2 | 1 | -1 | 0 | -1 | 1 | 2 | 0 | -2 | -1 | 0 | -5 | -1 | 0 | -1 |
| -1 | -1 | 4 | -1 | -6 | 0 | 0 | 0 | 0 | 1 | -2 | 0 | 0 | -7 | -3 | -4 | -2 |
| 1 | 2 | 1 | 10 | 9 | 10 | 10 | -7 | -8 | -8 | -10 | -18 | -12 | -8 | -10 | -2 | -3 |
| -4 | -1 | 3 | 3 | 5 | 4 | 6 | -9 | -10 | -12 | -14 | -16 | -13 | -9 | -9 | 4 | 18 |
| 9 | 2 | -3 | -2 | -1 | 1 | -2 | 0 | 2 | -3 | 0 | 0 | -15 | -13 | -15 | 10 | 14 |
| 9 | 1 | 9 | 9 | 9 | 9 | 11 | 13 | 9 | 14 | 12 | 14 | 4 | 5 | 8 | 6 | 8 |
| 16 | 10 | -3 | -3 | -3 | -1 | -5 | 1 | -5 | 0 | -2 | 0 | 0 | 0 | 4 | 0 | 6 |
| 17 | 9 | -6 | -6 | -6 | -5 | -9 | -7 | -9 | -6 | -2 | -8 | 1 | 0 | 5 | 1 | 1 |
| 2 | 1 | -4 | -6 | -4 | -7 | -9 | -5 | -9 | -9 | -7 | -5 | 4 | 14 | 6 | 2 | 14 |
| -1 | 3 | 2 | 6 | 4 | 3 | 3 | 5 | 4 | 6 | 2 | 5 | 1 | 7 | 3 | -1 | 11 |
| 14 | 6 | 4 | 4 | 3 | 0 | 2 | 4 | -1 | -6 | 0 | 0 | 0 | 0 | 1 | 0 | 9 |
| 13 | 3 | -1 | 3 | 0 | 2 | 4 | 1 | 10 | 9 | 10 | 10 | 6 | 5 | 4 | -5 | 6 |
| 16 | 10 | 6 | 12 | 8 | 12 | 10 | 3 | 3 | 5 | 4 | 6 | 2 | 5 | 1 | 7 | 15 |
| 17 | 9 | 5 | 7 | 4 | 8 | 10 | 0 | 2 | 3 | 0 | 2 | 7 | 2 | 6 | 4 | 13 |
| 16 | 4 | 6 | 6 | 7 | 5 | 5 | 5 | -2 | 4 | 6 | 8 | 14 | 14 | 6 | 2 | 14 |
| 6 | 1 | 0 | 2 | 0 | 2 | 0 | 0 | -5 | 1 | 3 | 7 | 9 | 7 | 3 | -1 | 11 |
| 14 | 6 | 4 | 4 | 3 | 5 | 5 | 1 | 5 | 0 | 0 | -2 | 3 | -2 | 0 | -1 | -4 |
| 13 | 3 | -1 | 3 | 0 | 2 | 4 | 2 | -8 | -2 | -2 | -4 | 1 | -7 | -3 | -5 | 6 |
| 11 | 3 | -1 | 5 | 2 | 4 | 2 | 0 | -5 | -5 | -3 | -5 | -4 | -6 | -4 | -2 | 5 |
| 12 | 2 | 2 | 0 | -4 | 2 | 2 | 0 | -7 | -5 | -7 | -3 | -3 | -7 | -7 | -5 | 5 |
| 9 | 1 | 1 | 3 | -1 | 3 | -1 | 1 | -9 | -5 | -5 | -7 | -5 | -7 | -9 | -5 | 7 |
| 8 | -2 | -4 | 2 | -3 | -1 | -1 | -1 | -9 | -7 | -7 | -7 | -3 | -11 | -9 | -3 | 5 |

<NORMAL CASE>

<SELF DATA CHANGE CAUSED BY TEMPERATURE CHANGE>

<NORMAL CASE>

<MUTUAL DATA CHANGE CAUSED BY MOISTURE>

ELECTRONIC DEVICE INCLUDING TOUCH CIRCUIT AND OPERATING METHOD THEREFOR

CROSS-REFERENCE TO RELATED APPLICATION(S)

This application is a continuation of International Application No. PCT/KR2020/002242, which was filed on Feb. 17, 2020, and is based on and claims priority under 35 U.S.C. § 119 to Korean Patent Application Nos. 10-2019-0019422 and 10-2019-0175377, which were filed in the Korean Intellectual Property Office on Feb. 19, 2019 and Dec. 26, 2019, respectively, the entire disclosure of each of which is incorporated herein by reference.

BACKGROUND

1. Field

The disclosure relates generally to an electronic device including a touch circuit and a method of operating the electronic device.

2. Description of Related Art

In an electronic device equipped with a touch screen (e.g., a smart phone or a tablet device), a speaker for outputting the other party's voice during a call is commonly disposed adjacent to the touch screen. For example, the touch screen is disposed on the front surface of the electronic device, and the speaker is disposed adjacent to the touch screen or in a part where the touch screen is not disposed on the front surface of the electronic device. Accordingly, a user may listen to the other party's voice during a call by holding the electronic device such that the speaker disposed on the front surface of the electronic device is positioned near the user's ear.

During the call, while the user places the front surface of the electronic device near the ear as described above, at least a part of the user's ear or cheek may come into contact with the touch screen of the electronic device. As such, there is a possibility that a function related to a displayed object is accidentally executed. Accordingly, an electronic device often control the touch screen to be in an off state, when a part of the user's body contacts (or approaches) the touch screen during a call.

In view of the foregoing, an electronic device may include a proximity sensor to sense contact (or proximity) of a part of the user's body on the front surface through the proximity sensor. The electronic device may identify whether to control the touch screen to the off state based on sensing data received from the proximity sensor. However, the arrangement of the proximity sensor may reduce an available area that the touch screen may occupy.

Further, when the proximity sensor is mounted under a display panel, while this may not decrease the available area for the touch screen, the performance of the proximity sensor may be degraded and an opto-electric effect caused by the proximity sensor may degrade image quality of the display and/or result in a burn-in phenomenon.

SUMMARY

The disclosure provided to address the above-described or other problems and to provide at least the advantages described below.

Accordingly, an aspect of the disclosure is to provide an electronic device that identifies contact of a user's body part (e.g., the ear or cheek) through a touch circuit (i.e., using a touch sensing panel), and a method of operating the electronic device.

In accordance with an aspect of the disclosure, an electronic device is provided, which includes a display, a touch circuit configured to detect a touch on the display, a processor, and a memory. The touch circuit is configured to obtain touch sensing information indicating a sensitivity of each of a plurality of nodes of the touch circuit, identify information related to an ear touch of a user on the electronic device based on the touch sensing information, and transmit the information related to the ear touch to the processor. The memory stores instructions, which when executed, cause the processor to control the display to be an on state and control the display to switch from the on state to an off state based on the information related to the ear touch obtained from the touch circuit.

In accordance with another aspect of the disclosure, a method is provided for operating an electronic device including a display, a touch circuit, and a processor. The method includes obtaining, by the touch circuit, touch sensing information indicating an input sensitivity of each of a plurality of nodes of the touch circuit, identifying, by the touch circuit, information related to an ear touch of a user on the electronic device based on the touch sensing information, transmitting, by the touch circuit, the information related to the ear touch to the processor, controlling, by the processor, the display to be an on state by the processor, and controlling, by the processor, the display to switch from the on state to an off state based on the information related to the ear touch obtained from the touch circuit.

In accordance with another aspect of the disclosure, an electronic device is provided, which includes a display, a touch circuit configured to detect a touch on the display, a processor operatively coupled to the display and the touch circuit, and a memory operatively coupled to the processor. The touch circuit may be configured to obtain touch sensing information indicating a sensitivity of each of a plurality of nodes of the touch circuit, and transmit the touch sensing information to the processor. The memory may store instructions which when executed, cause the processor to control the display to be an on state, identify information related to an ear touch of a user on the electronic device based on the touch sensing information received from the touch circuit, and control the display to switch from the on state to an off state based on the information related to the ear touch.

In accordance with another aspect of the disclosure, an electronic device is provided, which includes a touch circuit configured to detect a touch on the electronic device, a processor operatively coupled to the touch circuit, and a memory operatively coupled to the processor. The touch circuit may be configured to obtain at least one piece of touch sensing information indicating a sensitivity of each of a plurality of nodes of the touch circuit, identify at least one touch position based on the at least one piece of touch sensing information, identify at least one distance between the electronic device and an object based on the at least one piece of touch sensing information, identify information related to an ear touch of a user on the electronic device based on the at least one touch position and the at least one distance, and transmit the information related to the ear touch to the processor. The memory may store an instruction which when executed, causes the processor to perform an operation corresponding to the information related to the ear touch obtained from the touch circuit.

BRIEF DESCRIPTION OF DRAWINGS

The above and other aspects, features, and advantages of certain embodiments of the disclosure will be more apparent from the following description taken in conjunction with the accompanying drawings, in which:

FIG. 9A illustrates a basic form of a first ear touch type;

FIG. 9B illustrates measured touch sensing information, according to an embodiment;

FIG. 9D illustrates touch sensing information measured when a user makes a plurality of hand touches;

FIG. 12A illustrates a basic form of a second ear touch type;

FIG. 12B illustrates measured touch sensing information, according to an embodiment;

FIG. 12C illustrates touch sensing information measured when a user makes a plurality of hand touches, according to an embodiment;

FIG. 12D illustrates touch sensing information measured when a user makes an ear touch, according to an embodiment;

FIG. 15A illustrates a basic form of a third ear touch type;

FIG. 15B illustrates measured touch sensing information, according to an embodiment;

FIG. 15C illustrates touch sensing information measured when a user makes a cheek touch, according to an embodiment;

FIG. 17 illustrates touch sensing information, according to an embodiment;

DETAILED DESCRIPTION

Figure 1:
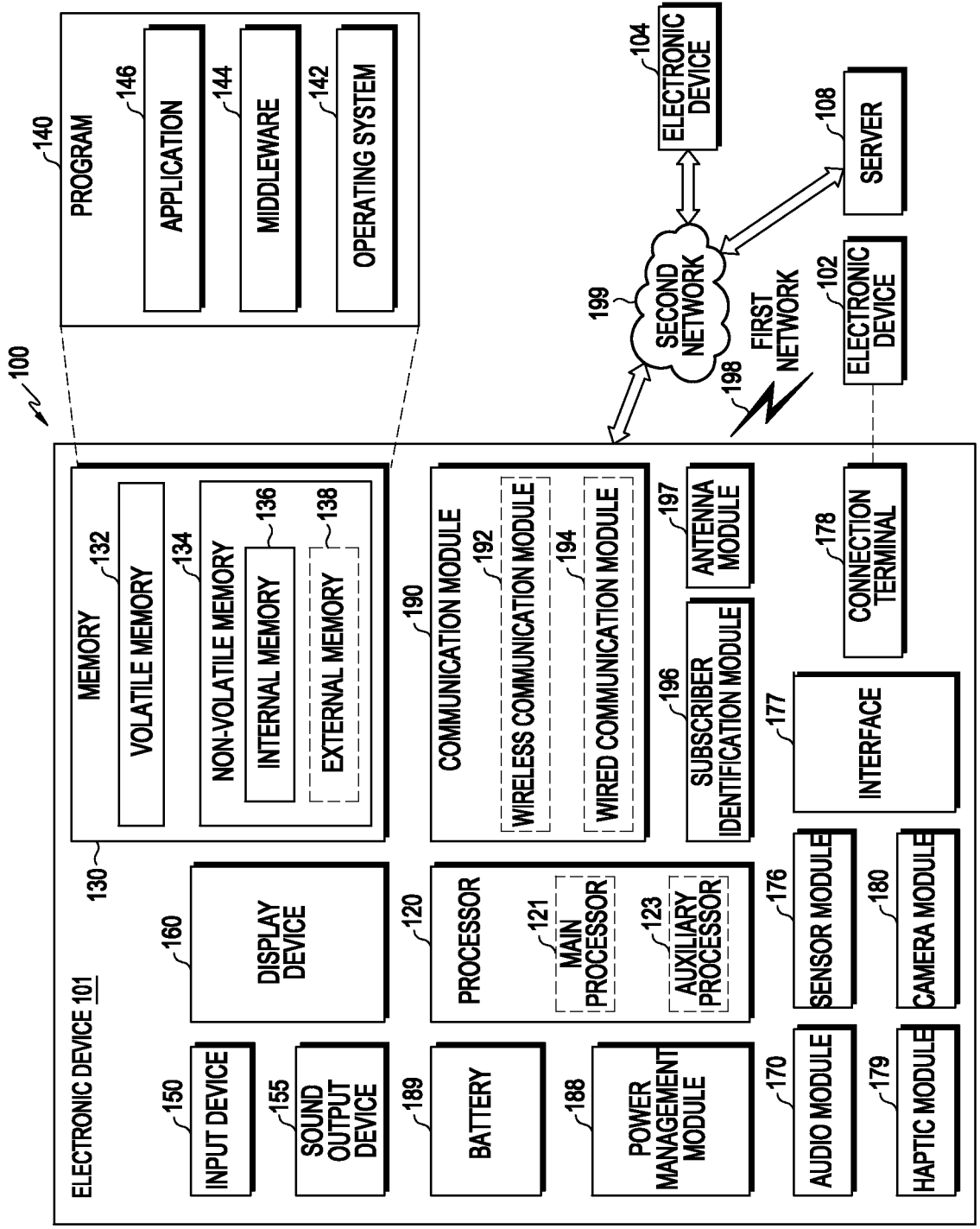
FIG. 1 illustrates an electronic device in a network environment, according to an embodiment.

Various embodiments of the disclosure are described with reference to the accompanying drawings. However, the disclosure is not limited to these particular embodiments, and it should be understood that modifications, equivalents, and/or alternatives of the embodiments described herein can be variously made. With regard to description of drawings, similar components may be marked by similar reference numerals.

FIG. 1 illustrates an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
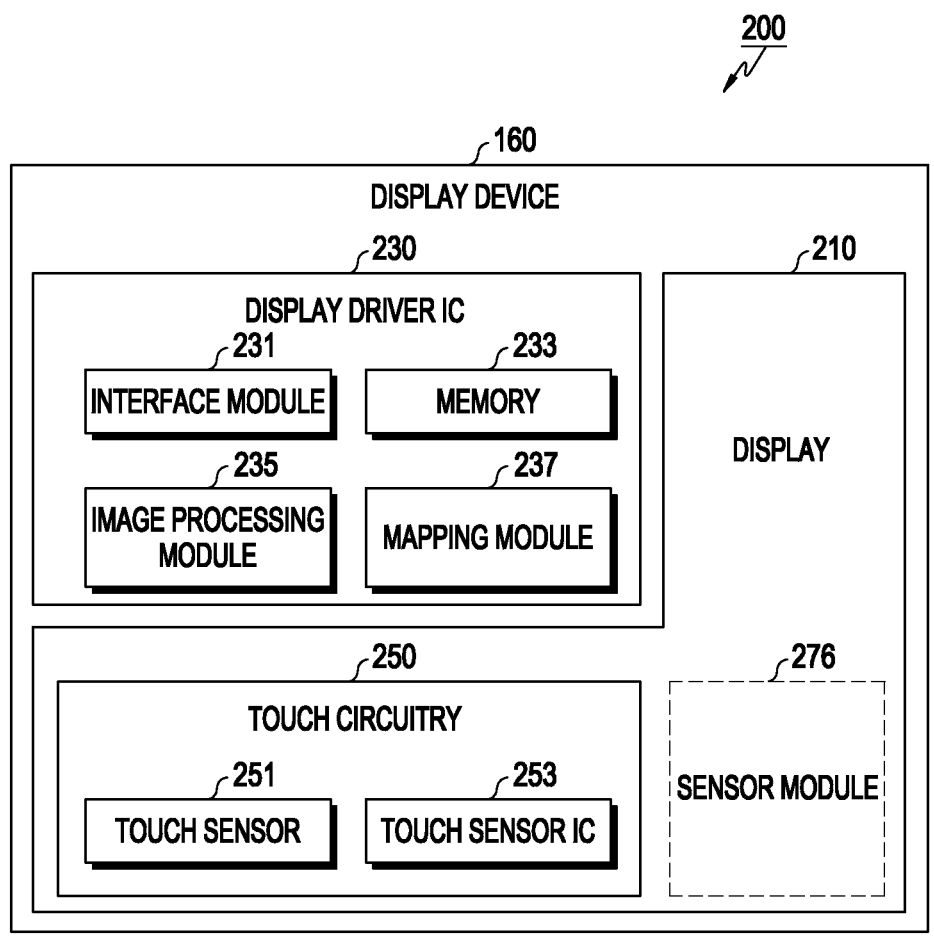
FIG. 2 illustrates a display device, according to an embodiment.

FIG. 2 is a block diagram 200 illustrating the display module 160, according to an embodiment.

Referring to FIG. 2, the display module 160 may include a display 210 and a display driver IC (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an AP)) or the auxiliary processor 123 (e.g., a GPU) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as a red, green, blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
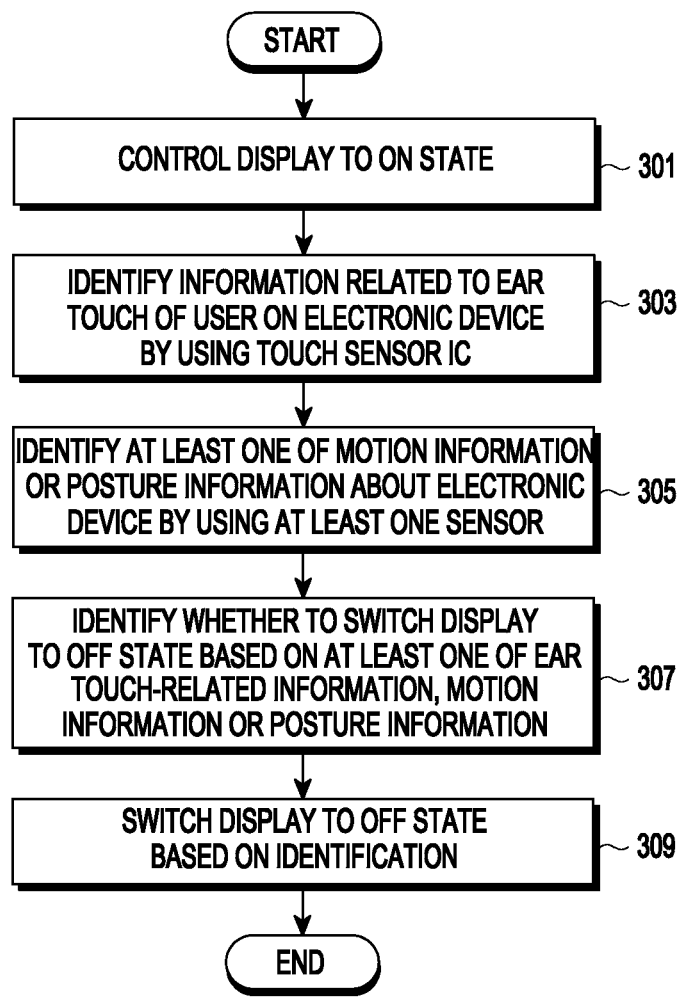
FIG. 3 is a flowchart illustrating a method of operating an electronic device, according to an embodiment.
Figure 4:
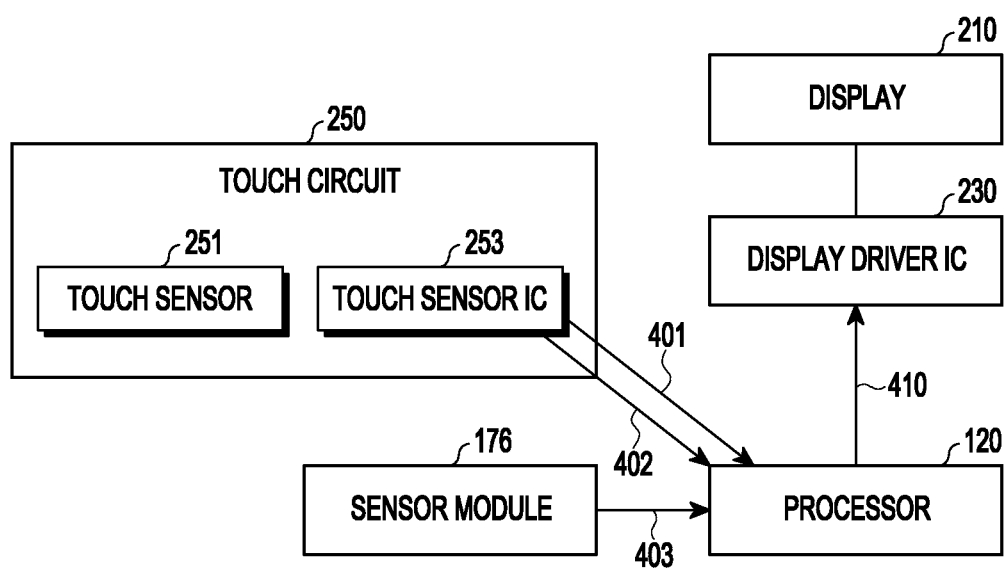
FIG. 4 illustrates an electronic device, according to an embodiment.

FIG. 3 is a flowchart illustrating a method of operating an electronic device, according to an embodiment. FIG. 4 illustrates an electronic device according to an embodiment.

Referring to FIGS. 3 and 4, in step 301, an electronic device (e.g., a processor 120 thereof) controls a display 210 to an on state. The processor 120 may control the display 210 to display an execution screen of any application by controlling a display driver IC 230. The on state of the display 210 may be expressed as a normal power mode. Herein, the electronic device controlling the display 210 to the on state, may imply that the processor 120 controls the display driver IC 230 so that the display 210 displays an execution screen of any application. The processor 120 may be executing any application and display an execution screen of the executed application on the display 210 in the foreground. The processor 120 may execute a phone application and display an execution screen of the phone application on the display 210. Herein, the electronic device performing a specific operation, may mean that the processor 120 performs the specific operation. Alternatively, the electronic device performing a specific operation, may mean that a hardware device other than the processor 120 in the electronic device (e.g., the touch sensor IC 253, the display driver IC 230, or the display 210) performs the specific operation. The hardware device may perform the specific operation under the control of the processor 120 or autonomously by a control circuit in the hardware device.

Alternatively, when the electronic device performs a specific operation, an instruction causing the processor 120 or the hardware device other than the processor 120 to perform the specific operation may be executed. Performing a specific operation may mean that an instruction causing the specific operation to be performed is stored in the memory 130.

In step 303, the processor 120 identifies information related to a user ear touch on the electronic device by using the touch sensor IC 253. The ear touch-related information may indicate whether the user's ear touches at least a part of a surface of the electronic device (e.g., at least a part of the front surface of the electronic device, from which the display 210 is exposed). In this case, the ear touch-related information may be configured in the form of a flag indicating whether a touch has been made.

The ear touch-related information may be information indicating one of a plurality of ear touch types. As will be described in more detail below, when the user moves the electronic device to the vicinity of the ear to receive a call, a part of the ear or a part of the cheek contacting the front surface of the electronic device may be different. The electronic device may predefine various ear touch types associated with the sensitivity of each node identified based on an electrical signal, that is, an output value from the touch sensor 251. The touch sensor 251 may include a plurality of electrodes and output electrical signals generated from the plurality of electrodes as an output value to the touch sensor IC 253. The touch sensor IC 253 may identify a capacitance variation at each node based on the difference between raw data obtained from the touch sensor 251 and a baseline used as a reference. A capacitance variation at each node or a value identified based on the capacitance variation may be referred to as the sensitivity of each node. Information about the sensitivity of every node, which is identified by scanning all electrodes, may be referred to as touch sensing information.

The ear touch types may correspond to various types of the user's body parts contacting the front surface of the electronic device as described above. A detailed description of different ear touch types will be provided below.

Information indicating whether an ear has been touched and information indicating the type of the ear touch may be identified together. In addition, the information indicating the ear touch type may further include various pieces of additional information other than the above-described information. For example, the additional information may include information indicating whether the ear is the left ear or the right ear and/or information indicating how close the ear is to the electronic device. Those skilled in the art will understand that the additional information may include any information about a shape obtained from the touch screen. The touch sensor IC 253 may identify information about a point touched by the user's finger by using an output value from the touch sensor 251.

Information about the ear touch may be generated by the touch sensor IC 253 and transmitted to the processor 120. Alternatively, the processor 120 may directly identify the information about the ear touch.

Referring to FIG. 4, the touch sensor IC 253 of the touch circuit 250 may transmit information 401 indicating a touch position to the processor 120. The processor 120 may allocate (or dispatch) the information 401 indicating the touch position to a running application, and the application may process the information 401 indicating the touch position and output a processing result. The processor 120 may control various hardware devices in the electronic device to process the result. The touch sensor IC 253 may transmit ear touch-related information 402 to the processor 120. The touch sensor IC 253 may receive the sensitivity of each node of the touch sensor 251 from the touch sensor 251. Each of the sensitivities of the nodes may be a value indicating an input strength at corresponding coordinates. The input strength is not the strength of the touch itself, but a strength by which to identify the touch point. For example, the input strength may represent a capacitance variation at each node (or the sensitivity of each node). The touch circuit 250 may provide the processor 120 with information about the strength (e.g., pressure) of the touch and a touch type (e.g., information indicating whether the touch is a long press or a double tap) in addition to the information indicating the touch position.

While FIG. 4 illustrates the touch circuit 250 being disposed outside the display 210, this is for illustrative purposes only. The touch circuit 250 may be included in the display 210 or disposed outside the display 210. There is no limitation on whether the display 210 and the touch circuit 250 are combined. For example, the touch circuit 250 may be configured as a touch and display driver integration (TDDI) combined with DDI. Sensor information such as posture information or motion information may be directly transmitted to the DDI or the touch circuit 250, and touch information may be directly transmitted to the DDI.

The touch sensor IC 253 may generate ear touch-related information based on the touch strength of each node (i.e., the sensitivity of each node). When the ear touch-related information includes information indicating whether an ear touch has occurred, the touch sensor IC 253 may identify that the ear touch has occurred when the sensitivity of each node satisfies a specified condition. For example, the touch sensor IC 253 may identify whether the ear touch has occurred based on whether at least one of the number of nodes having values within a specified sensitivity range (e.g., values less than or equal to a specified threshold sensitivity) or a shape formed by the nodes satisfies a specified condition.

Alternatively, when the ear touch-related information includes ear touch type information, the touch sensor IC 253 may determine an ear touch type based on whether the sensitivity of each node satisfies a condition for each ear touch type. The condition for each ear touch type will be described later in more detail.

The touch circuit 250 may transmit touch position indication information 401 and ear touch-related information 402 to the processor 120 based on one packet, or in each of different packets. For example, a field for the ear touch-related information 402 and a field for the touch position indication information 401 may be defined in the packet transmitted from the touch circuit 250 to the processor 120, and the touch circuit 250 may include at least one of the touch position indication information 401 or the ear touch-related information 402 in the corresponding packet and transmit the packet to the processor 120.

Alternatively, when the ear touch-related information 402 is generated, the touch circuit 250 may be configured to transmit the ear touch-related information 402 to the processor 120, while discontinuing the transmission of the touch position indication information 401. The packet transmitted from the touch circuit 250 to the processor 120 may be configured to include only one of the touch position indication information 401 and the ear touch-related information 402.

Alternatively, different packets may be configured to transmit the touch position indication information 401 and the ear touch-related information 402. When the touch position indication information and the ear touch-related information are separately generated, an identifier (ID) for matching between the touch position indication information and the ear touch-related information may be included in the packet.

Referring again to FIG. 3, in step 305, the processor 120 identifies at least one of motion information or posture information about the electronic device by using at least one sensor module 176. The sensor module 176 may include various sensors that sense the motion information or the posture information about the electronic device. The sensor module 176 may transmit at least one 403 of the motion information or the posture information to the processor 120. The at least one of the motion information or the posture information may be used in an operation of identifying whether the electronic device satisfies a gesture or posture indicating whether a call is being made. For example, the user may bring the electronic device near an ear to receive a call, and motion information about the electronic device may be recognized in advance in the process of moving the electronic device near the ear. In addition, when the user receives a call by using the electronic device, the electronic device may be maintained at or above a specific angle with respect to the ground because the electronic device is brought into close contact with the ear. The electronic device may store pre-identified motion information or posture information and identify whether the motion information or the posture information obtained through a sensor corresponds to the stored information. The electronic device may identify whether the user brings the terminal to the ear during the call or moves the terminal to the front of the eyes to continue using the screen during the call, based on the result of the identification. The electronic device may also identify whether a call is being received based on whether a call reception application is running or a value transmitted from the call reception application. The processor 120 may identify whether a gesture corresponding to call reception has been detected by additionally using information indicating whether the face is near, using at least one of an IR sensor or a grip sensor.

In step 307, the processor 120 identifies whether to switch the display to an off state based on at least one of the ear touch-related information, the motion information, or the posture information. When identifying that an ear touch has occurred and identifying that a call is being received based on at least one of the motion information or the posture information, the electronic device may determine to switch the display to the off state. When identifying that an ear touch has occurred, the electronic device may determine to switch the display to the off state without using the motion information or the posture information. In this case, step 305 may be skipped. As will be described below in more detail, the electronic device may use any one of the motion information and the posture information or may not use either the motion information or the posture information according to ear touch types.

In step 309, the electronic device may switch the display to the off state based on the identification. The processor 120 may transmit a control signal 410 to the display driver IC 230, and the display driver IC 230 may switch the display 210 to the off state based on the received control signal 410. The electronic device may be configured to switch the display 210 to the off state based on the operations of FIG. 3, when the phone application is running. The off state of the display 210 may be expressed as a low power mode.

The order of the various operations of FIG. 3 is not limited, and in FIG. 3, an operation illustrated as performed earlier (e.g., step 303) may be performed later than an operation illustrated as performed later (e.g., step 305). In addition, at least some of the various operations of FIG. 3 may be performed simultaneously. In addition, another operation may be interposed between two adjacent operations of FIG. 3. Alternatively, at least one operation of FIG. 3 may not be performed. These alternatives may be applied to all of flowcharts of the disclosure.

Figure 5:
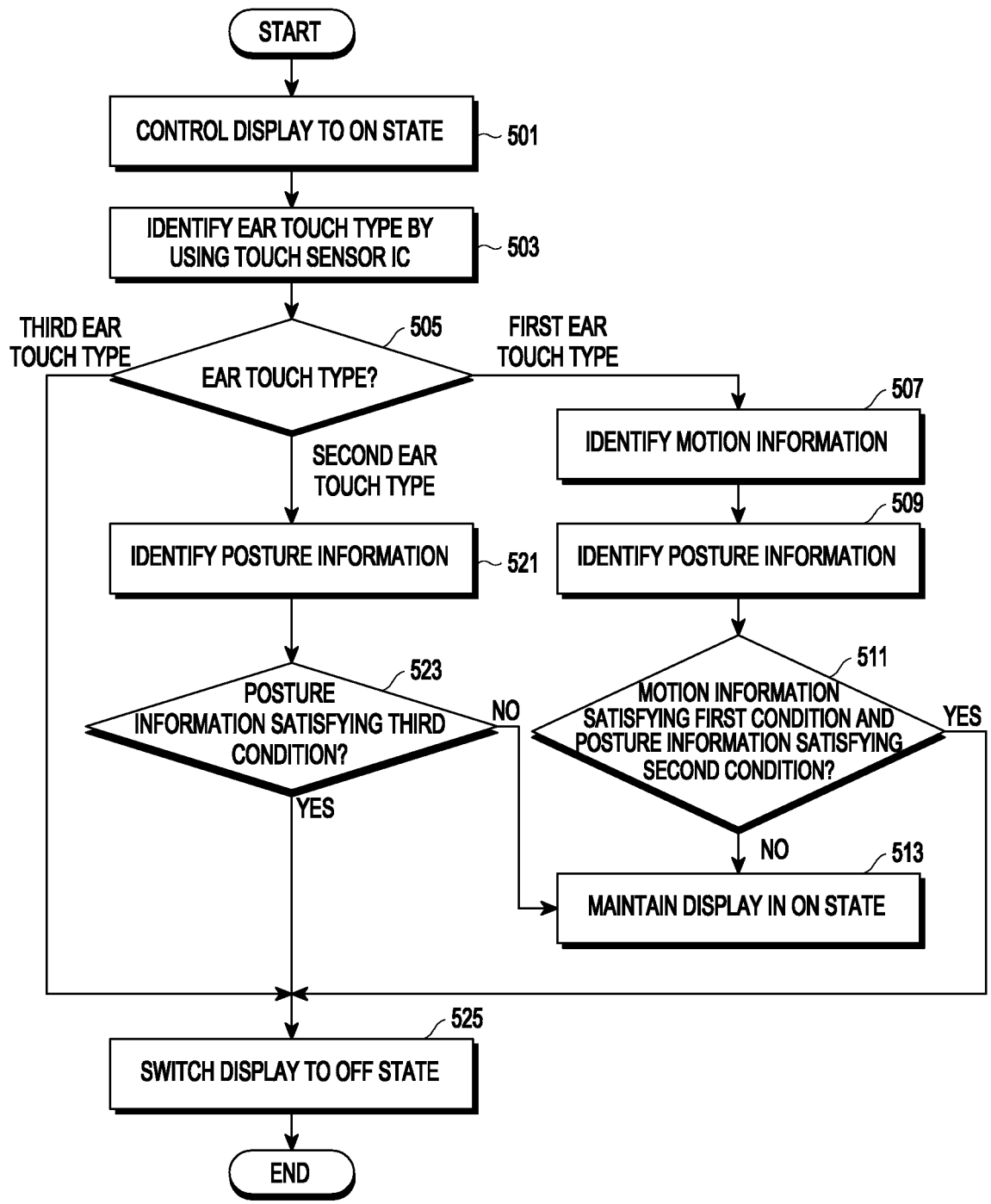
FIG. 5 is a flowchart illustrating a method of operating an electronic device, according to an embodiment.

FIG. 5 is a flowchart illustrating a method of operating an electronic device, according to an embodiment.

Referring to FIG. 5, an electronic device (e.g., the processor 120) controls the display 210 to the on state in step 501.

In step 503, the electronic device identifies an ear touch type by using the touch sensor IC 253. The electronic device may define different types of ear touches, e.g., three ear touch types. The three ear touch types depend on the user's body parts that touches the electronic device.

The three ear touch types may have different reliabilities. For example, the reliability of a first ear touch type may be lowest, the reliability of a third ear touch type may be highest, and the reliability of a second ear touch type may be between the reliability of the first ear touch type and the reliability of the third ear touch type.

The reliability of an ear touch type is the reliability of whether the user's ear is touching the electronic device, and may be simply for illustrative purposes. The electronic device may not define or manage the reliability of each ear touch type.

When the reliability of an ear touch type is low, the electronic device may use information from a sensor other than the touch sensor IC 253 to identify whether to switch the display 210 to the off state, e.g., to prevent the display 210 from being switched to the off state, for an ear touch type with low reliability.

In step 505, the electronic device identifies the ear touch type and perform a different operation for each ear touch type. Step 505 is simply used to describe branching into the types. After step 503, the electronic device may directly perform an operation corresponding to the ear touch type without performing operation 505. [인용표1] When determining that the ear touch type is the first ear touch type with the lowest reliability, the electronic device identifies motion information in step 507. For example, the electronic device may identify motion information from a time before the first ear touch type occurred to a time when the first ear touch type occurred.

In step 509, the electronic device identifies posture information about the electronic device. For example, the electronic device may identify posture information about the electronic device after the first ear touch occurred. The above-described time of identifying information in steps 507 and 509 is merely exemplary, and the identification time is not limited.

In step 511, the electronic device identifies whether the motion information satisfies a first condition and the posture information satisfies a second condition. The first condition relates to whether the motion information corresponds to preset motion information corresponding to a motion that the user makes to answer a call, and satisfaction of the first condition may indicate that the motion information about the electronic device corresponds to the preset motion information. The second condition relates to whether the posture information is within a preset range corresponding to a posture that the electronic device takes when the user picks up the electronic device to answer a call. Satisfaction of the second condition may indicate that the posture information falls within a preset range.

When identifying that the motion information satisfies the first condition and the posture information satisfies the second condition in step 511, the electronic device switches the display 210 to the off state in step 525. However, when identifying that the first condition is not satisfied or the second condition is not satisfied in step 511, the electronic device maintains the display 210 in the on state in step 513.

When determining that the ear touch type is the second ear touch type having the second lowest reliability in step 503, the electronic device identifies posture information in step 521.

In step 523, the electronic device identifies whether the posture information satisfies a third condition. The third condition may relate to whether the posture information corresponds to pre-identified posture information corresponding to a posture that the user takes to answer a call. As will be described below in more detail, since the user takes different postures to answer a call for the first ear touch type and the second ear touch type, postures configured for comparison in the second condition and the third condition (e.g., angles at which the electronic device is held) may be different. Since the second ear touch type has higher reliability than the first ear touch type, the electronic device may additionally consider one piece of information (e.g., motion information or posture information) to switch the display 210 to the off state. Identifying whether the motion information satisfies the third condition in step 523 is merely exemplary, and alternatively, when identifying the second ear touch type in step 503, the electronic device may be configured to identify whether to switch the display 210 to the off state based on whether the posture information satisfies the second condition.

When identifying that the third condition is not satisfied in step 523, the electronic device maintains the display 210 in the on state in step 513. However, when identifying that the third condition is satisfied in step 523, the electronic device switches the display 210 to the off state in step 525.

When determining that the ear touch is the third ear touch type having the highest reliability in step 503, the electronic device switches the display 210 to the off state, without considering additional information, in step 525.

While FIG. 5 illustrates three ear touch types, the number of ear touch types is not limited thereto. Further, motion information and posture information considered for an ear touch type with low reliability are also exemplary, and various types of information, other than the motion information and the posture information, may be considered for determining whether to switch the display 210 to the off state.

Figure 6A:
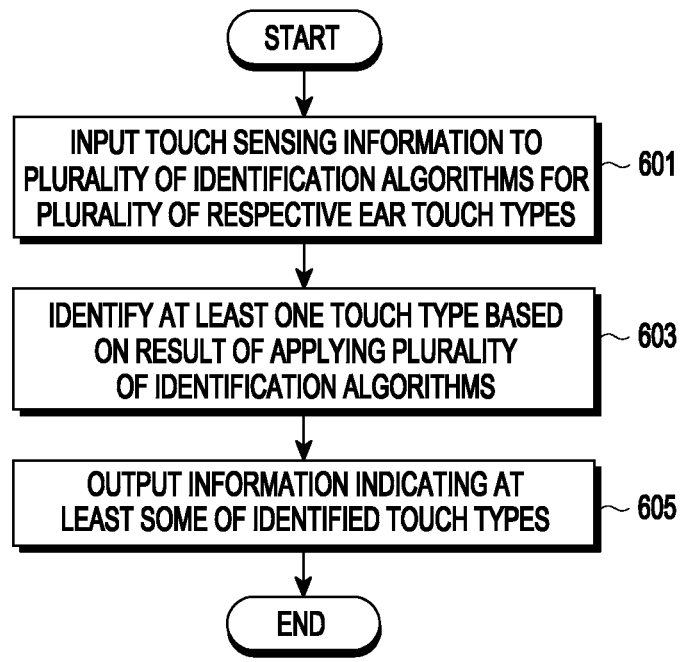
FIG. 6A is a flowchart illustrating a method of operating an electronic device, according to an embodiment.

FIG. 6A is a flowchart illustrating a method of operating an electronic device, according to an embodiment.

Referring to FIG. 6A, the electronic device (e.g., the touch sensor IC 253) inputs touch sensing information to a plurality of identification algorithms for a plurality of respective touch types in step 601. The plurality of identification algorithms are merely conceptual for describing an algorithm configured for each touch type. The plurality of touch types may be implemented as one algorithm including a set of sub-algorithms. The touch sensing information may include the sensitivity of each node (or coordinates) of the touch sensor 251. The plurality of identification algorithms may correspond to the plurality of ear touch types (e.g., the first ear touch type, the second ear touch type, and the third ear touch type in FIG. 5).

At least a part of the touch sensing information, i.e., the sensitivities of at least some of all the nodes of the touch sensor 251 may be input to each of the plurality of identification algorithms. The touch sensor IC 253 may receive the touch sensing information from the touch sensor 251 or generate the touch sensing information based on information received from the touch sensor 251.

In step 603, the touch sensor IC 253 identifies at least one touch type based on the result of applying the plurality of identification algorithms.

In step 605, the touch sensor IC 253 outputs information indicating at least some of the identified touch types. For example, when there is one identified ear touch type, information indicating the identified ear touch type may be output. When a plurality of ear touch types are identified, the touch sensor IC 253 may output information indicating all of the identified ear touch types or select an ear touch type and output information indicating the selected ear touch type according to priority. For example, the touch sensor IC 253 may preset the priorities of the ear touch types in order of higher reliability. As illustrated in FIG. 5, the processor 120 may determine whether to control the display 210 to the off state by using additional information or using the ear touch type alone, based on the identified ear touch type.

Figure 6B:
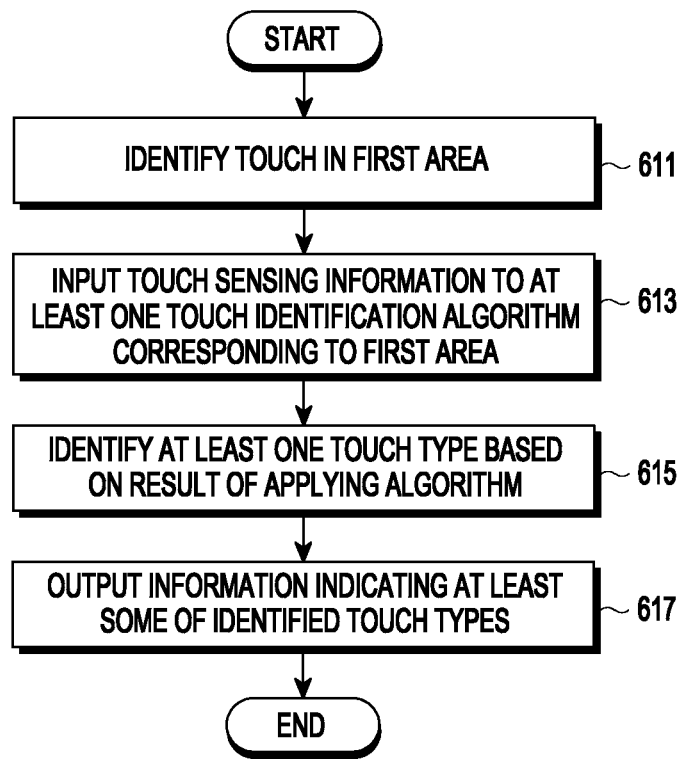
FIG. 6B is a flowchart illustrating a method of operating an electronic device, according to an embodiment.

FIG. 6B is a flowchart illustrating a method of operating an electronic device, according to an embodiment.

Referring to FIG. 6B, in step 611, an electronic device (e.g., the touch sensor IC 253) identifies a touch in a first area. The touch sensor IC 253 may identify the position of a touch point based on touch sensing information, and thus identify an area including the current touch point. The electronic device may store information about areas of the touch sensor 251 by mapping the areas to the respective ear touch types.

In step 613, the electronic device inputs the touch sensing information to at least one touch identification algorithm corresponding to a first area. As described above, areas of the touch sensor 251 may correspond to the respective ear touch types, and the electronic device may identify an identification algorithm corresponding to the current touch point.

In step 615, the electronic device identifies at least one touch type based on the result of applying the algorithm.

In step 617, the electronic device outputs information indicating at least some of the identified touch types. For example, when identifying that a touch has occurred in nodes included in top four adjacent columns of the touch sensor 251, the electronic device may input the touch sensing information to the algorithm for identifying whether the touch is the first ear touch type described with reference to FIG. 5 and identify whether the touch is the first ear touch type based on the result of the identification.

Figure 7A:
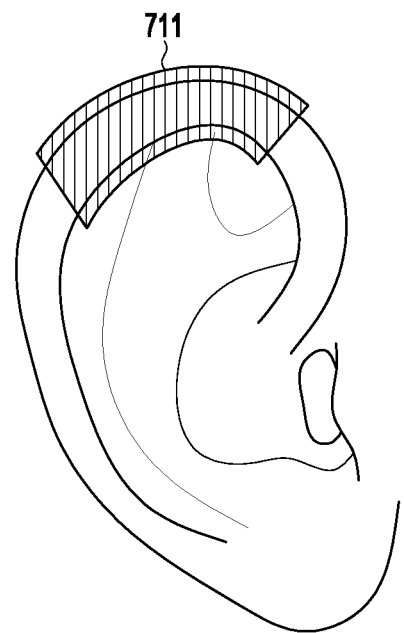
FIG. 7A illustrates a user's ear.
Figure 7B:
FIG. 7B illustrates a first ear touch type, according to an embodiment.

FIG. 7A illustrates a user's ear. FIG. 7B illustrates a first ear touch type, according to an embodiment.

Referring to FIG. 7A, a top end of the ear may be referred to as a helix 711.

Referring to FIG. 7B, the user may receive a call by holding the electronic device 101 with a part of the helix 711 touching the front surface of the electronic device 101. In this case, at least a part of the helix 711 (or an antihelix or a part of an earflap) may touch a part of the front surface of the electronic device 101 where the speaker is located, i.e., an area adjacent to the top end of the front surface of the electronic device 101. The ear touch type in the situation illustrated in FIG. 7B may be defined as the first ear touch type. The touch sensor IC 253 may identify a touch only in a part of the area adjacent to the top end of the touch sensor 251 in the touch situation illustrated in FIG. 7B. The electronic device 101 may generally map a function to a touch gesture with respect to a top end portion of the touch sensor 251. For example, the electronic device 101 may display a notification bar in response to a downward drag from the top end portion. Accordingly, the electronic device 101 may pre-store the identification algorithm for the first ear touch type that distinguishes the gesture defined for the top end portion from an ear touch.

Figure 8A:
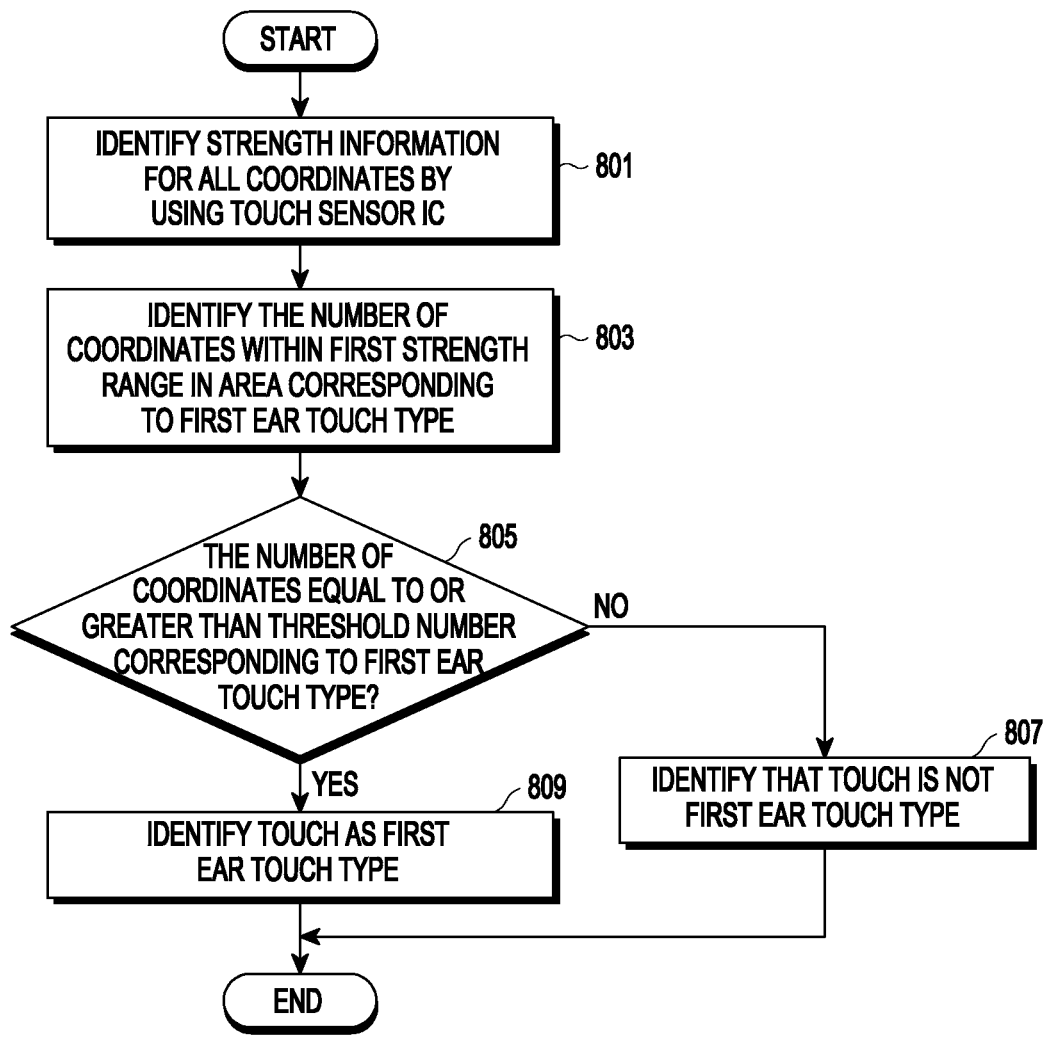
FIG. 8A is a flowchart illustrating a method of operating an electronic device, according to an embodiment.

FIG. 8A is a flowchart illustrating a method of operating an electronic device, according to an embodiment.

Referring to FIG. 8A, the electronic device 101 (e.g., the touch sensor IC 253) identifies information about the sensitivity of each of all nodes by using the touch sensor IC 253 in step 801. The touch sensor IC 253 may identify sensitivity information about the nodes based on output information from the touch sensor 251 or receive the sensitivity information about the nodes from the touch sensor 251.

In step 803, the electronic device 101 identifies the number of nodes belonging to a first sensitivity range in the area corresponding to the first ear touch type. The area corresponding to the first ear touch type may be preset as an area which at least a part of the helix 711 touches, for the first ear touch type. For example, the area corresponding to the first ear touch type may be configured as nodes within top four columns among a plurality of nodes. An area for each ear touch type may be referred to as a valid area. The electronic device 101 may identify the number of nodes having sensitivities belonging to the first sensitivity range among the nodes in the corresponding area. The first sensitivity range may be set to a range from which a hand touch may be excluded.

The electrical characteristics of the human hand may be different from the electrical characteristics of the human ear. When the human hand touches the touch sensor 251, a larger value may be measured than when the human ear touches the touch sensor 251. Accordingly, the first sensitivity range may be a range from which a value resulting from a human hand touch may be excluded, and thus may be less than or equal to a second threshold. Further, the first sensitivity range may be greater than or equal to a first threshold. The first threshold may be set to a value based on which noise is excluded, and the second threshold may be set to a value based on which an ear touch other than a hand touch may be identified. The electronic device 101 may exclude a hand touch simply by identifying the number of nodes belonging to the first sensitivity range.

In step 805, the electronic device 101 identifies whether the number of nodes is greater than or equal to a threshold number corresponding to the first ear touch type. The threshold number corresponding to the first ear touch type may be the number of nodes identified as touched when the user touches the ear as illustrated in FIG. 7B according to an experiment.

When identifying that the number of nodes is less than the threshold number corresponding to the first ear touch type in step 805, the electronic device 101 identifies that the touch is not the first ear touch type in step 807. However, when identifying that the number of nodes is greater than or equal to the threshold number corresponding to the first ear touch type, the electronic device 101 identifies that the touch is the first ear touch type in step 809.

Alternatively, the electronic device 101 may identify that the touch is the first ear touch type, when the number of nodes falls within a threshold range. When the number of nodes is too large, there is a possibility that the touch has been made by an object other than the ear. Therefore, the electronic device 101 may be configured to identify that the touch is the first ear touch type, when the number of nodes is within the threshold range.

Figure 8B:
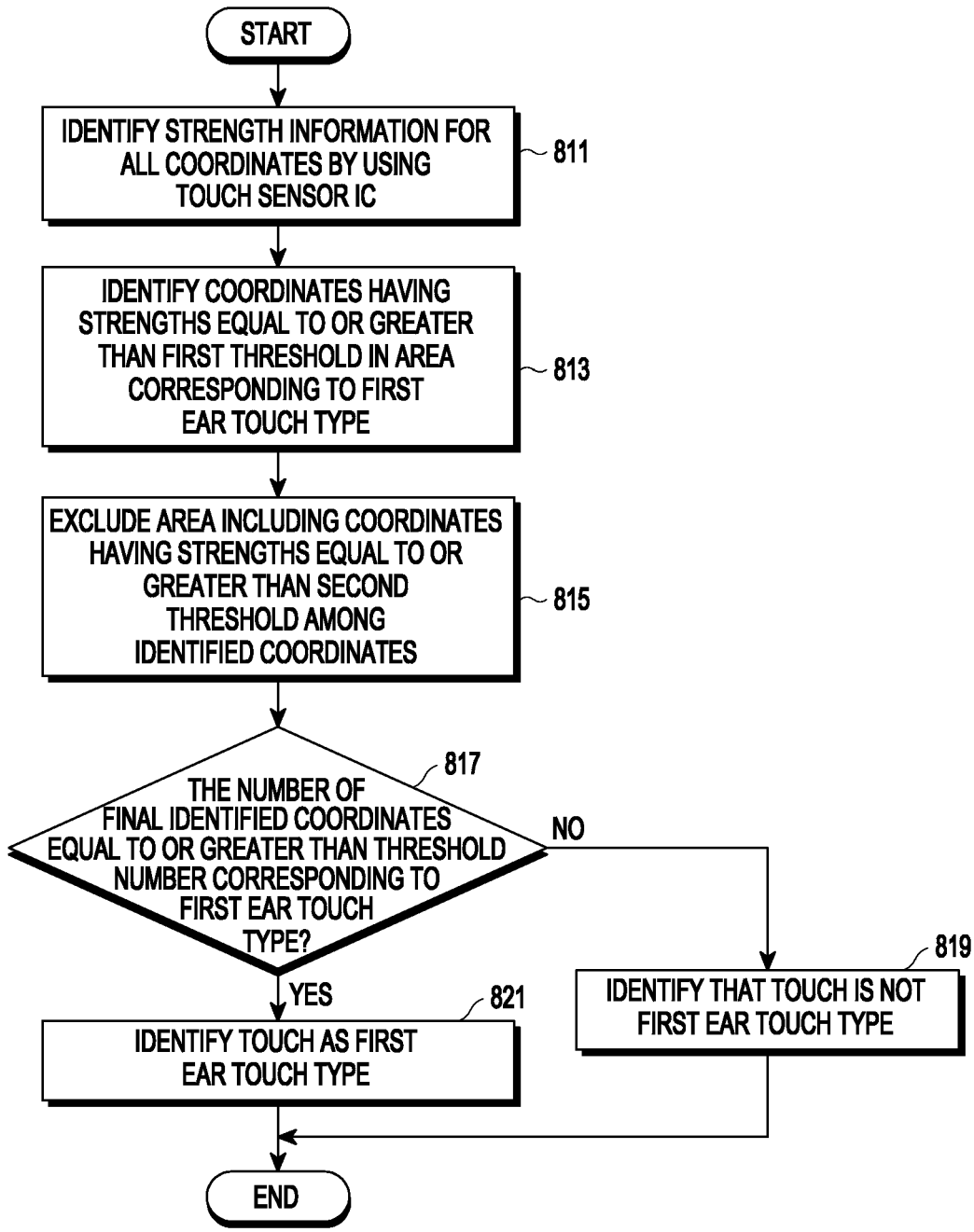
FIG. 8B is a flowchart illustrating a method of operating an electronic device, according to an embodiment.

FIG. 8B is a flowchart illustrating a method of operating an electronic device, according to an embodiment.

Referring to FIG. 8B, the electronic device 101 identifies sensitivity information about the entire nodes by using the touch sensor IC 253 in step 811.

In step 813, the electronic device 101 identifies nodes having sensitivities greater than or equal to the first threshold in the area corresponding to the first ear touch type.

In step 815, the electronic device 101 excludes an area including a node having a sensitivity greater than or equal to the second threshold among the identified nodes from the area identified in step 813. When the sum of the values of at least some nodes among nodes at left/right/top/bottom neighbor coordinates of a node having a local peak value exceeds a threshold, the electronic device 101 may be configured to exclude an area including the peak value. Even though the value of the corresponding node does not exceed the threshold, the area including the peak value may be excluded. This operation may be performed to exclude a part exceeding the threshold of a hand touch, and also a surrounding area of the hand touch, when it is identified that the hand touch has been made. In step 815, a hand touch area may be excluded.

In step 817, the electronic device 101 identifies whether a finally identified number of nodes is greater than or equal to the threshold number corresponding to the first ear touch type.

When identifying that the number of nodes is less than the threshold number corresponding to the first ear touch type, the electronic device 101 identifies that the touch is not the first ear touch type in step 819. However, when identifying that the number of nodes is greater than or equal to the threshold number corresponding to the first ear touch type, the electronic device 101 identifies that the touch is the first ear touch type in step 821.

Further, as described with reference to FIG. 8A, when the number of nodes falls within the threshold range, the electronic device 101 may identify that the first ear touch type has occurred.

Table 1 provides an example of an algorithm for identifying whether a touch is the first ear touch type according to at least a part of FIG. 8A or FIG. 8B.

TABLE 1

Conditions satisfied: 1 && 2 && 3 && 4

0. Valid area: top 4-channel area
1. Three or more nodes exceeding sensitivity 30
2. If {(Peak + top + bottom) or (Peak + left + right)} of object >= 500, exclude size 5 × 5
3. If {(Peak + top + bottom) or (Peak + left + right)} of object >= 245, exclude size 3 × 3
4. Larger touch area than bottom area (other than top 12 channels)

As noted from Table 1, the electronic device 101 may identify node included in the channels of top four columns in the touch sensor 251 as a valid area. Condition 1 may be a condition for determining whether the number of nodes having sensitivities (i.e., coordinate values) exceeding 30 is 3 or larger. Condition 2 may be a condition for excluding 5×5 nodes, i.e., 25 nodes around a peak node, when the sum of the sensitivity values of three nodes, i.e., the peak node having a local peak value, a top neighbor node (top) of the peak node, and a bottom neighbor node (bottom) of the peak node is greater than or equal to 500 or when the sum of the sensitivity values of three nodes, i.e., the peak node, a left neighbor node (left) of the peak node, and a right neighbor node (right) of the peak node is greater than or equal to 500. Condition of 3 may be a condition for excluding 3×3 nodes, i.e., 9 nodes around the peak node, when the sum of the sensitivity values of three nodes, i.e., the peak node having the local peak value, the top neighbor node (top) of the peak node, and the bottom neighbor node (bottom) of the peak node is greater than or equal to 245 or when the sum of the sensitivity values of three nodes, i.e., the peak node, the left neighbor node (left) of the peak node, and the right neighbor node (right) of the peak node is greater than or equal to 245. Condition 4 is that a touch area in a top end area (i.e., nodes included in the channels of top 12 columns) is larger than a touch area in a bottom end area (i.e., nodes except for the nodes included in the channels of the top 12 columns). When conditions 1, 2, and 3 are satisfied and condition 4 is simultaneously satisfied in the valid area, the electronic device 101 may identify that the first ear touch type has occurred.

FIG. 9A illustrates a basic form of a first ear touch type according to an embodiment. Specifically, FIG. 9A illustrates sensitivity values of respective nodes of the touch sensor 251, according to an embodiment.

Referring to FIG. 9A, nodes included in the top four columns of channels may be a valid area 901 for identifying the first ear touch type. When the user touches the ear in the manner illustrated in FIG. 7B, nodes having relatively low sensitivity values (e.g., less than 250) may be generated, such as dotted parts 902 in FIG. 9A. The electronic device 101 may generate an identification algorithm as illustrated in Table 1, e.g., based on the data illustrated in FIG. 9A.

FIG. 9B illustrates measured touch sensing information, according to an embodiment.

Referring to FIG. 9B, the electronic device 101 may identify that three dotted nodes 911 have values exceeding 30 in touch sensing information. The electronic device 101 may identify that the touch sensing information of FIG. 9B satisfies conditions 1 to 4 in Table 1, and thus, identify that the touch is the first ear touch type. As described above, the electronic device 101 may further identify additional information to identify whether to control the display 210 to the off state, based on the first ear touch type.

Figure 9C:
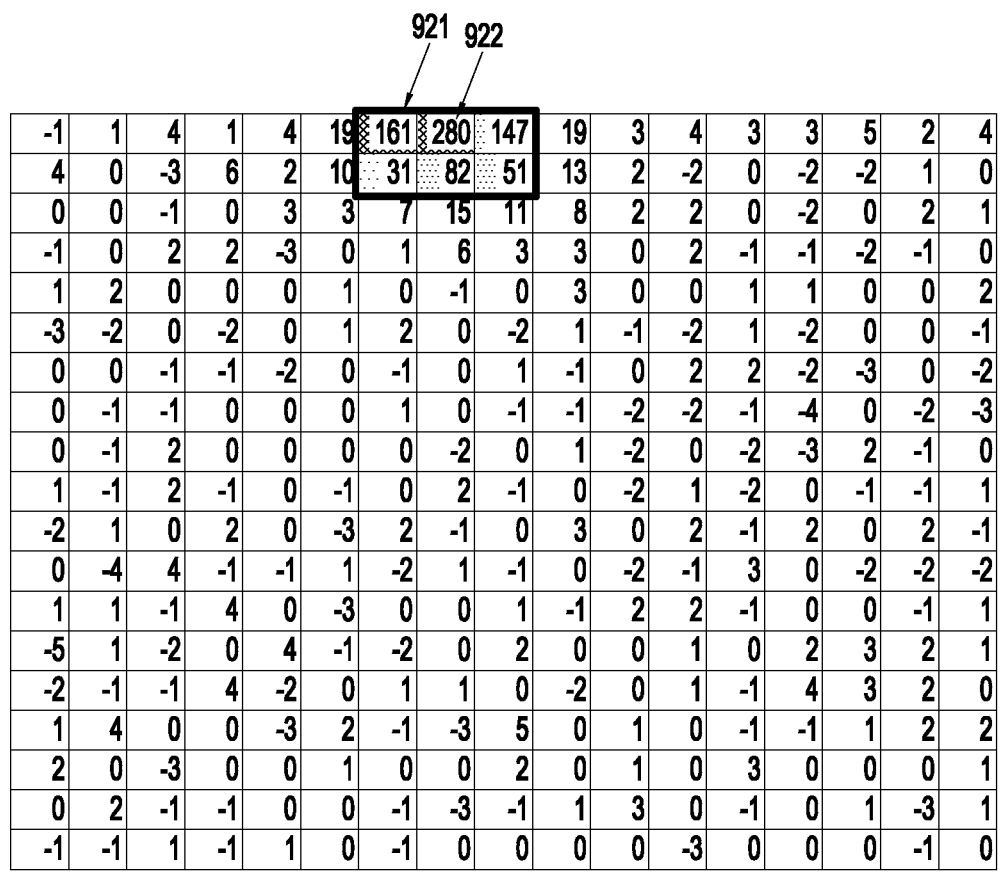
FIG. 9C illustrates touch sensing information measured when a user makes a hand touch.

FIG. 9C illustrates touch sensing information measured when a user makes a hand touch.

Referring to FIG. 9C, when the user makes a hand touch, the sensitivity values of nodes in an area 921 may exceed 30. The electronic device 101 may identify that the sum 161+280+147(=588) of the sensitivity values of three nodes, i.e., a peak node 922 and the left and right nodes of the peak node 922 is greater than or equal to 500 and exclude the nodes of a 5×5 area including the peak node 922 according to condition 2 in Table 1. Accordingly, the electronic device 101 may identify that the number of nodes exceeding 30 in the valid area is 0, and thus, identify that the first ear touch type has not occurred. Accordingly, the electronic device 101 may maintain the display 210 in the on state. The touch circuit 250 may transmit, e.g., information about the position of the peak node 922 as information indicating a touch position to the processor 120, and the processor 120 may allocate the information indicating the touch position to an application in the foreground. Accordingly, switching of the display 210 to the off state may be prevented, which might otherwise be caused by a user hand touch.

FIG. 9D illustrates touch sensing information measured when a user makes a plurality of hand touches.

Referring to FIG. 9D, when the user makes a plurality of hand touches, the sensitivity values of some nodes in areas 931 and 933 may exceed 30. The electronic device 101 may identify that the sum 97+295+238(=630) of the sensitivity values of three nodes, i.e., a peak node 932 and the left and right nodes of the peak node 932 is greater than or equal to 500. The electronic device 101 may identify that the sum 278+340+237(=855) of the sensitivity values of three nodes, i.e., a peak node 934 and the left and right nodes of the peak node 934 is greater than or equal to 500. The electronic device 101 may exclude the nodes of a 5×5 area 931 including the peak node 932 and the nodes of a 5×5 area 933 including the peak node 934 according to condition 2 in Table 1. Accordingly, the electronic device 101 may identify that the number of nodes with sensitivity values exceeding 30 in the valid area is 0, and thus, identify that the first ear touch type has not occurred. Accordingly, the electronic device 101 may maintain the display 210 in the on state. The touch circuit 250 may transmit, e.g., information about the positions of the peak node 932 and the peak node 934 as information indicating a plurality of touch positions to the processor 120, and the processor 120 may allocate the information indicating the plurality of touch positions to an application in the foreground. Accordingly, switching of the display 210 to the off state may be prevented, which might otherwise be caused by a user hand touch.

Figure 10:
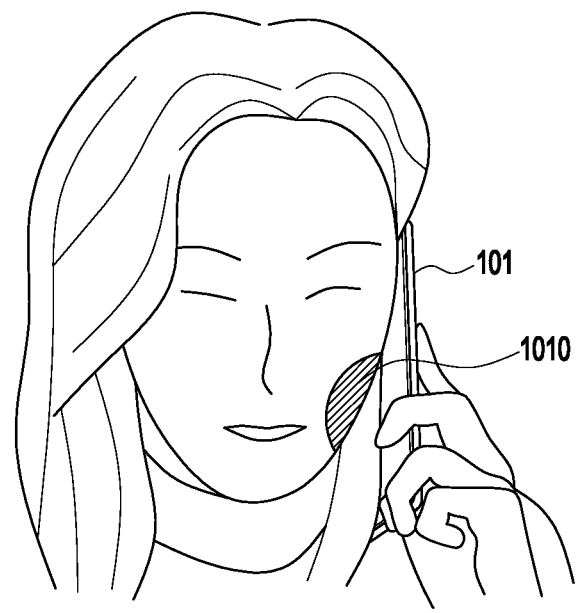
FIG. 10 illustrates a second ear touch type.

FIG. 10 illustrates a second ear touch type, according to an embodiment.

Referring to FIG. 10, the user may receive a call by putting the electronic device 101 in close contact with an ear. However, the user's cheek 1010 may not touch the electronic device 101. The ear touch type in the situation illustrated in FIG. 10 may be defined as the second ear touch type. In this case, a relatively large portion of the user's ear may touch the electronic device 101. Because a human ear generally has a plurality of protrusions, when the ear is touched as illustrated in FIG. 10, the electronic device 101 may detect a plurality of objects corresponding to the plurality of protrusions. Herein, an object may be a set of adjacent nodes identified as being touched.

The electronic device 101 may generally map a function to detection of a plurality of objects. For example, the electronic device 101 provides a function of reducing or enlarging a screen being displayed, in response to a pinch-in or pinch-out gesture. Accordingly, the electronic device 101 may store an identification algorithm for the second ear touch type, which distinguishes a multi-touch gesture from an ear touch.

Figure 11A:
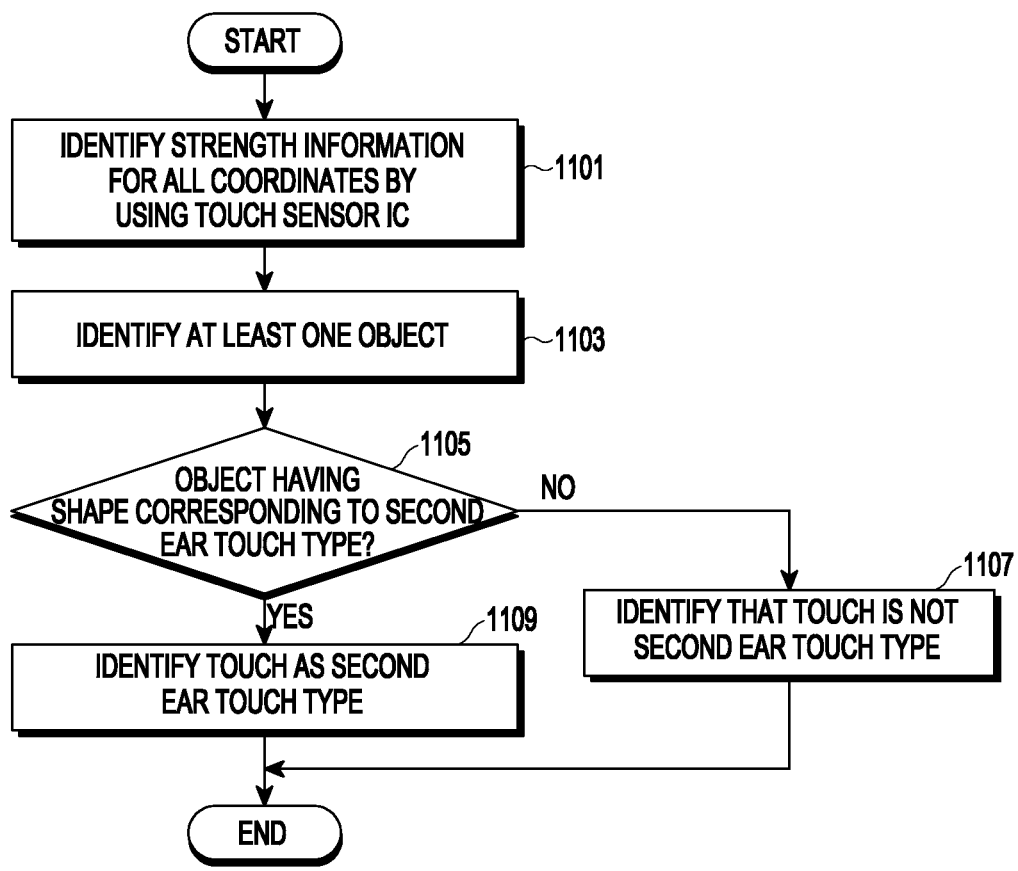
FIG. 11A is a flowchart illustrating a method of operating an electronic device, according to an embodiment.

FIG. 11A is a flowchart illustrating a method of operating an electronic device, according to an embodiment.

Referring to FIG. 11A, the electronic device 101 (e.g., the touch sensor IC 253) identifies sensitivity information about the entire nodes by using the touch sensor IC 253 in step 1101.

In step 1103, the electronic device 101 identifies at least one object.

In step 1105, the electronic device 101 identifies whether an identified object has a shape corresponding to the second ear touch type. The electronic device 101 may identify an object with a major axis-to-minor axis ratio greater than or equal to a threshold ratio (e.g., 2) as an object having the shape corresponding to the second ear touch type. When a protrusion of the human ear touches the touch screen, the major axis-to-minor axis ratio may be detected as greater than the threshold ratio, whereas when a finger touches the touch screen, the major axis-to-minor axis ratio may be detected as less than the threshold ratio. The threshold ratio may be set to an empirical ratio based on which an object being a protrusion of the ear may be distinguished from an object being a finger. The major axis-to-minor axis ratio is merely exemplary for classification, and the shape characteristics for distinguishing the finger from a protrusion of the ear are not limited.

When not identifying an object having the shape corresponding to the second ear touch type in step 1105, the electronic device 101 identifies that the touch is not the second ear touch type in step 1107. When identifying that there is an object having the shape corresponding to the second ear touch type in step 1105, the electronic device 101 identifies that the touch is the second ear touch type in step 1109.

Figure 11B:
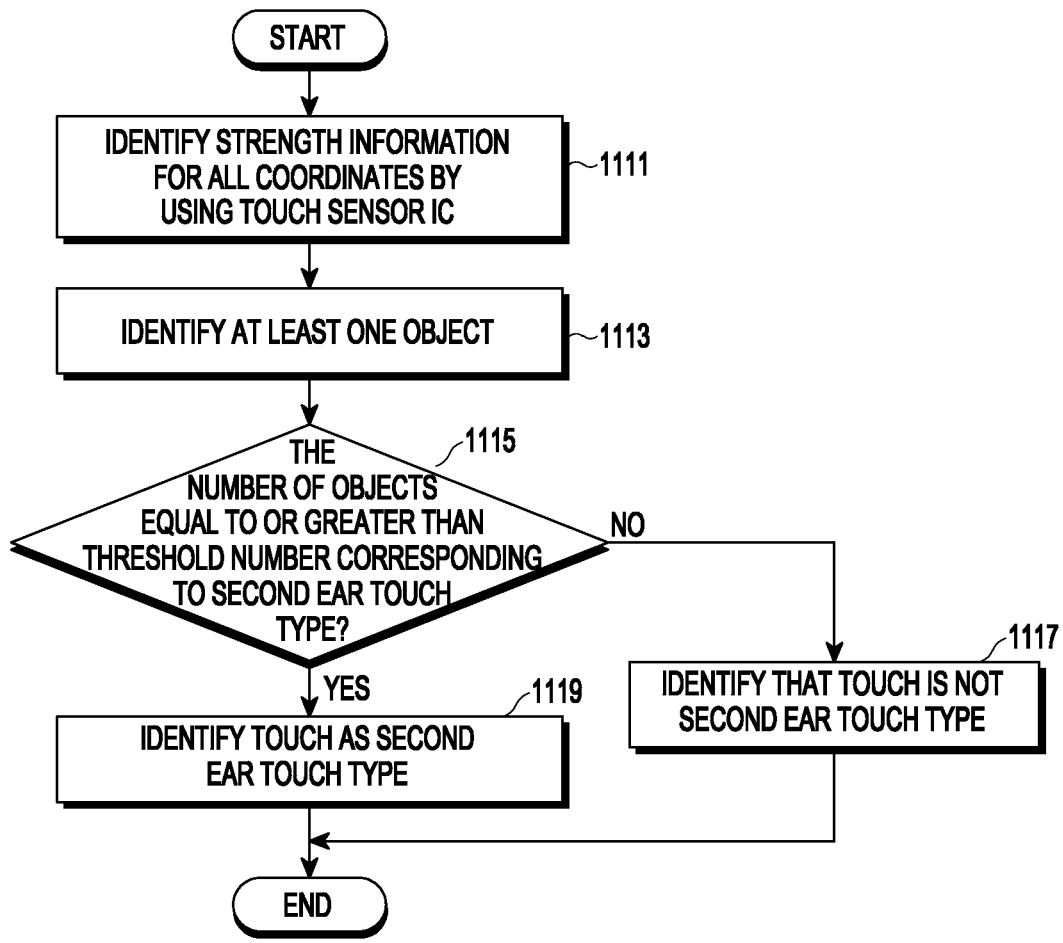
FIG. 11B is a flowchart illustrating a method of operating an electronic device, according to an embodiment.

FIG. 11B is a flowchart illustrating a method of operating an electronic device, according to an embodiment.

Referring to FIG. 11B, in step 1111, the electronic device 101 identifies sensitivity information about the nodes by using the touch sensor IC 253.

In step 1113, the electronic device 101 identifies at least one object.

In step 1115, the electronic device 101 identifies whether the number of identified objects is greater than or equal to a threshold number corresponding to the second ear touch type. For example, the electronic device 101 may manage a maximum number of objects allocated for multiple touches. The threshold number corresponding to the second ear touch type may be greater than the maximum number of objects allocated for multiple touches.

When identifying that the number of identified objects is not greater than or equal to the threshold number corresponding to the second ear touch type in step 1115, the electronic device 101 identifies that the touch is not the second ear touch type in step 1117. When identifying that the number of identified objects is greater than or equal to the threshold number corresponding to the second ear touch type in step 1115, the electronic device 101 identifies that the touch is the second ear touch type in step 1119. The electronic device 101 may identify that the second ear touch type has occurred in consideration of both the shape of an object and the number of objects.

Table 2 provides an example of an algorithm for identifying whether a touch is the second ear touch type according to at least a part of FIG. 11A or 11B.

TABLE 2

Conditions satisfied: 4 && {(1 && 2) || (1 && 3)}

0. Valid area: top 14-channel area, two channels at left and right ends excluded for grip processing
1. 16 or more nodes exceeding sensitivity 10
2. If there is object with major-minor difference being greater than or equal to 2, touch is identified as ear touch
3. If there are 3 or more objects, touch is identified as ear touch
4. The magnitude of touched peak node is 17 or greater and touch area in top 14 channels is larger than at bottom end As noted from Table 2, the electronic device 101 may set nodes included in the channels of top 14 columns in the touch sensor 251 as a valid area. Nodes included in the leftmost row channel and the rightmost row channel may be excluded from the valid area to exclude the user's finger touch accompanying the grip of the electronic device 101. Condition 1 may be a condition for determining whether the number of nodes having sensitivities exceeding 10 is greater than 16. Condition 2 may be a condition for identifying an ear touch, when an object having the difference between a major axis and a minor axis, i.e., a major axis-to-minor axis ratio being 2 or larger is detected. Condition 3 may be a condition for identifying an ear touch, when there are three or more objects. Condition 4 is that the value (magnitude) of a local peak node (i.e., peak coordinates) is greater than or equal to 17, and a touch area in a top end area (i.e., the nodes included in the channels of top 14 columns) is larger than a touch area in a bottom end area (i.e., nodes except for the nodes included in the channels of the top 14 columns). Objects having a peak node with a value less than 17 may be excluded according to condition 4, and a noise-based object may not be used in determining the number or shape of objects. When conditions 1 and 2 are satisfied, or conditions 1 and 3 are satisfied, and condition 4 is simultaneously satisfied, in the valid area, the electronic device 101 may identify that the second ear touch type has occurred.

FIG. 12A illustrates a basic form of a second ear touch type, according to various an embodiments. Specifically, FIG. 12A illustrates values of nodes in the touch sensor 251, according to an embodiment.

Referring to FIG. 12A, the nodes included in the channels of top 16 columns may be a valid area 1201 for determining the second ear touch type. For example, nodes included in the leftmost row channel of the valid area 1201 and nodes included in the rightmost row channel of the valid area 1201 may be excluded from the valid area 1201. When the user touches the ear without touching the cheek 1010 in the manner illustrated in FIG. 10, three objects 1202, 1203, and 1204 of FIG. 12A may be detected. At least some of the objects 1202, 1203, and 1204 may have a major axis-to-minor axis ratio being 2 or larger. The electronic device 101 or another electronic device may generate, e.g., an identification algorithm as illustrated in Table 2 based on the data illustrated in FIG. 12A.

FIG. 12B illustrates measured touch sensing information, according to an embodiment.

Referring to FIG. 12B, the electronic device 101 may identify touch sensing information and identify three objects 1211, 1213, and 1215 from the touch sensing information. The electronic device 101 may identify that condition 3 and condition 1 in Table 2 are satisfied, and condition 4 is also satisfied, and thus, identify that the second ear touch type has occurred. The electronic device 101 may determine whether to switch the display 210 to the off state by further considering motion information about the electronic device 101 identified from the motion sensor.

FIG. 12C illustrates touch sensing information measured when a user makes multiple hand touches, according to an embodiment.

Referring to FIG. 12C, the user may simultaneously touch two fingers on the touch screen. In this case, the electronic device 101 may identify touch sensing information as illustrated in FIG. 12C. The electronic device 101 may identify two objects 1221 and 1222 from the touch sensing information. The electronic device 101 may identify that the number of the identified objects 1221 and 1222 is less than 3, and the major axis-to-minor axis ratio of each of the objects 1221 and 1222 is less than 2, and thus, identify that the conditions of the identification algorithm in Table 2 are not satisfied. The touch circuit 250 may transmit information indicating the positions of the objects 1221 and 1222 to the processor 120, and the processor 120 may execute a function by using the information indicating the positions.

FIG. 12D illustrates touch sensing information measured when a user makes an ear touch, according to an embodiment.

Referring to FIG. 12D, the user may touch the ear to the touch screen without touching the cheek. That is, the electronic device 101 may identify touch sensing information as illustrated in FIG. 12D. The electronic device 101 may identify two objects 1231 and 1232 from the touch sensing information. The electronic device 101 identifies that the number of the identified objects 1231 and 1232 is less than 3. However, the electronic device 101 may identify that the major axis-to-minor axis ratio each of the objects 1232 is 2 or larger, and thus, identify that conditions of the identification algorithm in Table 2 are satisfied.

Figure 13:
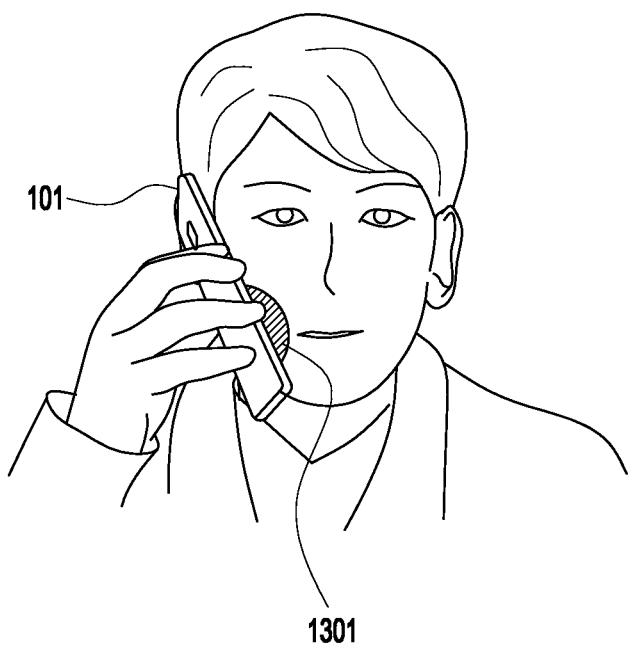
FIG. 13 illustrates a second ear touch type.

FIG. 13 illustrates a third ear touch type, according to an embodiment.

Referring to FIG. 13, the user may receive a call by putting the electronic device 101 in close contact with an ear. In addition, the user's cheek 1301 is also brought into close contact with the touch screen. The ear touch type in the situation illustrated in FIG. 13 may be defined as the third ear touch type. In this case, a relatively large portion of the user's ear and cheek 1301 may touch the electronic device 101.

A large-area object may be detected due to the touch of the cheek 1301. The electronic device 101 may generally map a function to detection of a large-area object. For example, when a touch and movement of a hand blade (i.e., a side of the hand) are detected, the electronic device 101 may provide a function of storing a captured image of a currently displayed screen. Accordingly, the electronic device 101 may store an identification algorithm for the third ear touch type, which distinguishes a large-area ear and cheek touch from a gesture made by a large-area hand touch.

Figure 14:
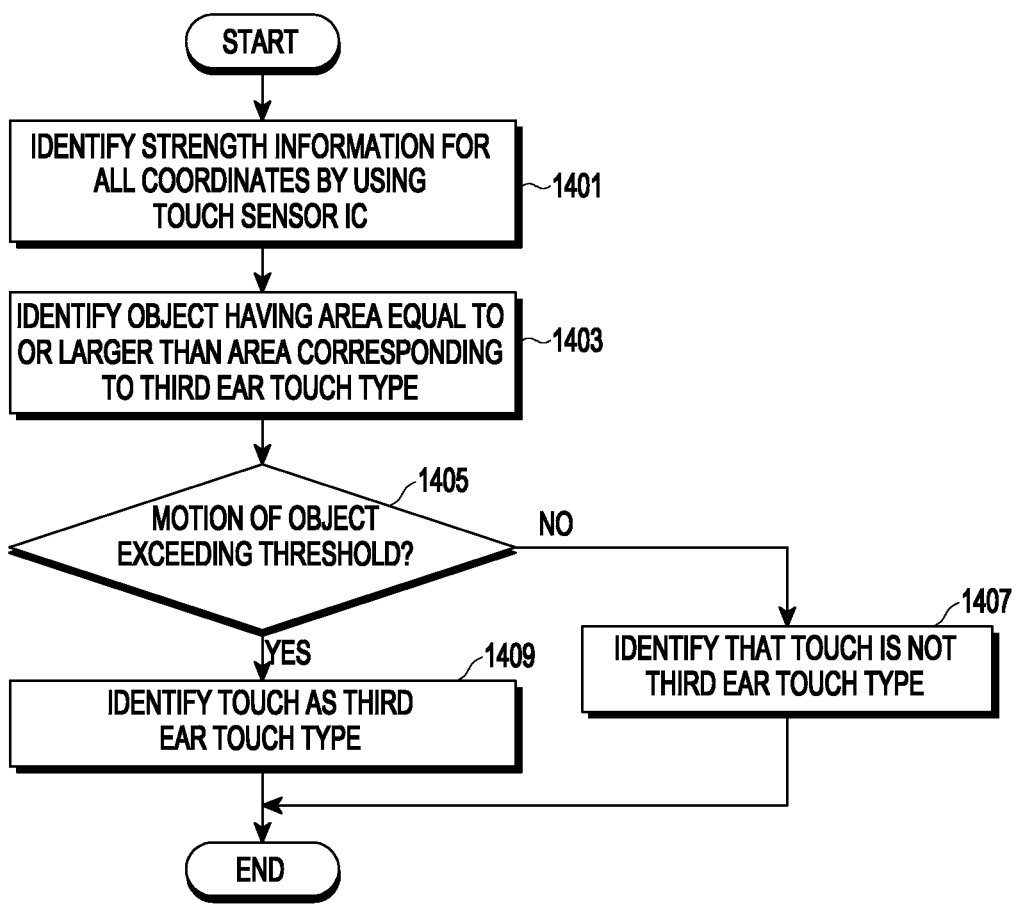
FIG. 14 is a flowchart illustrating a method of operating an electronic device, according to an embodiment.

FIG. 14 is a flowchart illustrating a method of operating an electronic device, according to an embodiment.

Referring to FIG. 14, the electronic device 101 (e.g., the touch sensor IC 253) identifies sensitivity information about the entire nodes by using the touch sensor IC 253 in step 1401.

In step 1403, the electronic device 101 identifies an object having an area greater than or equal to an area corresponding to the third ear touch type.

In step 1405, the electronic device 101 identifies whether a motion of the object exceeds a threshold. More specifically, the electronic device 101 may identify a plurality of pieces of time-series touch sensing information for a predetermined period of time. The electronic device 101 may detect an object from each of the plurality of pieces of touch sensing information and track the object accordingly. The electronic device 101 may identify motion information about the object based on the result of tracking the object.

When identifying that the motion of the object exceeds a threshold in step 1405, the electronic device 101 identifies that the touch is not the third ear touch type in step 1407. However, when identifying that the motion of the object does not exceed the threshold in step 1405, the electronic device 101 identifies that the touch is the third ear touch type in step 1409.

Table 3 provides an algorithm for identifying whether a touch is the third ear touch type according to at least a part of FIG. 14.

TABLE 3

Conditions satisfied: (1 && 2 && 3 && 4) ||
(2 seconds later && 1 && 3 && 4 &&5), 0. Valid area: total area
1. When cheek object is present [※ cheek object condition: number of touched nodes > 30 && sensitivity 100 or greater > 7 nodes && Major > 85]
2. When horizontal length of cheek object is greater than or equal to half (portrait mode Tx 11 channels, landscape mode Rx 11 channels)

TABLE 3-continued

Conditions satisfied: (1 && 2 && 3 && 4) ||
(2 seconds later && 1 && 3 && 4 &&5), 3. When movement distance of vertical 9 or more channels and movement distance of horizontal 6 or more channels are not detected for 320 ms in portrait mode
4. When no movement is made only in one direction for 320 ms (when backward movement is made during movement)
5. When condition 2 is not satisfied for 2 seconds, event is transmitted.

As noted from Table 3, the electronic device 101 may set the nodes of the entire area of the touch sensor 251 as a valid area. Condition 1 may be a condition for detecting a cheek object (i.e., an object corresponding to the third ear touch type). When the number of nodes included in an object exceeds 30, the number of nodes having sensitivities (i.e., magnitudes) greater than or equal to 100 within the object exceeds 7, and the major length (i.e., the number of nodes) of the object exceeds 85 nodes, the electronic device 101 may identify a cheek object. Condition 2 is that the width of the cheek object greater than or is equal to a half of the panel (i.e., touch sensor) (11 Tx channels in portrait mode and 11 Rx channels in landscape mode). Condition 3 is that a movement distance larger than or equal to 9 vertical channels (i.e., 9 nodes) and 6 horizontal channels (i.e., 6 nodes) has not been detected from the cheek object for 320 ms in the portrait mode. Condition 4 may be that a movement has not been made only in one direction for 320 ms, and eventually, a backward movement has been detected during the movement. Condition 5 is that condition 2 is not satisfied for 2 seconds. In this case, the event of occurrence of the third ear touch type may be transmitted. When conditions 1, 2, 3, and 4 are satisfied or conditions 1, 3, 4, and 5 are maintained for 2 seconds or longer, the electronic device 101 may identify that the third ear touch type has occurred. Accordingly, a gesture of moving a large area or a gesture of using a large area for a short time (e.g., palm mute) may be distinguished from an ear touch.

FIG. 15A illustrates a basic form of a third ear touch type, according to an embodiment. Specifically, FIG. 15A illustrates values of nodes in the touch sensor 251, according to an embodiment.

Referring to FIG. 15A, when the user touches the ear while touching the cheek 1301 in the manner illustrated in FIG. 13, a large-area object 1501 may be detected. The electronic device 101 may generate, e.g., an identification algorithm as illustrated in Table 3, e.g., based on the data illustrated in FIG. 15A.

FIG. 15B illustrates measured touch sensing information, according to an embodiment.

Referring to FIG. 15B, the electronic device 101 may identify touch sensing information and identify two objects 1511 and 1512 from the touch sensing information. The two objects 1511 and 1512 may be from the ear and the cheek, respectively. The electronic device 101 may identify that at least some of the two objects 1511 and 1512 satisfy the conditions of Table 3, and identify that the third ear touch type has occurred based on the identification.

After acquiring the touch sensing information as illustrated in FIG. 15B, the electronic device 101 may further obtain time-series touch sensing information continuously and track the objects 1511 and 1512. The electronic device 101 may identify that the conditions of Table 3 are satisfied based on the result of the tracking. The electronic device 101 may determine to switch the display 210 to the off state based on the occurrence of the third ear touch type.

FIG. 15C illustrates touch sensing information measured when a user's cheek is touched, according to an embodiment.

Referring to FIG. 15C, when receiving a call, some user may not touch the ear while touching the cheek on the touch screen. In this case, an object 1521 based on the cheek may be detected. The electronic device 101 may identify that at least a part of the single object 1521 satisfies the conditions of Table 3 and identify that the third ear touch type has occurred based on the identification.

After obtaining the touch sensing information as illustrated in FIG. 15C, the electronic device 101 may further obtain time-series touch sensing information continuously and track the object 1521. The electronic device 101 may identify that the conditions of Table 3 are satisfied based on the result of the tracking.

Figure 15D:
FIG. 15D illustrates touch sensing information measured when a user makes a hand blade touch, according to an embodiment.

FIG. 15D illustrates touch sensing information measured when a user makes a touch by a hand blade, according to an embodiment.

Referring to FIG. 15D, the user may input a swipe gesture using the hand blade. The electronic device 101 may obtain first touch sensing information 1530 at a first time t1 and second touch sensing information 1540 at a second time t2. The electronic device 101 may detect an object 1531 from the first touch sensing information 1530 and track the detected object 1531. The electronic device 101 may detect an object 1541 from the second touch sensing information 1540 and identify that the object 1541 corresponds to the object 1531. Based on the distance between the object 1531 and the object 1541, the electronic device 101 may identify that the conditions of the identification algorithm in Table 3 are not satisfied. The touch sensor IC 253 may identify that the third ear touch type has not occurred and transmit information about a large-area movement from the position of the object 1531 to the position of the object 1541 to the processor 120. The processor 120 may perform a function assigned to the large-area movement.

Figure 16:
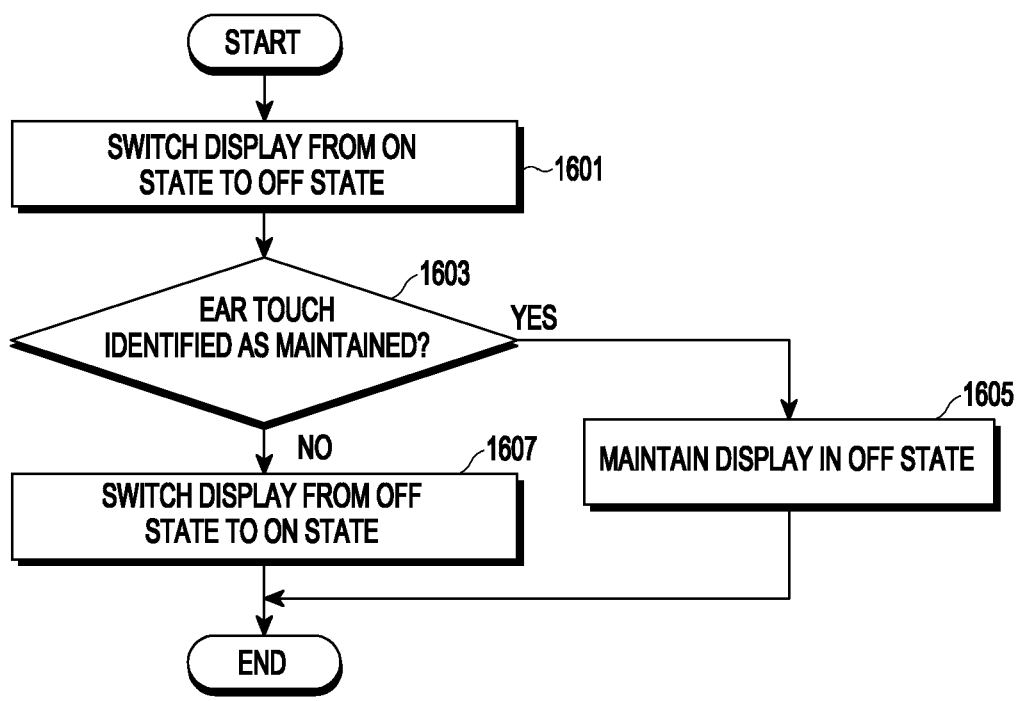
FIG. 16 is a flowchart illustrating a method of operating an electronic device, according to an embodiment.

FIG. 16 is a flowchart illustrating a method of operating an electronic device, according to an embodiment.

Referring to FIG. 16, the electronic device 101 (e.g., the processor 120) switches the display 210 from the on state to the off state in step 1601. As described above, when identifying that an ear touch has occurred, the electronic device 101 may switch the display 210 from the on state to the off state.

In step 1603, the electronic device 101 identifies whether the ear touch is maintained. For example, the touch sensor IC 253 may identify ear touch-related information even after the display 210 is controlled to the off state.

When identifying that the ear touch is maintained in step 1603, the electronic device 101 maintains the display 210 in the off state in step 1605. However, when identifying that the ear touch is not maintained in step 1603, the electronic device 101 switches the display 210 from the off state to the on state in step 1607.

The electronic device 101 may also obtain at least one of posture information or motion information by using at least one of a motion sensor or a geomagnetic sensor, in addition to the touch information, and identify whether the ear touch is maintained based on the obtained information. The electronic device 101 may further identify whether the user's face has been detected, i.e., whether the electronic device has been removed from the face, based on an image obtained by using at least one of an IR sensor or a camera sensor, in addition to the touch information, and identify whether the ear touch is maintained by additionally using the result of the identification.

As described above, ear touch-related information may indicate whether an ear touch has occurred and/or include information indicating an ear touch type. When the ear touch-related information indicates whether an ear touch has occurred, the touch sensor IC 253 may identify whether the condition for identifying a touch as an ear touch in at least a partial area of the touch sensor 251 is maintained to identify whether the ear touch is maintained. When identifying that the ear touch is no longer maintained, the touch sensor IC 253 may transmit information indicating that an ear touch has not occurred to the processor 120.

When the ear touch-related information indicates whether an ear touch has occurred, the touch sensor IC 253 may transmit information indicating the first, second, or third ear touch type associated with the occurrence of the ear touch and then input touch sensing information to an identification algorithm corresponding to a fourth ear touch type. The fourth ear touch type may indicate that the user's ear is in contact. As a result of applying the identification algorithm, when identifying that the ear is not in contact, the touch sensor IC 253 may output a fifth ear touch type, and the fifth ear touch type may indicate an ear touch release. When identifying the fourth ear touch type, the processor 120 may maintain the display 210 in the off state. When identifying the fifth ear touch type, the processor 120 may switch the display 210 to the on state.

Even when identifying the fifth ear touch type, the processor 120 may determine whether to switch the display 210 to the on state by further considering additional information (e.g., at least one of motion information or posture information). For example, upon completion of call reception, the user may move the electronic device 101 from the vicinity of the ear to another location. In addition, the user may change the posture of the electronic device 101 taken by the user to receive a call to another posture. The electronic device 101 may determine whether to switch the display 210 to the on state based on whether at least one of motion information or posture information identified after the identification of the fifth ear touch type satisfies a condition corresponding to release.

To determine whether the ear touch has been released, a simplified algorithm may be used, compared to the identification algorithm corresponding to the first, second, or third ear touch type. The electronic device 101 may identify whether the touch is the fourth ear touch type based on whether a node having a specified level of sensitivity has been detected, without identifying an input position or the shape of an object. For example, when a node having a sensitivity greater than or equal to a sensitivity corresponding to the fourth ear touch type has been detected (or when the number of nodes is greater than or equal to the threshold number of the fourth ear touch type), the touch sensor IC 253 may provide information indicating the fourth ear touch type to the processor 120.

When a node with a sensitivity greater than or equal to the threshold corresponding to the fourth ear touch type has not been detected (or when the number of nodes is less than the threshold number of the fourth ear touch type), the touch sensor IC 253 may provide information indicating the fifth ear touch type to the processor 120.

FIG. 17 illustrates touch sensing information, according to an embodiment.

Referring to FIG. 17, the electronic device 101 (e.g., the touch sensor IC 253) may configure remaining nodes, except for the nodes included in the leftmost two row channels and the rightmost two row channels, as a valid area 1701. In FIG. 17, nodes having sensitivities greater than or equal to a sensitivity corresponding to the fourth ear touch type are marked with dotted lines or hatched lines. When a corresponding node is detected (or when the number of nodes is greater than or equal to the threshold number of the fourth ear touch type), the electronic device 101 may identify the fourth ear touch type.

The electronic device 101 may define a 0-th ear touch type. The 0-th ear touch type may correspond when an ear touch is not detected after the display 210 returns to the on state. For example, as described above, after the touch sensor IC 253 transmits the information indicating the fifth ear touch type to the processor 120, the processor 120 may switch the display 210 to the on state based on the fifth ear touch type or further based on additional information. After outputting the information indicating the fifth ear touch type, the touch sensor IC 253 may output information indicating the 0-th ear touch type after detecting the first, second, or third ear touch type. Information for each ear touch type may be summarized as shown in Table 4 below. Since the values listed in Table 4 are merely exemplary, they may coincide with or may be partially different from the above-described examples.

TABLE 4

| Ear touch type | Display mode | Mode description and features | Valid area | Response time (ms) | Reliability and additional information to be considered |
|---|---|---|---|---|---|
| 0 | Normal power mode (on state) | types 1, 2, 3 released | — | 40 | — |
| 1 | | topmost end sensitive contact hand/ear distinguishable | Channel of top 4 columns | 24 | low reliability motion and posture information considered |
| 2 | | ear contact-multi touch or hand blade gesture/ear distinguishable | Channel of top 14 columns, channel of left one row and channel of right one row excluded | 40 | intermediate reliability motion or posture information considered |
| 3 | | ear, cheek contact-hand blade gesture/ear distinguishable | Entire area, channel of left one | 320 | high reliability no additional information considered |

TABLE 4-continued

| Ear touch type | Display mode | Mode description and features | Valid area | Response time (ms) | Reliability and additional information to be considered |
|---|---|---|---|---|---|
| 4 | Low power mode (off state) | touch maintained during low power mode determine baseline reset of touch circuit | Entire area, channel of left one row and channel of right one row excluded | 320 | intermediate reliability |
| 5 | | release 4 types. i.e., touch release determined | — | 100 | intermediate reliability motion and posture information considered |

Figure 18:
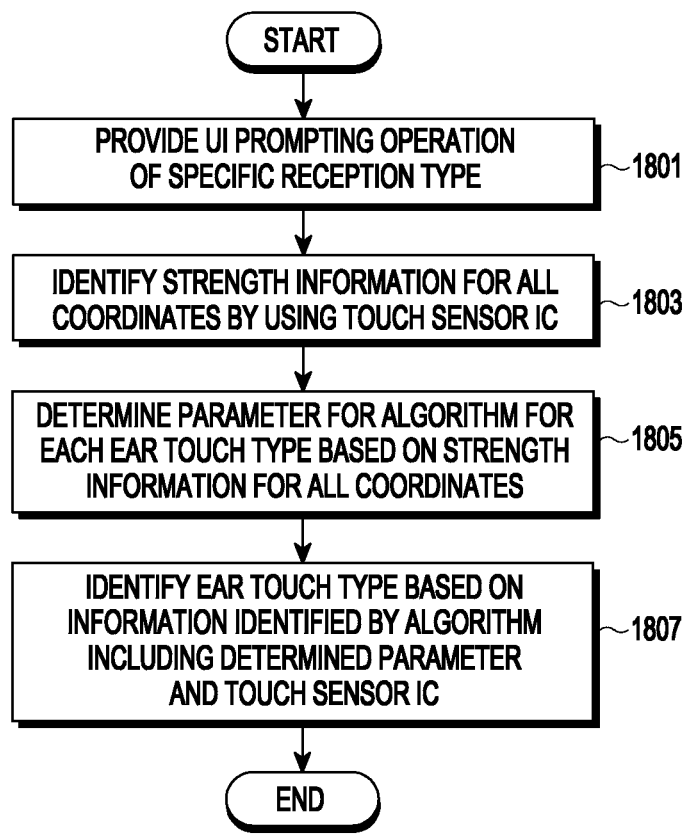
FIG. 18 is a flowchart illustrating a method of operating an electronic device, according to an embodiment.
Figure 19:
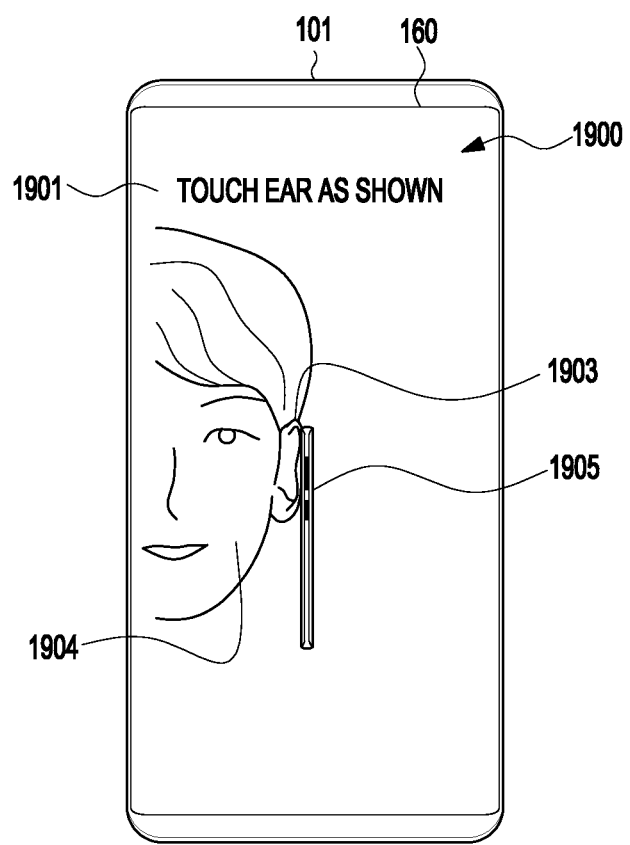
FIG. 19 illustrates an electronic device, according to an embodiment.

FIG. 18 is a flowchart illustrating a method of operating an electronic device, according to an embodiment. FIG. 19 illustrates an electronic device, according to an embodiment.

Referring to FIGS. 18 and 19, the electronic device 101 may calibrate an identification algorithm by reflecting user characteristics.

In step 1801, the electronic device 101 (e.g., the processor 120) provides a user interface (UI) that prompts an operation of a specific reception ear touch type. For example, as illustrated in FIG. 19, the processor 120 may control the display device 160 to display a first UI 1900. The first UI 1900 may include text 1901 that prompts the second ear touch type and graphic objects 1903, 1904, and 1905 that describe the second ear touch type. A first graphic object 1903 may have the shape of a user's ear, a second graphic object 1904 may have the shape of the user's cheek, and a third graphic object 1905 may have the shape of the electronic device. Accordingly, the user may make a gesture so that the electronic device 101 touches the ear while not touching the cheek, during the calibration.

In step 1803, the electronic device 101 identifies sensitivity information about the entire nodes by using the touch sensor IC 253.

In step 1805, the electronic device 101 determines a parameter for the algorithm for each ear touch type based on the sensitivity information about the nodes. For example, in the identification algorithm of Table 2, the parameters of the position of a valid area, the sensitivity '10', and the number of nodes '16', in condition 1, the major axis-to-minor axis ratio in condition 2, and the number of objects '3' in condition 3 may be adjusted based on the sensitivity information about all nodes identified in operation 1803. Accordingly, the parameters of the identification algorithm may be adjusted adaptively according to the user.

In step 1807, the electronic device 101 identifies an ear touch type based on the algorithm including the determined parameters and the information identified by using the touch sensor IC 253. After the calibration is completed, e.g., when receiving a call, the user may touch an ear on the electronic device 101. The touch sensor IC 253 may identify the ear touch type by using the identification algorithm with the adjusted parameters. Therefore, the touch sensor IC 253 may more accurately identify the ear touch type. While the first UI 1900 for prompting the second ear touch type is illustrated in FIG. 19, the electronic device 101 may sequentially display UIs for prompting the first ear touch type and the third ear touch type, and also adjust parameters for the identification algorithms corresponding to the first ear touch type and the third ear touch type based on the touch sensing information obtained in each process.

Figure 20:
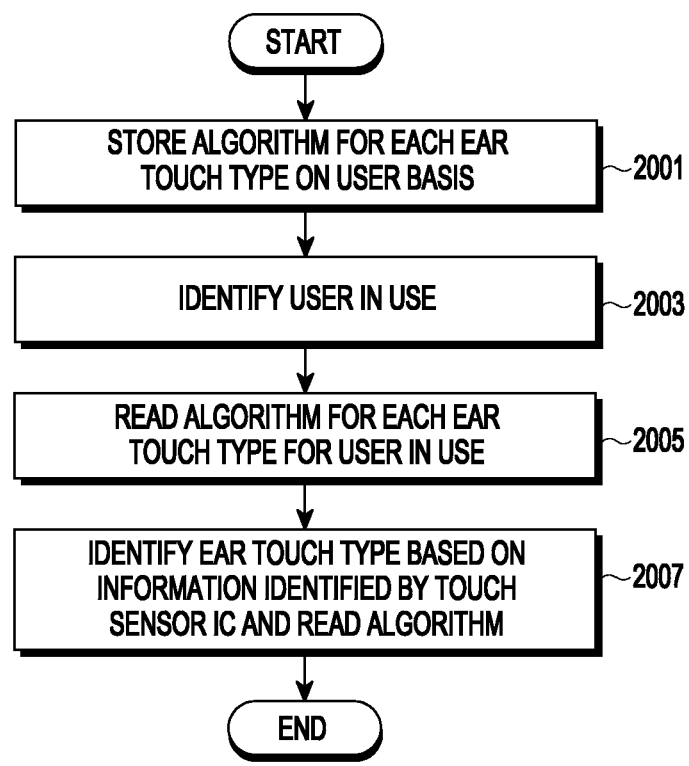
FIG. 20 is a flowchart illustrating a method of operating an electronic device, according to an embodiment.

FIG. 20 is a flowchart illustrating a method of operating an electronic device, according to an embodiment.

Referring to FIG. 20, the electronic device 101 (e.g., the processor 120) stores the algorithm for each ear touch type on a user basis in step 2001. As described with reference to FIGS. 18 and 19, since the parameters of the algorithm for each ear touch type may be adjusted on a user basis, the algorithm for each unique ear touch type may be stored for each user.

In step 2003, the electronic device 101 identifies a user using the electronic device 101.

In step 2005, the electronic device 101 reads the algorithm for each ear touch type corresponding to the user. When the algorithm for each ear touch type corresponding to the user has not been stored, the electronic device 101 may receive the algorithm for each ear touch type corresponding to the user from an external electronic device.

In step 2007, the electronic device 101 identifies an ear touch type based on information identified by the touch sensor IC 253 and the read algorithm.

Figure 21:
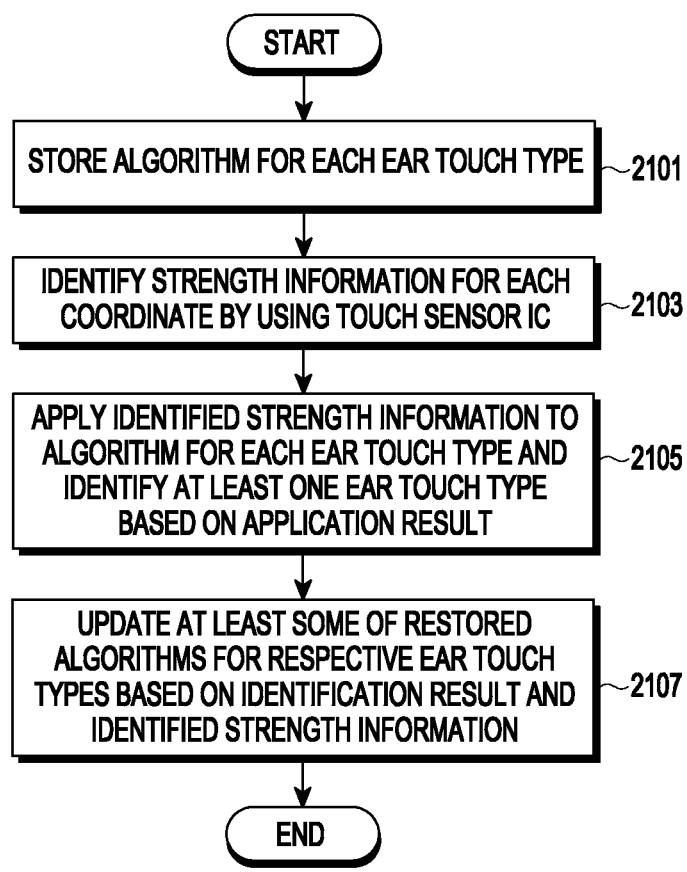
FIG. 21 is a flowchart illustrating a method of operating an electronic device, according to an embodiment.

FIG. 21 is a flowchart illustrating a method of operating an electronic device, according to various embodiments.

Referring to FIG. 21, the electronic device 101 (e.g., the processor 120) stores the algorithm for each ear touch type in step 2101.

In step 2103, the electronic device 101 identifies sensitivity information about each node by using the touch sensor IC.

In step 2105, the electronic device 101 applies the identified sensitivity information to the algorithm for each ear touch type, and identifies at least one ear touch type based on the result of the application.

In step 2107, the electronic device 101 updates at least some of the stored algorithms for the respective ear touch types based on the result of the identification and the identified sensitivity information. For example, in step 2105, the electronic device 101 may identify the first ear touch type. The electronic device 101 may update parameters of the algorithm corresponding to the first ear touch type by using the sensitivity information about each node, identified in step 2103. Accordingly, the algorithms may be updated more adaptively according to the user.

Figure 22:
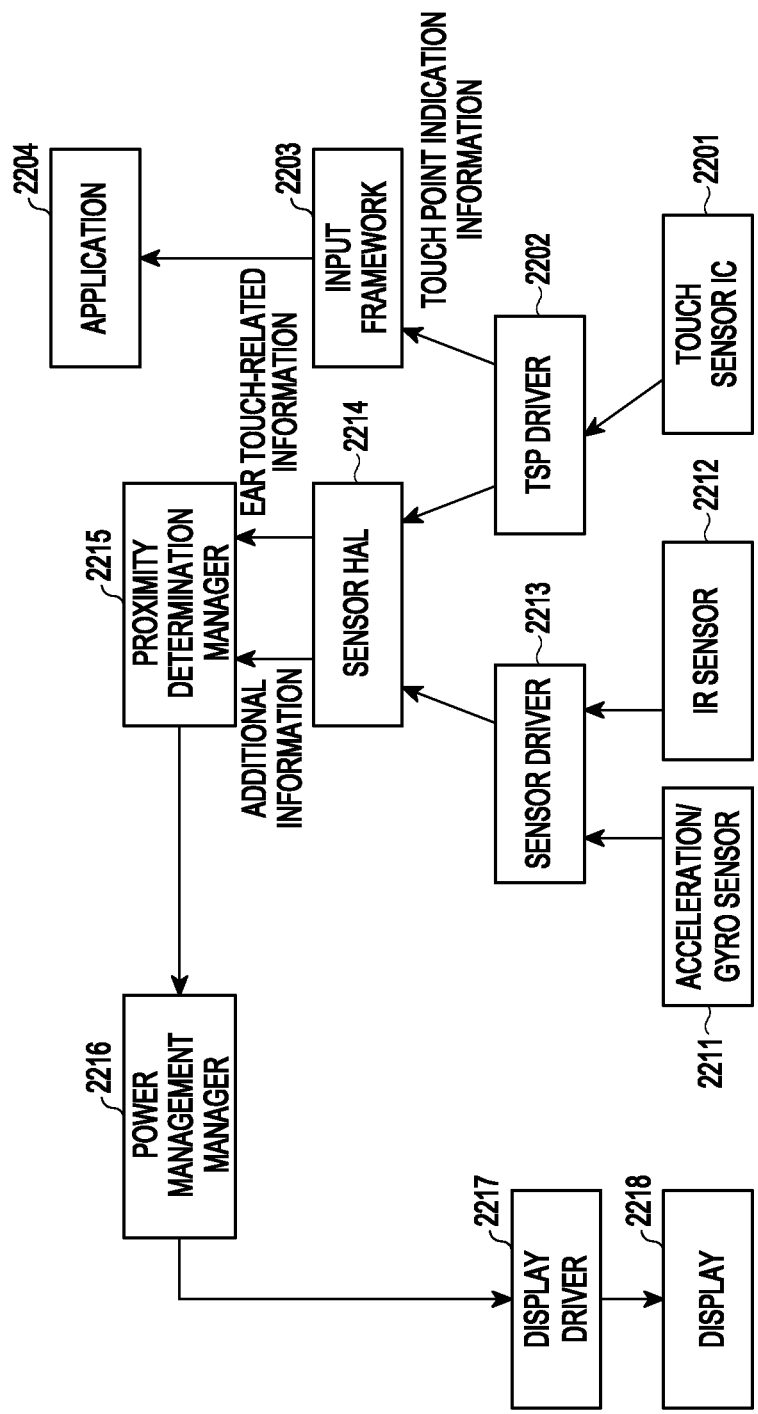
FIG. 22 illustrates an electronic device, according to an embodiment.

FIG. 22 illustrates an electronic device, according to an embodiment.

Referring to FIG. 22, a touch sensor IC 2201 may identify ear touch-related information based on information from a touch sensor. Firmware of the touch sensor IC 2201 may include an algorithm for identifying information related to various ear touches described above. In addition, the touch sensor IC 2201 may identify information indicating a touch point. The touch sensor IC 2201 may transmit at least one of the ear touch-related information or the information indicating the touch point to a touch screen panel (TSP) driver 2202. As described above, the touch sensor IC 2201 may transmit the ear touch-related information or the information indicating the touch point in the same packet or each of the ear touch-related information and the information indicating the touch point in a different packet, to which the transmission method is not limited.

The TSP driver 2202 may transmit the received ear touch-related information to a sensor hardware abstraction layer (HAL) 2214 and the received information indicating the touch point to an input framework 2203. The input framework 2203 may transmit the information indicating the touch point to an application 2204 (e.g., an application running in the foreground). The application 2204 may output a result of performing a function corresponding to an icon disposed at the touch point based on the information indicating the touch point. The sensor HAL 2214 may transmit the ear touch-related information to a proximity determination manager 2215.

For example, the proximity determination manager 2215 is a manager defined in a framework layer, and may be configured to determine whether the ear is close to the electronic device 101. The proximity determination manager 2215 may determine whether an ear is close, e.g., within a predetermined distance, based on the received ear touch-related information. The proximity determination manager 2215 may be configured to determine whether the ear is close by using the ear touch-related information without additional information. Alternatively, the proximity determination manager 2215 may be configured to determine whether the ear is close by further using additional information including at least one of motion information or posture information.

Alternatively, the proximity determination manager 2215 may determine whether to use additional information for each ear touch type. When additional information is used, the proximity determination manager 2215 may further receive additional information obtained by at least one of an acceleration/gyro sensor 2211, a grip sensor, or an IR sensor 2212 through a sensor driver 2213. The additional information may include not only the motion information and the posture information, but also IR sensing information.

The proximity determination manager 2215 may transmit the result of determining whether the ear is close to a power management manager 2216. The power management manager 2216 may transmit an off command for a display 2218 to a display driver 2217, when receiving a determination result indicating that the ear is close.

According to an embodiment, an electronic device may include a display, a touch circuit configured to detect a touch on the display, a processor operatively coupled to the display and the touch circuit, and a memory operatively coupled to the processor. The touch circuit may be configured to obtain touch sensing information indicating an input sensitivity of each of a plurality of nodes of the touch circuit, identify information related to a user ear touch on the electronic device, and transmit the ear touch-related information to the processor. The memory may store instructions which when executed, cause the processor to control the display to an on state and to control the display to switch from the on state to an off state based on the ear touch-related information obtained from the touch circuit.

The touch circuit may be configured to identify ear touch-related information indicating at least one of a plurality of pieces of ear touch type information corresponding to a plurality of methods in which the user touches an ear on the electronic device, as at least a part of the operation of identifying information related to a user ear touch.

The touch circuit may be configured to identify ear touch-related information indicating a first ear touch type based on the number of nodes having sensitivities within a first sensitivity range being greater than or equal to a first threshold number among nodes included in a first area adjacent to a first side end of the touch circuit, as at least a part of the operation of identifying information related to a user ear touch.

The electronic device may further include at least one sensor configured to sense at least one of motion information about the electronic device or posture information about the electronic device. The instructions may be configured to cause the processor to obtain the motion information and the posture information from the at least one sensor and identify whether to switch the display to the off state based on whether the motion information and the posture information satisfy a specified condition corresponding to the first ear touch type, as at least a part of the operation of controlling the display to switch from the on state to the off state based on the ear touch-related information.

As at least a part of the operation of identifying information related to a user ear touch, the touch circuit may be configured to identify at least one object from nodes included in a second area adjacent to the first side end of the touch circuit and identify ear touch-related information indicating the second ear touch type based on at least one of the shape of each of the at least one object satisfying a specified shape condition or the number of the at least one object being greater than or equal to a threshold number corresponding to the second ear touch type.

The electronic device may further include at least one sensor configured to sense at least one of motion information about the electronic device or posture information about the electronic device. As at least a part of the operation of controlling the display to switch from the on state to the off state based on the ear touch-related information by the processor, the instructions may be configured to obtain the motion information or the posture information from the at least one sensor and identify whether to switch the display to the off state based on whether the motion information or the posture information satisfies a specific condition corresponding to the second ear touch type.

The touch circuit may be configured to identify an object having an area larger than an area corresponding to a third ear touch type from the plurality of nodes of the touch circuit, track the identified object in time series, and identify ear touch-related information indicating the third ear touch type based on a motion of the identified object being identified as satisfying a motion condition corresponding to the second ear touch type as a result of the tracking, as at least a part of the operation of identifying information related to a user ear touch.

The instructions may be configured to cause the processor to identify whether to switch the display to the off state based on the acquisition of the ear touch-related information indicating the third ear touch type, as at least a part of the operation of controlling the display to switch from the on state to the off state based on the ear touch-related information.

The touch circuit may be configured to identify ear touch-related information indicating whether a user's ear has been touched, as at least a part of the operation of identifying information related to a user ear touch, and the instructions may be configured to cause the processor to control the display to switch from the on state to the off state, when it is identified that the ear has been touched, as at least a part of the operation of controlling the display to switch from the on state to the off state based on the ear touch-related information.

The touch circuit may further be configured to transmit information indicating whether the ear touch is maintained to the processor, after the display is switched from the on state to the off state. The instructions may further be configured to cause the processor to identify whether to switch the display from the off state to the on state based on the information indicating whether the ear touch is maintained.

The touch circuit may be configured to identify touch information indicating at least some of the plurality of nodes of the touch circuit based on the touch sensing information, and transmit the touch information along with the ear touch-related information to the processor or transmit the touch information alone to the processor.

According to an embodiment, a method of operating an electronic device including a display, a touch circuit, and a processor may include obtaining touch sensing information indicating an input sensitivity of each of a plurality of nodes of the touch circuit by the touch circuit, identifying information related to a user ear touch on the electronic device based on the touch sensing information by the touch circuit, transmitting the ear touch-related information to the processor by the touch circuit, controlling the display to an on state by the processor, and controlling the display to switch from the on state to an off state based on the ear touch-related information obtained from the touch circuit by the processor.

Identifying information related to a user ear touch may include identifying ear touch-related information indicating at least one of a plurality of pieces of ear touch type information corresponding to a plurality of respective methods in which a user touches an ear on the electronic device.

Identifying information related to a user ear touch may include identifying ear touch-related information indicating a first ear touch type based on the number of nodes having sensitivities within a first sensitivity range among nodes included in a first area adjacent to a first side end of the touch circuit being greater than or equal to a first threshold number.

Controlling the display to switch from the on state to an off state based on the ear touch-related information may include obtaining motion information about the electronic device and posture information about the electronic device from at least one sensor of the electronic device based on the acquisition of the ear touch-related information indicating the first ear touch type, and identifying whether to switch the display to the off state based on whether the motion information and the posture information satisfy a specified condition corresponding the first ear touch type.

Identifying information related to a user ear touch may include may include identifying at least one object from nodes included in a second area adjacent to the first side end of the touch circuit, and identifying ear touch-related information indicating the second ear touch type based on at least one of the shape of each of the at least one object satisfying a specified shape condition or the number of the at least one object being greater than or equal to a threshold number corresponding to the second ear touch type.

Controlling the display to switch from the on state to an off state based on the ear touch-related information may include obtaining motion information about the electronic device and posture information about the electronic device from at least one sensor of the electronic device based on the acquisition of the ear touch-related information indicating the second ear touch type, and identifying whether to switch the display to the off state based on whether the motion information or the posture information satisfy a specified condition corresponding the second ear touch type.

Identifying information related to a user ear touch may include may include identifying an object having an area larger than or equal to an area corresponding to a third ear touch type among the plurality of nodes of the touch circuit, tracking the identified object in time series, and identifying ear touch-related information indicating the third ear touch type based on a motion of the identified object being identified as satisfying a motion condition corresponding to the second ear touch type, as a result of the tracking.

Controlling the display to switch from the on state to an off state based on the ear touch-related information may include identifying whether to switch the display to the off state based on the acquisition of the ear touch-related information indicating the third ear touch type.

The method may further include transmitting information indicating whether the ear touch is maintained to the processor by the touch circuit (e.g., the touch circuit 250) after the display is switched from the on state to the off state, and identifying whether to switch the display from the off state to the on state based on the information indicating whether the ear touch is maintained, by the processor.

According to an embodiment, an electronic device may include a display, a touch circuit configured to detect a touch on the display, the processor operatively coupled to the display and the touch circuit, and a memory operatively coupled to the processor. The touch circuit may obtain touch sensing information indicating an input sensitivity of each of a plurality of nodes of the touch circuit and transmit the touch sensing information to the processor. The memory may store instructions which when executed, cause the processor to control the display to an on state, to identify information related to a user ear touch on the electronic device based on the touch sensing information received from the touch circuit, and to control the display to switch from the on state to an off state based on the ear touch-related information.

The instructions may be configured to cause the processor to identify ear touch-related information indicating at least one of a plurality of pieces of ear touch type information corresponding to a plurality of respective touch methods in which a user touches an ear on the electronic device, as at least apart of the operation of identifying information related to a user ear touch.

Figure 23:
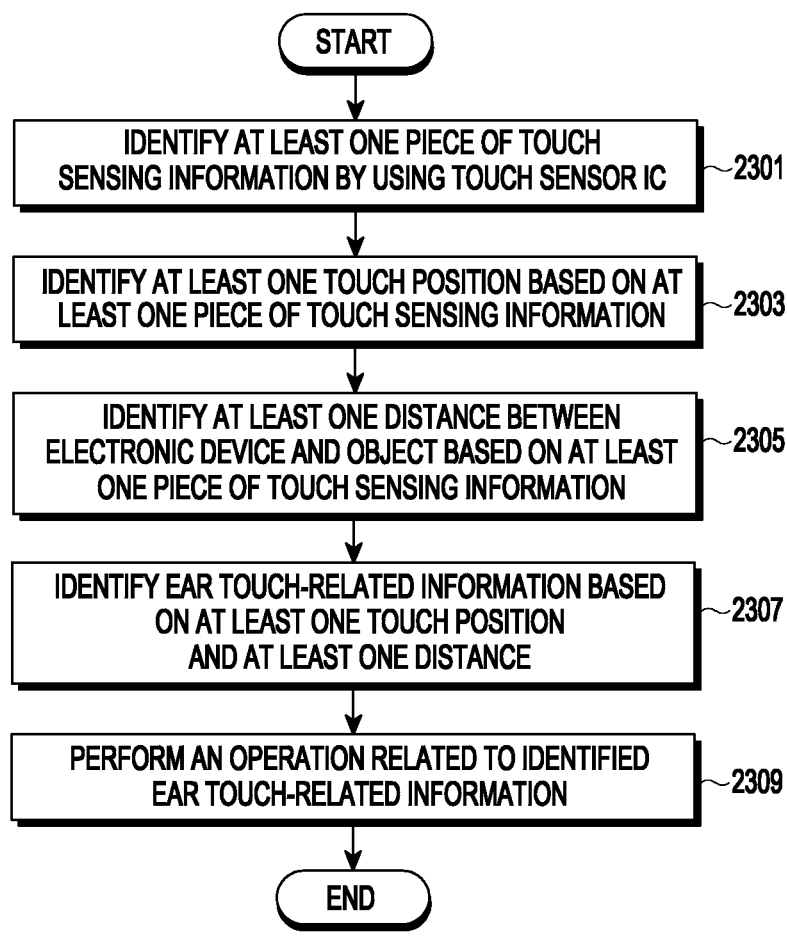
FIG. 23 is a flowchart illustrating a method of operating an electronic device, according to an embodiment.

FIG. 23 is a flowchart illustrating a method of operating an electronic device, according to an embodiment.

Referring to FIG. 23, the electronic device 101 identifies at least one piece of touch sensing information by using the touch sensor IC 253 in step 2301. The touch sensing information may include at least one piece of first touch sensing information based on a mutual capacitance scheme and/or at least one piece of second touch sensing information based on a self-capacitance scheme. The touch sensor IC 253 may obtain the first touch sensing information and the second touch sensing information in time division or at least simultaneously.

In step 2303, the touch sensor IC 253 identifies at least one touch position based on at least one piece of touch sensing information. For example, the touch sensor IC 253 may identify the sensitivity of each node included in the at least one piece of touch sensing information, and identify at least one touch position based on the sensitivity of each node.

In step 2305, the touch sensor IC 253 identifies at least one distance between the electronic device and an object based on the at least one piece of touch sensing information. For example, the touch sensor IC 253 may identify the sensitivity of each channel and identify at least one distance between the electronic device and the object for each channel based on the sensitivity of each channel. Each channel may correspond to one line-type electrode included in each touch sensor IC 253, and one channel may correspond to a plurality of nodes. The identification of a touch position and the identification of at least one distance are not limited to any particular order and may be performed at least simultaneously.

In step 2307, the touch sensor IC 253 identifies ear touch-related information based on the at least one touch position and the at least one distance.

In step 2309, the touch sensor IC 253 performs an operation related to the identified ear touch-related information.

As described above, the ear touch-related information may be information indicating whether the user's ear touches at least a part of the surface of the electronic device 101 (e.g., at least a part of the front surface from which the display 210 of the electronic device 101 is exposed). The ear touch-related information may be configured in the form of a flag simply indicating whether a touch has been made. The ear touch-related information may be information indicating any one of a plurality of ear touch types. Compared to the above-described embodiments in which the touch sensor IC 253 obtains ear touch-related information based on the sensitivity of each node, the touch sensor IC 253 obtains the ear touch-related information based on the sensitivity of each node and at least one distance in this embodiment. For example, the touch sensor IC 253 may identify the ear touch-related information based on the at least one distance by an identification algorithm that identifies ear touch-related information corresponding to at least one distance. The touch sensor IC 253 may use first information related to an ear touch identified based on a touch position and second information related to an ear touch identified based on at least one distance together to identify ear touch-related information. Alternatively, the touch sensor IC 253 may identify ear touch-related information by selecting one of first information related to an ear touch identified based on a touch position and second information related to an ear touch identified based on the at least one distance. It will be understood by those skilled in the art that a method of obtaining ear touch-related information based on data characteristics of data indicating a position and data indicating a distance to an object is not limited.

As described above, the touch sensor IC 253 may generate the first information related to the ear touch identified based on the touch position, and the second information related to the ear touch identified based on the at least one distance. For example, the touch sensor IC 253 may determine any one ear touch type among the above-described first to fifth ear touch types by the first information related to the ear touch based on the touch position. In addition, the touch sensor IC 253 may determine any one ear touch type among the first to fifth ear touch type by the second information related to the ear touch based on the at least one distance. While the first to fifth ear touch types based on the touch position may be the same as the first to fifth ear touch types based on the at least one distance, they may be different depending on implementation. When they are implemented to be identical, the touch sensor IC 253 may finally output any one ear touch type to the processor 120 based on the first information and the second information. When the first to fifth ear touch types are configured to be different, the touch sensor IC 253 may output a pair of ear touch type information based on a touch position and ear touch type information based on at least one distance as the ear touch-related information to the processor 120.

The touch sensor IC 253 may transmit the identified ear touch-related information, e.g., to the processor 120, and the processor 120 may perform an operation related to the ear touch-related information. As described above, the processor 120 may control on/off of the display based on the ear touch-related information. Alternatively, the processor 120 may switch audio output hardware from the speaker to the receiver based on the proximity of the ear being identified during execution of an application supporting a voice message.

Alternatively, the processor 120 may update the number of push-ups based on the proximity of the ear being identified during execution of a push-up application. The processor 120 may perform an on-going operation based on sensing data from an existing proximity sensor based on the received ear touch-related information.

The electronic device 101 may additionally use sensing data from another sensor to identify the ear touch-related information. For example, the processor 120 may receive the ear touch-related information from the touch sensor IC 253 and additionally use sensing data from another sensor (e.g., a gyro sensor, an acceleration sensor, an illuminance sensor, or an ultrasonic sensor) to identify whether the ear touch-related information is valid. For example, the processor 120 may identify a gesture based on sensing data from the gyro sensor and/or the acceleration sensor, and identify whether the user's ear is actually close to the electronic device 101 based on the gesture. The processor 120 may identify whether the user's ear is actually close to the electronic device 101 based on sensing data from the illuminance sensor being less than or equal to a specified threshold. There is no limitation on the type of a sensor additionally used by the processor 120.

As described above, even though the electronic device 101 does not include a proximity sensor, the electronic device 101 may identify, e.g., whether the user's ear is in proximity based on information from the touch sensor IC 253.

Alternatively, the electronic device 101 may include the proximity sensor, and in this case, the electronic device 101 may identify whether an object (e.g., the user's ear) is close and identify a touch and a gesture with respect to the electronic device 101 as well, based on information from the touch sensor IC 253. Even though the performance of the proximity sensor is degraded, the electronic device 101 may more accurately identify whether an object is close by using both data from the proximity sensor and data from the touch sensor IC 253.

Figure 24A:
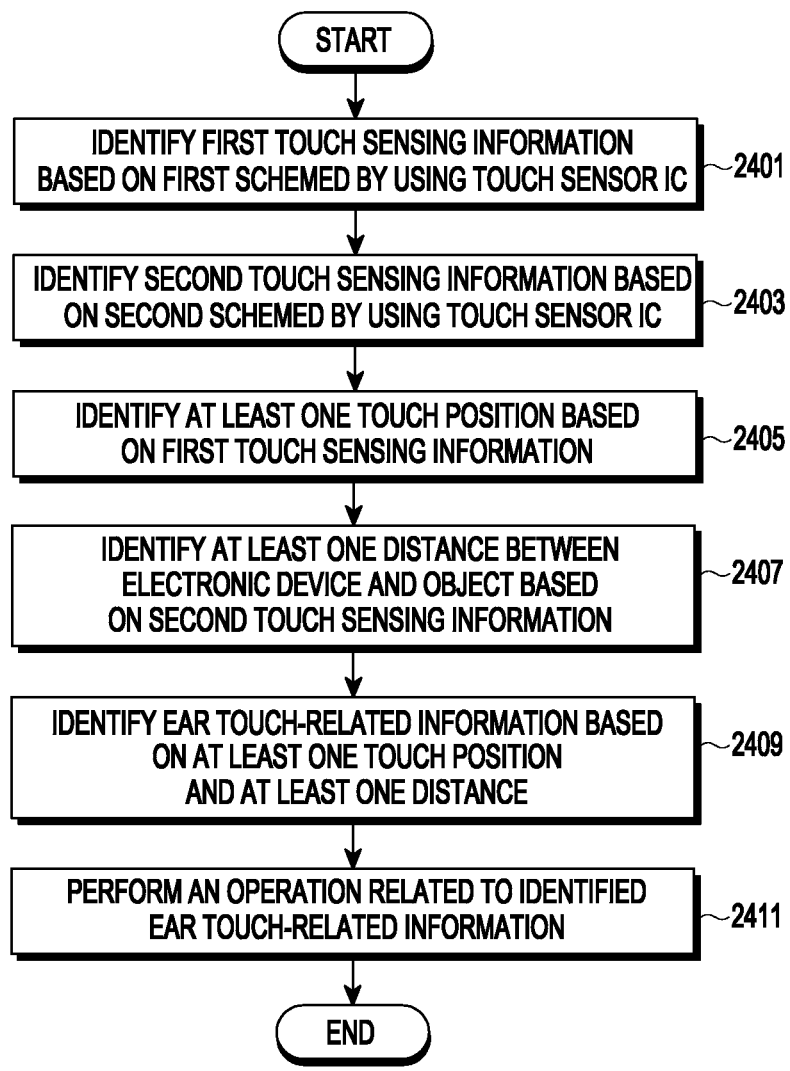
FIG. 24A is a flowchart illustrating a method of operating an electronic device, according to an embodiment.
Figure 24B:
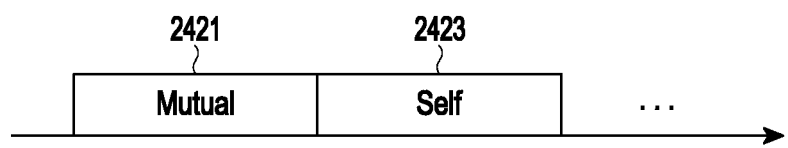
FIG. 24B illustrates time division sensing.

FIG. 24A is a flowchart illustrating a method of operating an electronic device, according to an embodiment. FIG. 24B is a diagram illustrating time-division sensing, according to an embodiment.

Referring to FIGS. 24A and 24B, the touch sensor 251 may include, e.g., cross-line electrodes supporting the mutual capacitance scheme.

In step 2401, first touch sensing information is identified based on a first scheme by using the touch sensor IC 253.

In step 2403, the electronic device 101 identifies second touch sensing information based on a second scheme by using the touch sensor IC 253. For example, as illustrated in FIG. 24B, the touch sensor IC 253 may obtain at least one piece of first touch sensing information based on the mutual capacitance scheme by using the electrodes of the touch sensor 251 during a first period 2421 and at least one piece of second touch sensing information based on the self-capacitance scheme by using the electrodes of the touch sensor 251 during a second period 2423, in time division. Alternatively, the touch sensor IC 253 may at least simultaneously obtain the first touch sensing information based on the mutual capacitance scheme and the second touch sensing information based on the self-capacitance scheme.

In step 2405, the electronic device 101 identifies at least one touch position based on the first touch sensing information.

In step 2407, the electronic device 101 identifies at least one distance between the electronic device and an object based on the second touch sensing information. For example, the touch sensor IC 253 may identify at least one touch position based on the at least one piece of first touch sensing information identified based on the mutual capacitance scheme, and identify at least one distance based on the at least one piece of second touch sensing information identified based on the self-capacitance scheme. The touch sensor IC 253 may obtain data on a channel basis (e.g., for each horizontal channel and for each vertical channel), and obtain the second touch sensing information based on the difference between raw data and a baseline. The touch sensor IC 253 may identify information about a distance to an object corresponding to each channel based on a value included in the second touch sensing information, e.g., a value for each channel.

In step 2409, the touch sensor IC 253 identifies ear touch-related information based on the at least one touch position and the at least one distance.

While the touch sensor IC 253 may perform self-capacitance scanning for the entire channels of the touch sensor 251, the touch sensor IC 253 may perform self-capacitance scanning for some channels depending on implementation.

In step 2411, the touch sensor IC 253 performs an operation related to the identified ear touch-related information.

Figure 25:
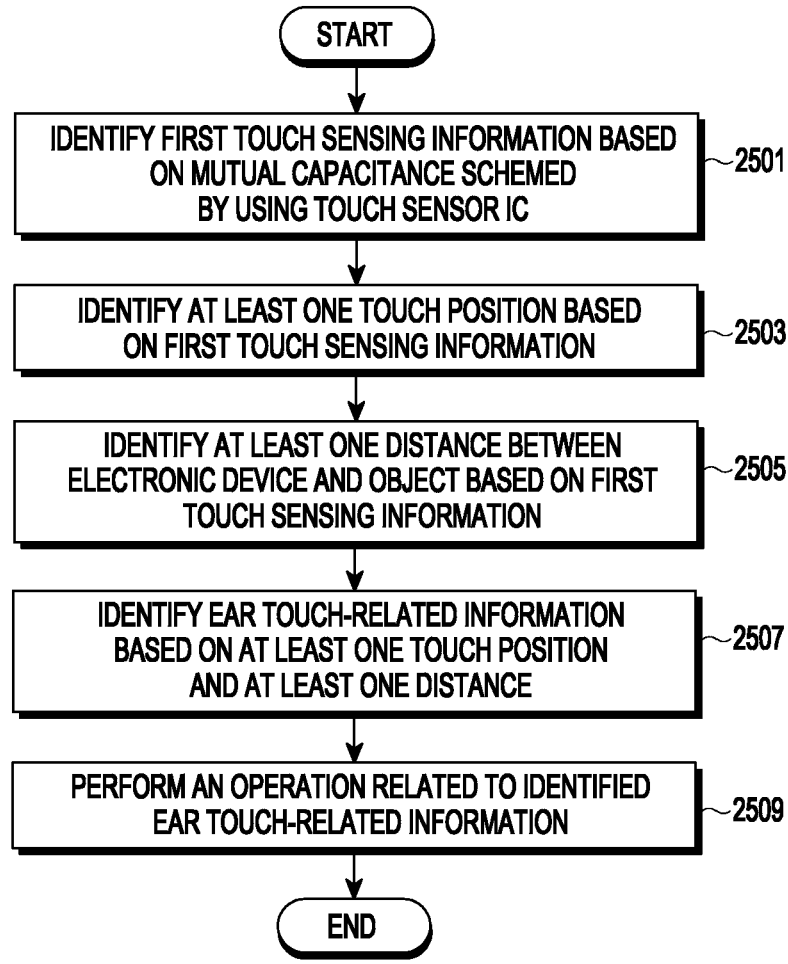
FIG. 25 is a flowchart illustrating a method of operating an electronic device, according to an embodiment.

FIG. 25 is a flowchart illustrating a method of operating an electronic device, according to an embodiment.

Referring to FIG. 25, in step 2501, the electronic device 101 identifies first touch sensing information based on the mutual capacitance scheme by using the touch sensor IC 253.

In step 2503, the touch sensor IC 253 identifies at least one touch position based on the first touch sensing information.

In step 2505, the touch sensor IC 253 identifies at least one distance between the electronic device and an object based on the first touch sensing information. For example, the touch sensor IC 253 may obtain the sensitivity of each node based on the mutual capacitance scheme. The touch sensor IC 253 may apply a larger driving voltage to the touch sensor 251 than in the case of touch acquisition. The touch sensor 251 may include, for example, cross-line electrodes supporting the mutual capacitance scheme. The touch sensor IC 253 may identify a hovering height corresponding to a corresponding node based on the sensitivity of each node. For example, the touch sensor IC 253 may identify information about association between sensitivities and heights (e.g., information about a height for each sensitivity range) and identify a hovering height by using the sensitivity of each node and the association information. Alternatively, the touch sensor IC 253 may identify the sum of the sensitivities of the plurality of nodes and identify a hovering height based on the sum.

In step 2507, the touch sensor IC 253 identifies ear touch-related information based on at least one touch position and at least one distance.

In step 2509, the electronic device 101 (e.g., the processor 120) performs an operation related to the identified ear touch-related information. For example, the processor 120 may receive the ear touch-related information from the touch sensor IC 253 and perform an operation related to the ear touch-related information.

Figure 26:
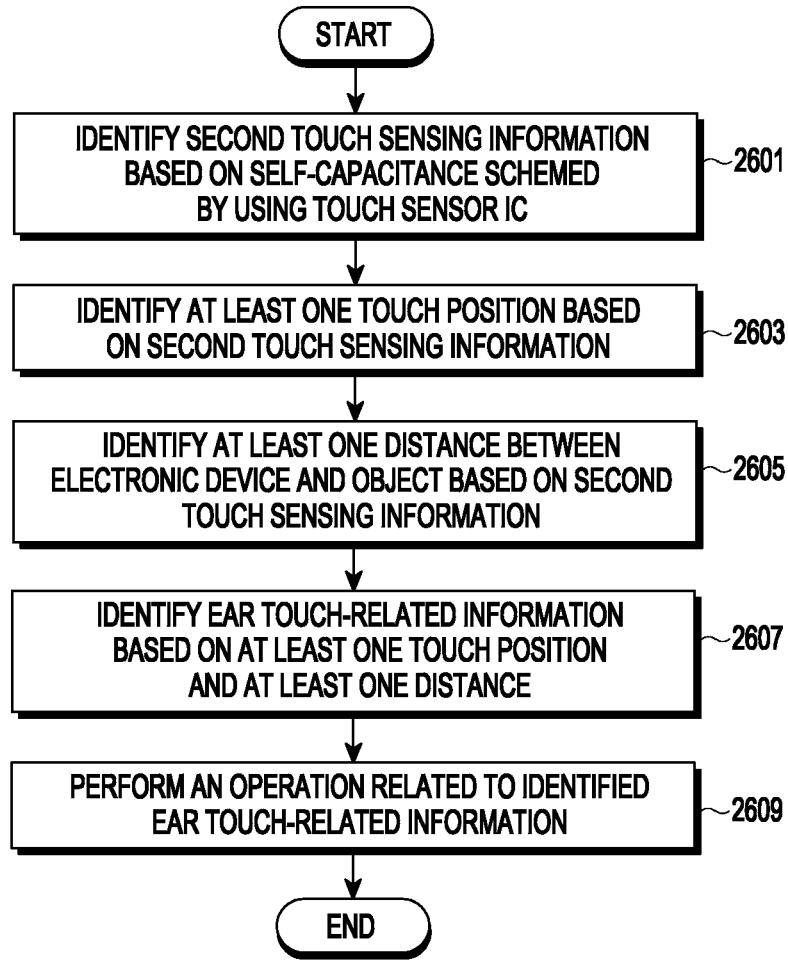
FIG. 26 is a flowchart illustrating a method of operating an electronic device, according to an embodiment.

FIG. 26 is a flowchart illustrating a method of operating an electronic device according to an embodiment.

Referring to FIG. 26, the touch sensor 251 may include pad-type electrodes supporting the self-capacitance scheme. For example, the touch sensor 251 may be included in the display panel to form an in-cell structure together with the display panel, or may be disposed on the display to form an on-cell structure together with the display panel.

In step 2601, the electronic device 101 identifies second touch sensing information based on the self-capacitance scheme by using the touch sensor IC 253. The second touch sensing information may include the sensitivity of each node (a sensitivity identified based on the self-capacitance scheme).

In step 2603, the touch sensor IC 253 identifies at least one touch position based on the second touch sensing information.

In step 2605, the touch sensor IC 253 identifies at least one distance between the electronic device and an object based on the second touch sensing information.

In step 2607, based on the at least one touch position and the at least one distance, ear touch-related information is identified.

In step 2609, the electronic device 101 (e.g., the processor 120) performs an operation related to the identified ear touch-related information. For example, the processor 120 may receive the ear touch-related information from the touch sensor IC 253 and perform an operation related to the ear touch-related information.

Figure 27:
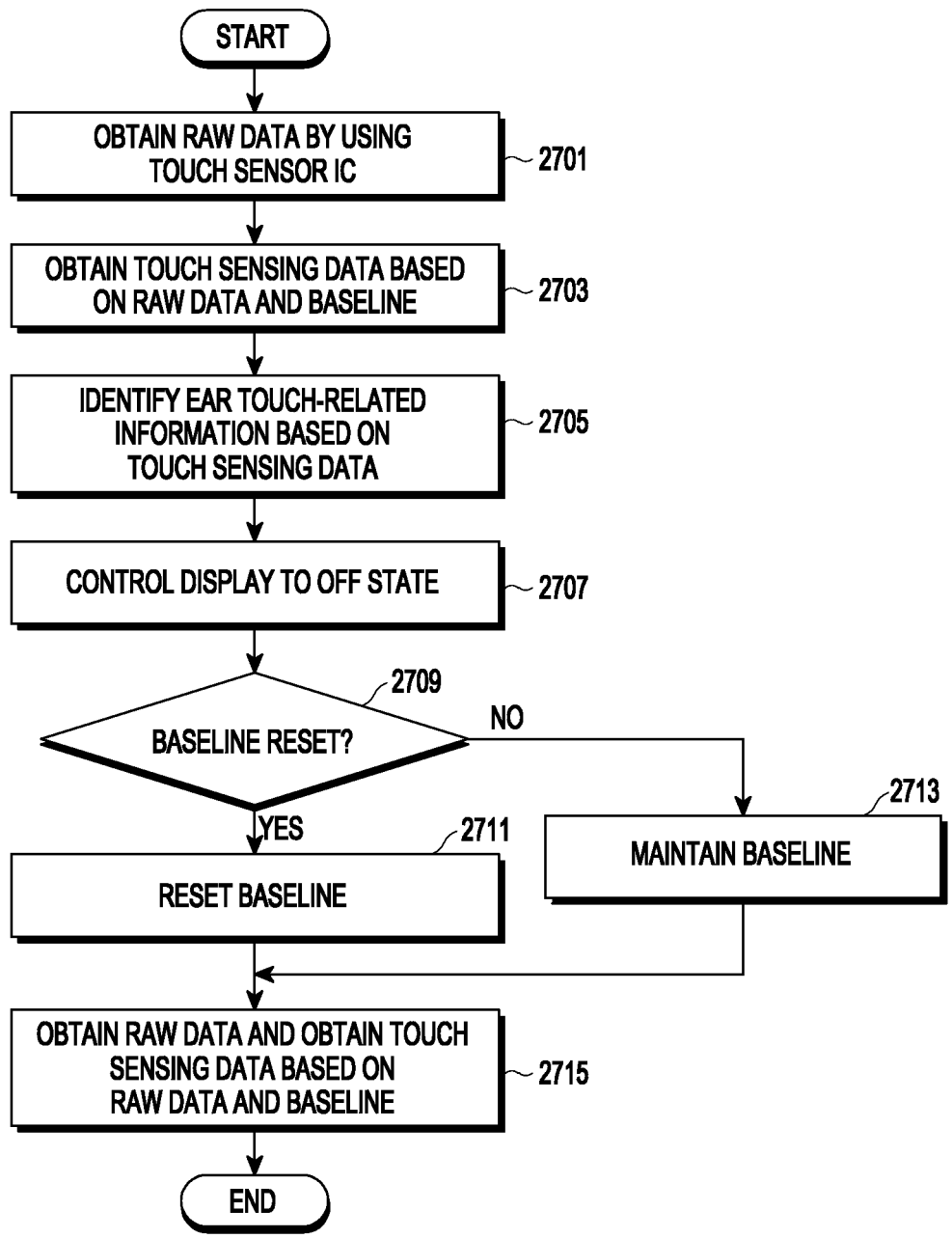
FIG. 27 is a flowchart illustrating a method of operating an electronic device, according to an embodiment.

FIG. 27 is a flowchart illustrating a method of operating an electronic device, according to an embodiment.

Referring to FIG. 27, the electronic device 101 obtains raw data by using the touch sensor IC 253 in step 2701.

In step 2703, the touch sensor IC 253 obtains touch sensing data based on the raw data and a baseline. For example, the touch sensor IC 253 may obtain touch sensing data based on the difference between the raw data and the baseline.

In step 2705, the touch sensor IC 253 identifies ear touch-related information based on the touch sensing data. Since the method of identifying ear touch-related information based on touch sensing data has been described above, a repetitive description thereof will be omitted here.

In step 2707, the electronic device 101 (e.g., the processor 120) controls the display to the off state. The processor 120 may identify that an ear touches at least a part of the electronic device 101 and control the display to the off state in response to the identification.

A phase difference of the capacitance of the touch sensor 251 may be changed according to the on/off state of the display. Accordingly, when the display is switched from the on state to the off state or when the display is switched from the off state to the on state, the baseline should be updated (or reset). However, when the baseline is updated with touch sensing data obtained while a body part such as an ear is touched, the updated baseline includes an error, and thus, there is a possibility that a touch may not be identified accurately.

Accordingly, the electronic device 101 (e.g., the touch sensor IC 253) determine whether the baseline is to be reset in step 2709. The touch sensor IC 253 may determine whether to reset the baseline based on whether a touch is identified when resetting the baseline. When a touch is identified, proximity of an object is requested, or a specific ear touch type is identified during resetting of the baseline, the touch sensor IC 253 may determine not to reset the baseline.

When it is identified that the baseline reset is to be performed in step 2709, the touch sensor IC 253 resets the baseline in step 2711. However, when it is identified that the baseline reset is not to be performed in step 2709, the touch sensor IC 253 maintains the current baseline in step 2713.

In step 2715, the touch sensor IC 253 obtains raw data, and obtains touch sensing data based on the raw data and the baseline maintained based on step 2713 or reset by step 2715.

When the baseline is not reset, the touch sensor IC 253 may track of the shape of the touch (e.g., an ear image). When it is identified that the shape of the touch (e.g., the ear image) has been released as a result of the tracking, the touch sensor IC 253 may update the baseline.

Figure 28:
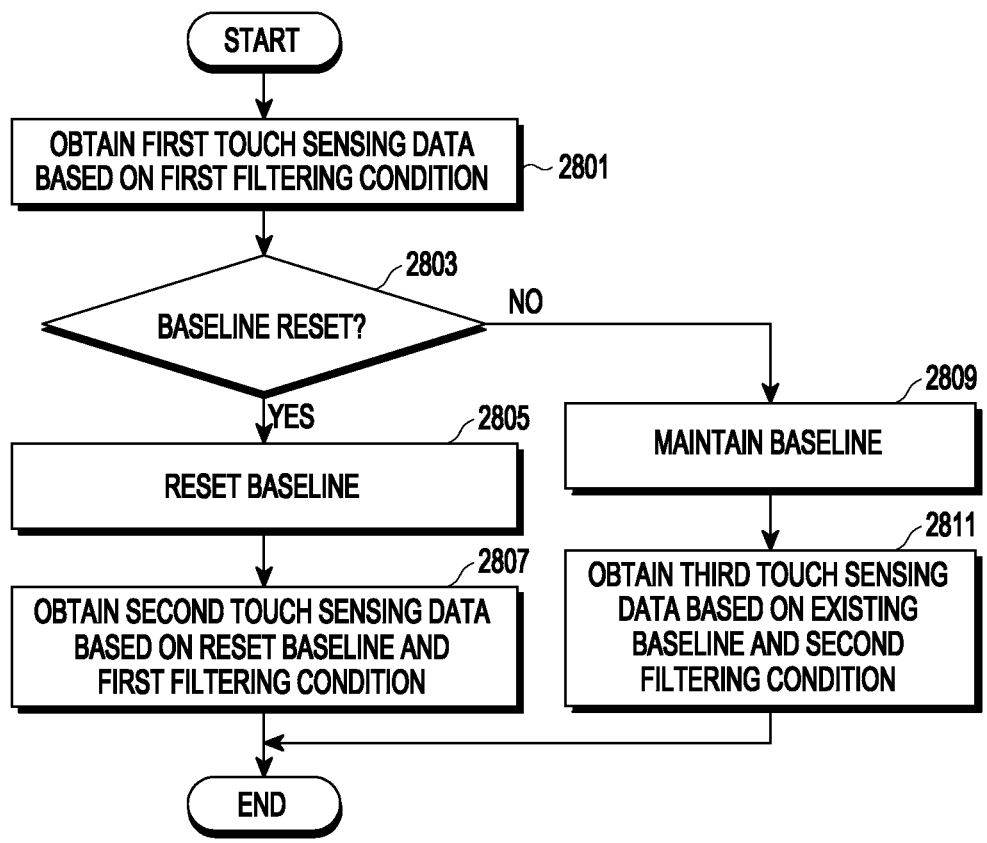
FIG. 28 is a flowchart illustrating a method of operating an electronic device, according to an embodiment.

FIG. 28 is a flowchart illustrating a method of operating an electronic device, according to an embodiment.

Referring to FIG. 28, the touch sensor IC 253 obtains first touch sensing data based on a first filtering condition in step 2801. For example, the touch sensor IC 253 may obtain raw data from the touch sensor 251 and apply the first filtering condition to the difference between the raw data and a baseline. The first filtering condition may be filtering in which only data greater than or equal to a first threshold value corresponding to the first filtering condition among the difference values between the raw data and the baseline are maintained, and data less than the first threshold are subjected to noise processing. However, the threshold-based filtering is merely an example, and any digital value-based filtering technique for filtering noise may be used.

In step 2803, the touch sensor IC 253 identifies whether the baseline is to be reset. For example, the touch sensor IC 253 may determine whether to reset the baseline based on whether a touch is identified during resetting of the baseline. When a touch is identified, the proximity of an object is identified, or a specific ear touch type is identified during resetting of the baseline, the touch sensor IC 253 may determine not to reset the baseline.

When it is identified that the baseline is to be reset in step 2803, the touch sensor IC 253 resets the baseline in step 2805.

After resetting the baseline, the touch sensor IC 253 obtains second touch sensing data based on the reset baseline and the first filtering condition in step 2807. For example, the touch sensor IC 253 may obtain raw data from the touch sensor 251 and identify the difference between the raw data and the reset baseline. The touch sensor IC 253 may apply the first filtering condition to the difference between the raw data and the reset baseline, and obtain the second touch sensing data based on the result of the application.

When it is identified that the baseline is not to be reset in step 2803, the touch sensor IC 253 obtains third touch sensing data based on the existing baseline and a second filtering condition in step 2811. For example, the touch sensor IC 253 may obtain raw data from the touch sensor 251 and identify the difference between the raw data and the existing baseline. The touch sensor IC 253 may apply the second filtering condition to the difference between the raw data and the existing baseline, and obtain the third touch sensing data based on the result of the application.

The second filtering condition may be a reinforced condition, compared to the first filtering condition. For example, the second filtering condition may be filtering in which only data greater than or equal to a second threshold value corresponding to the second filtering condition among the difference values between the raw data and the baseline are maintained, and data less than the second threshold value are subjected to noise processing. The second threshold may be a value higher than the first threshold. The touch sensor IC 253 may reinforce at least one parameter for filtering, when the reset of the baseline is reserved.

Alternatively, when the baseline has been reset, the touch sensor IC 253 performs the first filtering condition among a plurality of filtering conditions, and when the baseline has not been reset, performs the second filtering condition among the plurality of filtering conditions.

Figure 29A:
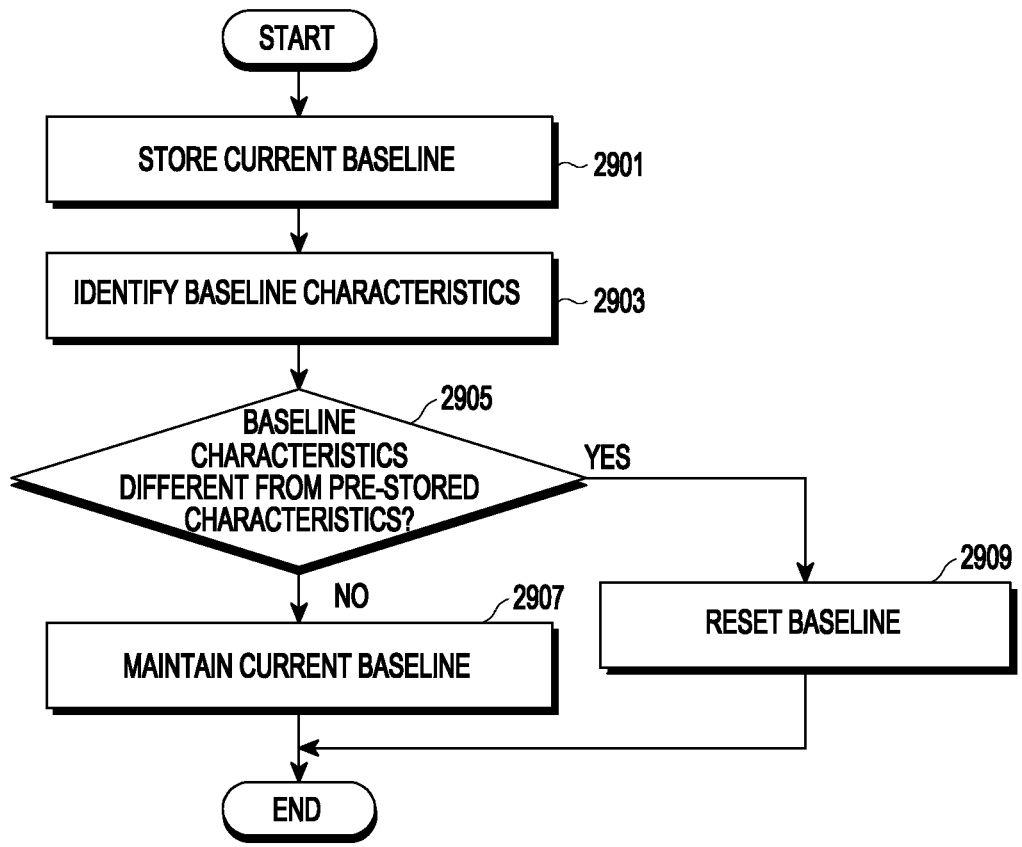
FIG. 29A is a flowchart illustrating a method of operating an electronic device, according to an embodiment.
Figure 29B:
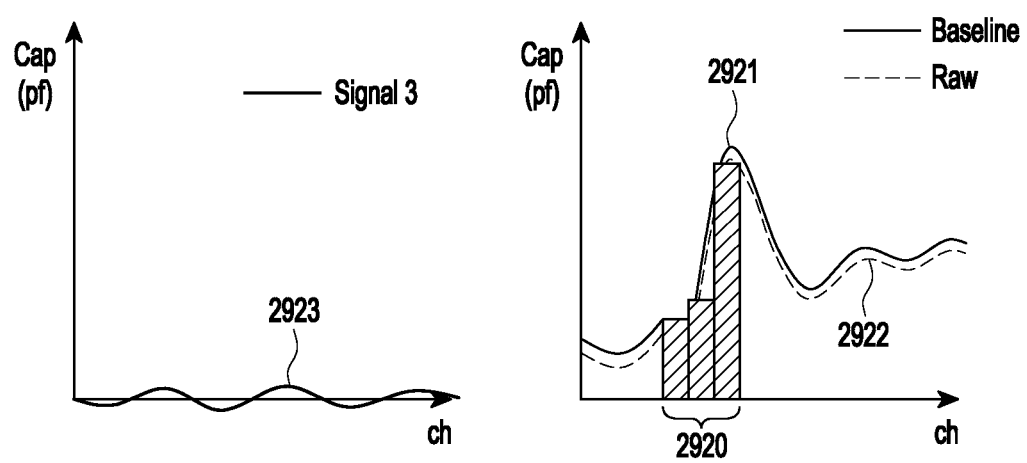
FIG. 29B illustrates graphs for identifying validity or non-validity based on characteristics of a baseline, according to an embodiment.

FIG. 29A is a flowchart illustrating a method of operating an electronic device, according to an embodiment. FIG. 29B illustrates a graph for identifying validity based on characteristics of a baseline, according to an embodiment.

Referring to FIGS. 29A and 29B, the touch sensor IC 253 stores a current baseline in step 2901. For example, the touch sensor IC 253 may store existing touch sensing data as the current baseline.

In step 2903, the touch sensor IC 253 identifies a baseline characteristic. The baseline characteristic may be, but is not limited to, deviation of data for each node.

In step 2905, the touch sensor IC 253 identifies whether the baseline characteristic is different from a pre-stored characteristic. For example, as illustrated in FIG. 29B, the touch sensor IC 253 may obtain touch sensing data by using raw data 2922 and a baseline 2921. The touch sensor IC 253 may identify a difference 2923 between the raw data 2922 and the baseline 2921 and identify a touch point based on the difference 2923. However, when there is an error in the baseline 2921, even though a touch occurs at a specific node 2920 in the raw data 2922, the corresponding touch may not be detected. The touch sensor IC 253 may identify that the baseline 2921 is to be reset based on a value at the specific node 2920 of the baseline 2921 being greater than a value at another node.

When the baseline is not to be reset in step 2905, the touch sensor IC 253 maintains the current baseline in step 2907. When the baseline is to be reset in step 2905, the touch sensor IC 253 resets the baseline in step 2909. For example, the touch sensor IC 253 may reset the baseline to a baseline identified at a time when the touch did not occur or a baseline identified in an ideal condition.

Figure 30A:
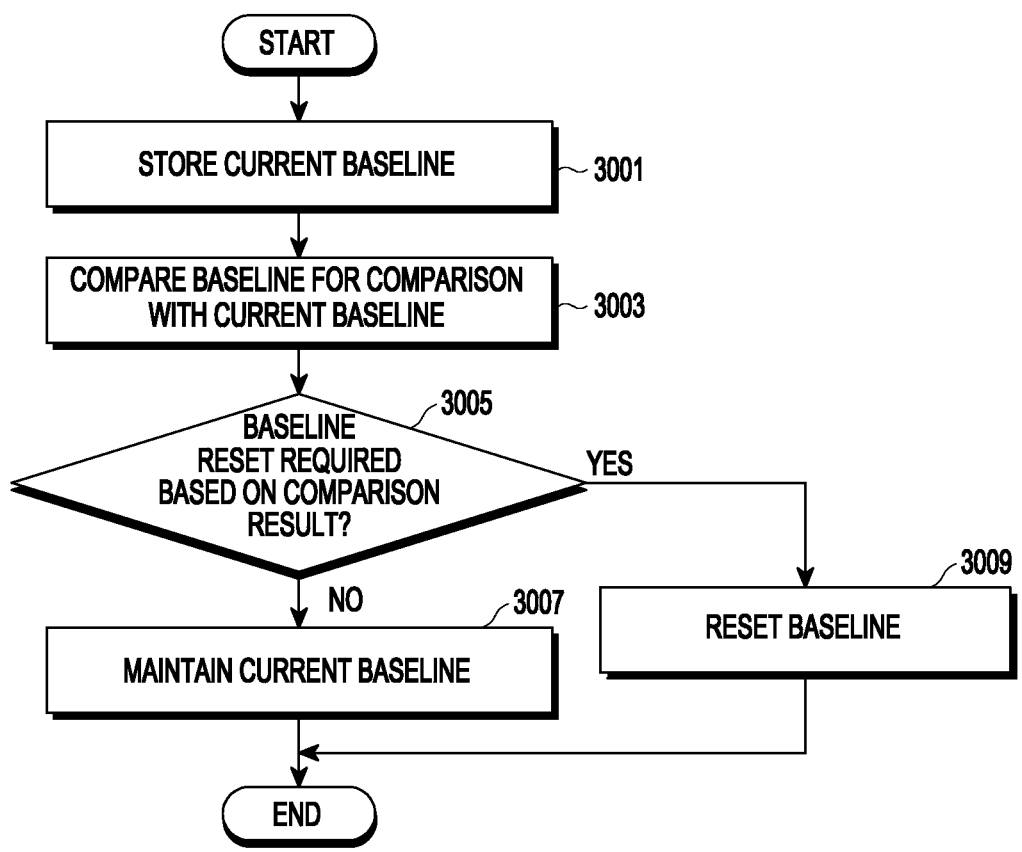
FIG. 30A is a flowchart illustrating a method of operating an electronic device, according to an embodiment.
Figure 30B:
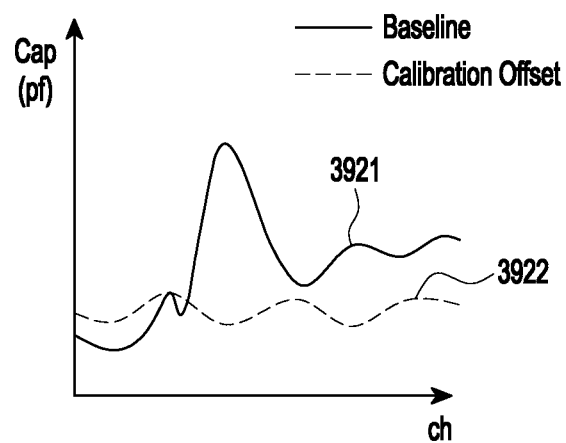
FIG. 30B illustrates a graph for identifying validity or non-validity based on a comparison between baselines, according to an embodiment.
Figure 30C:
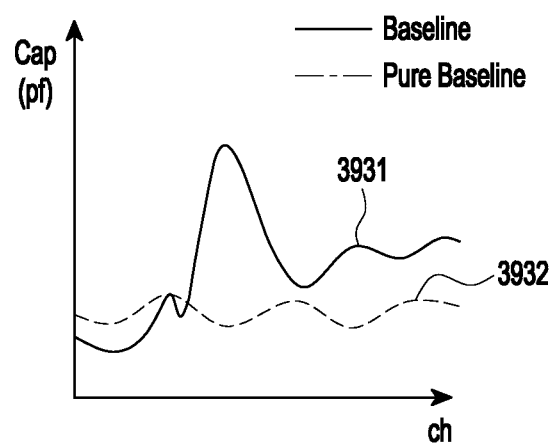
FIG. 30C illustrates a graph for identifying validity or non-validity based on a comparison between baselines, according to an embodiment.

FIG. 30A is a flowchart illustrating a method of operating an electronic device, according to an embodiment. FIGS. 30B and 30C illustrate graphs for identifying validity based on comparisons between baselines, according to an embodiment.

Referring to FIGS. 30A to 30C, the touch sensor IC 253 stores a current baseline in step 3001. For example, the touch sensor IC 253 may store existing touch sensing data as the current baseline.

In step 3003, the touch sensor IC 253 compares a baseline for comparison with the current baseline. For example, the touch sensor IC 253 may compare an ideal baseline 2922 corresponding to a case in which a calibration offset is applied with a current baseline 2921, as illustrated in FIG. 30B. Alternatively, the touch sensor IC 253 may compare a pre-stored ideal baseline 2932 with a current baseline 2931, as illustrated in FIG. 30C. The ideal baseline 2932 may be identified and stored, e.g., when no touch has occurred, or may be prestored during product manufacturing.

In step 3005, the touch sensor IC 253 identifies whether a baseline reset is required based on the comparison result. For example, when the difference between the current baseline and the baseline for comparison is greater than or equal to a threshold, the touch sensor IC 253 may identify that the baseline reset is required.

When the baseline reset is not required in step 3005, the touch sensor IC 253 maintains the current baseline in step 3007. When the baseline reset is required in step 3005, the touch sensor IC 253 resets the baseline in step 3009. For example, the touch sensor IC 253 may reset the baseline to a baseline identified at a time when a touch did not occur or a baseline identified in an ideal condition.

Figure 31:
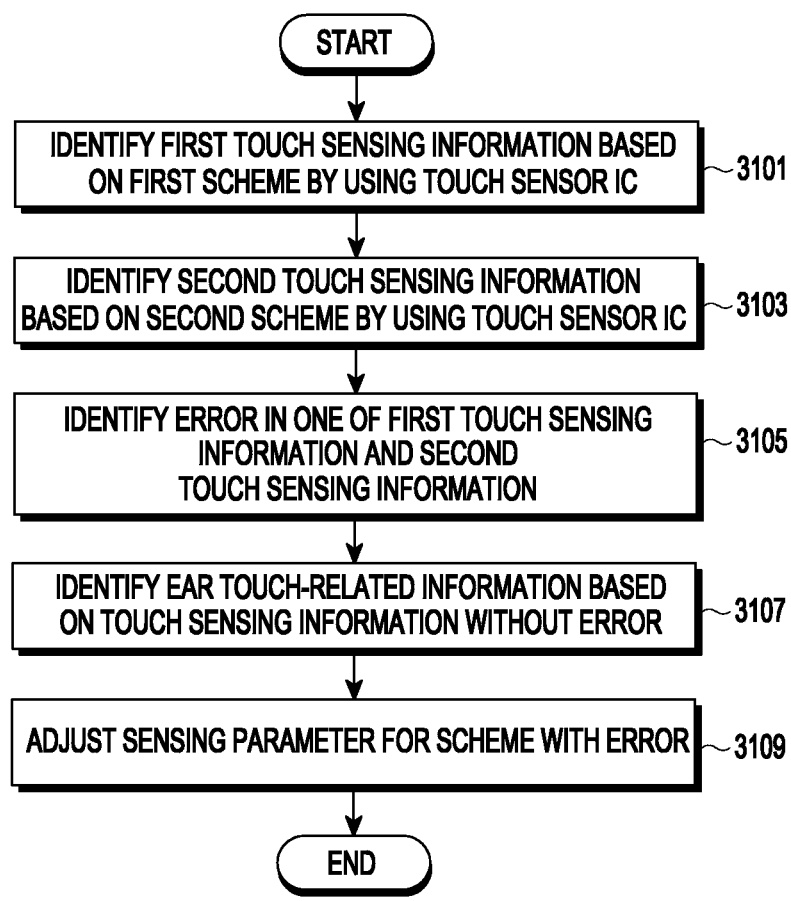
FIG. 31 is a flowchart illustrating a method of operating an electronic device, according to an embodiment.
Figure 32:
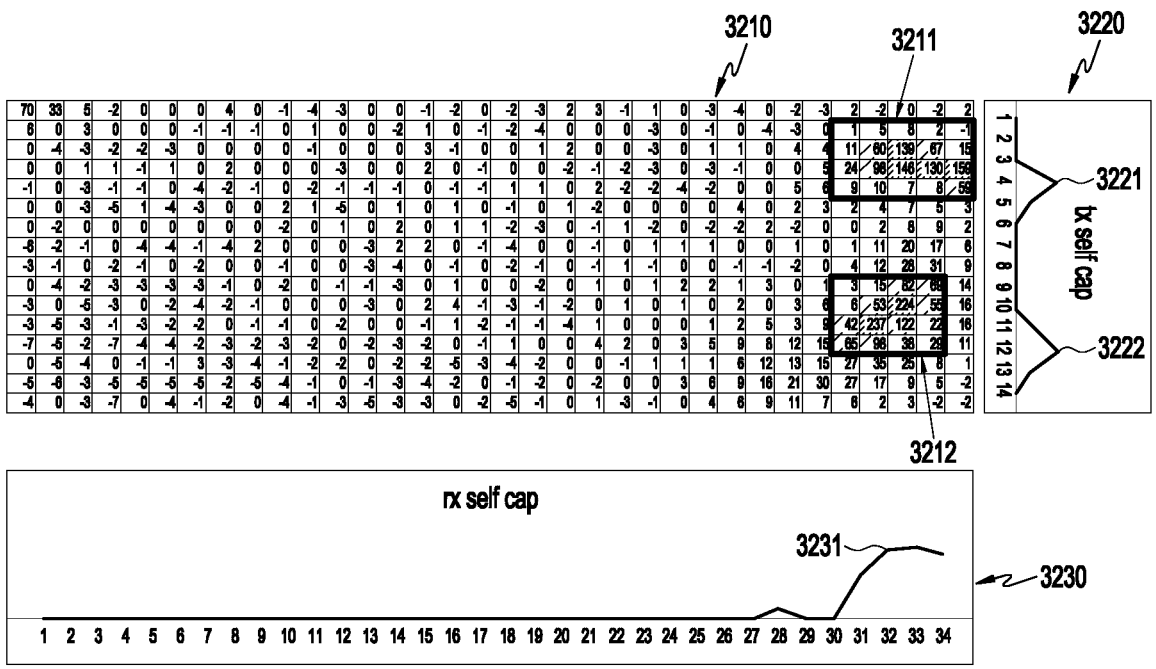
FIG. 32 illustrates touch sensing based on touch sensing information.
Figure 32:
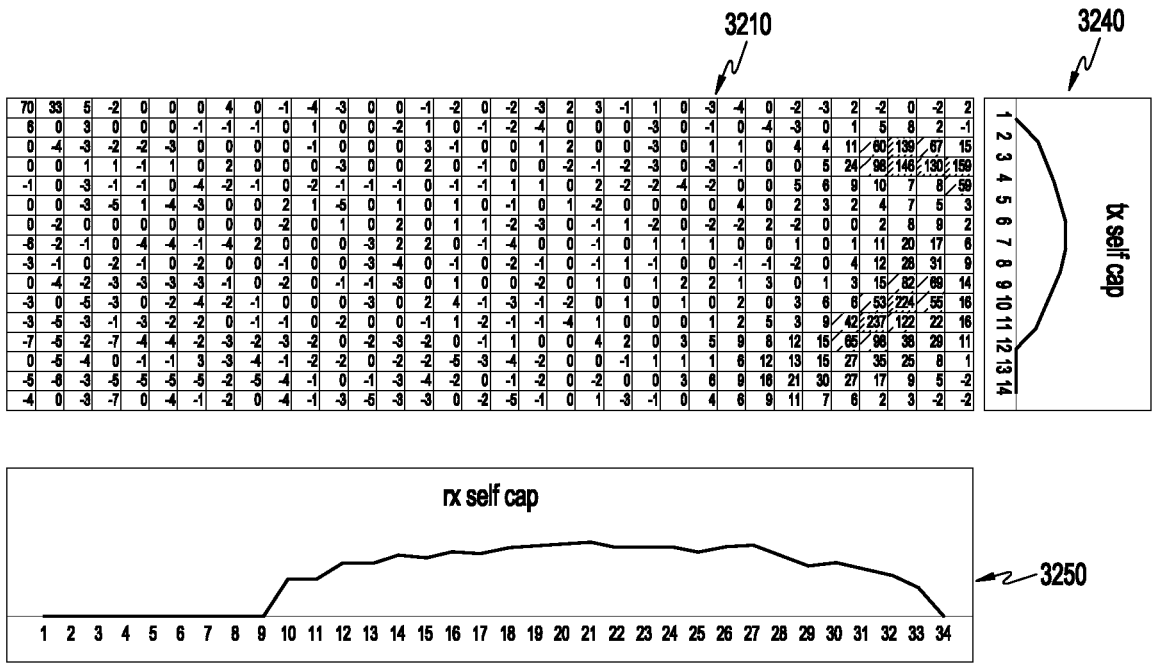
Figure 33:
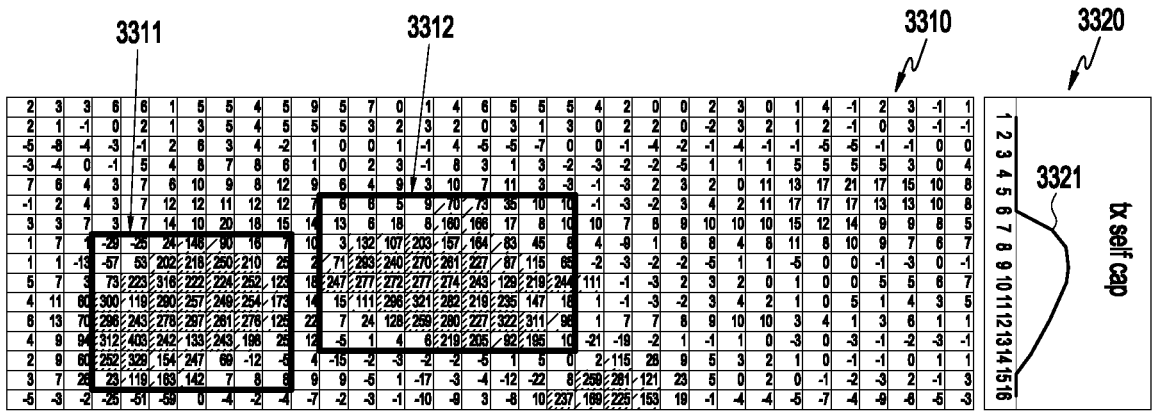
FIG. 33 illustrates touch sensing based on touch sensing information.
Figure 33:
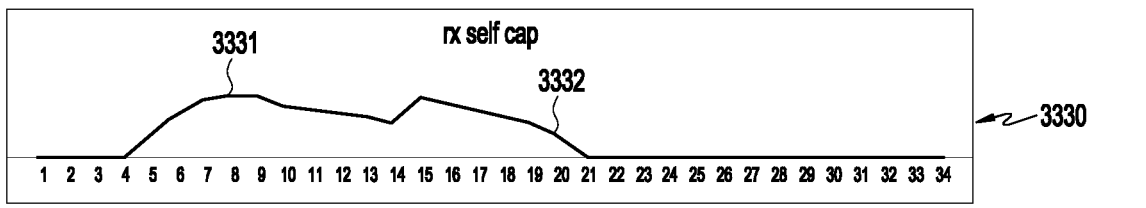
Figure 33:
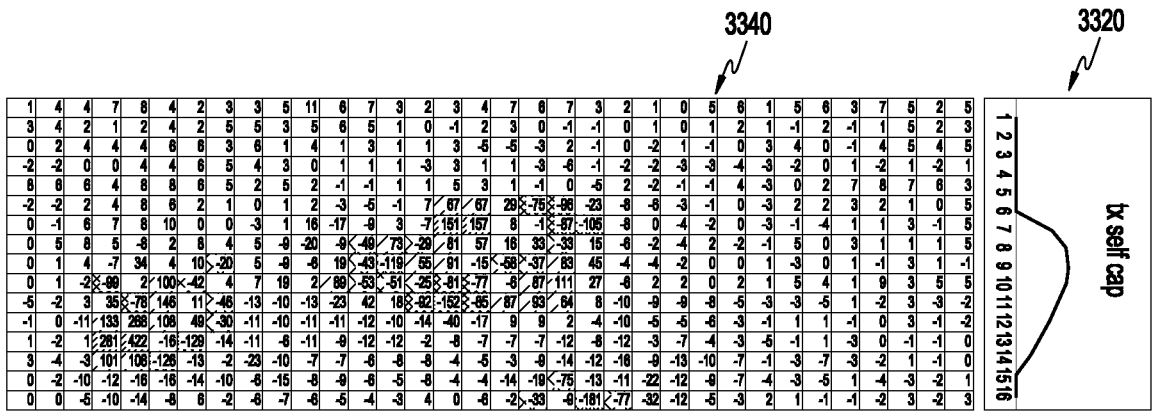
Figure 33:
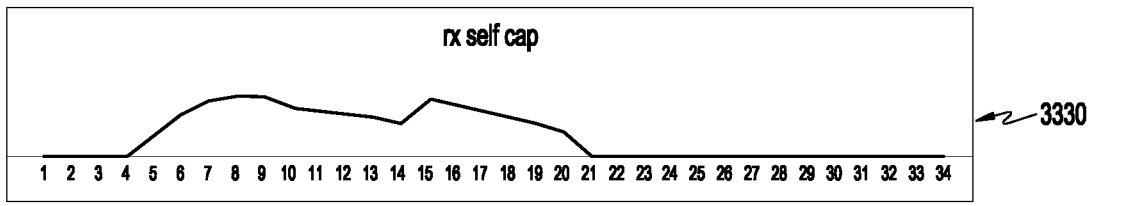

FIG. 31 is a flowchart illustrating a method of operating an electronic device, according to an embodiment. FIGS. 32 and 33 illustrate touch sensing based on touch sensing information, according to an embodiment.

Referring to FIGS. 31 to 33, in step 3101, the electronic device 101 uses the touch sensor IC 253 to identify first touch sensing information based on a first scheme.

In step 3103, the electronic device 101 identifies second touch sensing information based on a second scheme by using the touch sensor IC 253. For example, the electronic device 101 may identify at least one piece of first touch sensing information based on the mutual capacitance scheme, and may identify at least one piece of second touch sensing information based on the self-capacitance scheme.

In step 3105, the touch sensor IC 253 identifies that there is an error in one of the first touch sensing information and the second touch sensing information. For example, although a touch may be sensed based on the mutual capacitance scheme, a touch may not be sensed based on the self-capacitance scheme. This may be an important factor when it is identified continuously whether to maintain a proximity state and a malfunction is controlled. This is because there is a possibility that detected capacitance may be distorted due to a change in the temperature of the electronic device 101 caused by a call for a long time, moisture (sweat or cosmetics), grip, etc.

In step 3107, the touch sensor IC 253 identifies ear touch-related information based on touch sensing information without an error.

In step 3109, the touch sensor IC 253 adjusts a sensing parameter for an error-having scheme, e.g., a filtering condition.

Referring to FIG. 32, the touch sensor IC 253 may obtain first touch sensing data 3210 based on the mutual capacitance scheme, and second touch sensing data 3220 and 3230 based on the self-capacitance scheme. In a normal case, the positions of nodes 3211 and 3212 of data exceeding a threshold in the first touch sensing data 3210 may correspond to the positions of channels 3221, 3222, and 3231 of data exceeding the threshold in the second touch sensing data 3220 and 3230. However, when a temperature change occurs due to long-time contact, a touch may not be sensed in second touch sensing data 3240 and 3250. In this case, the touch sensor IC 253 may identify a touch by using only the first touch sensing data 3210 based on the mutual capacitance scheme and adjust a filtering threshold of the self-capacitance scheme.

Referring to FIG. 33, the touch sensor IC 253 may obtain first touch sensing data 3310 based on the mutual capacitance scheme and second touch sensing data 3320 and 3330 based on the self-capacitance scheme. In a normal case, the positions of nodes 3311 and 3312 of data exceeding a threshold in the first touch sensing data 3310 may correspond to the positions of channels 3321, 3331 and 3332 of data exceeding the threshold in the second touch sensing data 3320 and 3330. However, when a humidity change occurs due to long-time contact, a touch may not be sensed in the first touch sensing data 3230. The touch sensor IC 253 may identify a touch by using only the second touch sensing data 3320 and 3330 based on the self-capacitance scheme and adjust a filtering threshold of the mutual capacitance scheme.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure as set forth herein may be implemented as software (e.g., the program 140)

including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the above-described embodiments, an electronic device may identify contact of a user's body part (e.g., the ear or cheek) through a touch circuit. Even though the electronic device does not include a proximity sensor, the electronic device may still sense an ear touch. Further, by not including the proximity sensor, an available area for a touch screen is maintained and display degradation may also be prevented.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
a display;
a touch circuit configured to detect a touch on the display;
a sensor module configured to sense a motion of the electronic device and a posture of the electronic device;
a processor; and
a memory,
wherein the touch circuit is further configured to:
obtain touch sensing information indicating a sensitivity of each of a plurality of nodes of the touch circuit, and
transmit the touch sensing information to the processor, and
wherein the memory stores instructions, which when executed, cause the processor to:
control the display to be in an on state, based on performing a call with an external electronic device,
identify information related to a touch of a user on the display, based on the touch sensing information received from the touch circuit, while the call is performed with the external electronic device,
obtain information related to the motion and the posture of the electronic device using the sensor module,
determine whether to switch the display from the on state to an off state, based on the information related to the touch, the motion and the posture, while the call is performed with the external electronic device, and
based on determining to switch the display from the on state to the off state, control the display to be switched from the on state to the off state, while the call is performed with the external electronic device.

2. The electronic device of claim 1, wherein the instructions are configured to cause the processor to identify the information related to the touch indicating at least one of a plurality of pieces of touch type information corresponding respectively to a plurality of methods in which the user touches an ear on the electronic device.

3. The electronic device of claim 2, wherein the instructions are configured to cause the processor to identify the information related to the touch indicating a first touch type based on a number of nodes having sensitivities within a first sensitivity range being greater than or equal to a first threshold number among nodes included in a first area adjacent to a first side end of the touch circuit.

4. The electronic device of claim 3, wherein the instructions are configured to cause the processor to, based on identifying the information related to the touch indicating the first touch type, identify whether to switch the display to the off state based on whether the motion and the posture satisfy a specified condition corresponding to the first touch type.

5. The electronic device of claim 2, wherein the instructions are configured to cause the processor to identify at least one object from nodes included in a second area adjacent to a first side end of the touch circuit, and identify the information related to the touch indicating a second touch type based on at least one of a shape of each of the at least one object satisfying a specified shape condition or a number of the at least one object being greater than or equal to a threshold number corresponding to the second touch type.

6. The electronic device of claim 5, wherein the instructions are configured to cause the processor to, based on identifying the information related to the touch indicating the second touch type, identify whether to switch the display to the off state based on whether the motion or the posture satisfies a specified condition corresponding to the second touch type.

7. The electronic device of claim 2, wherein the instructions are configured to cause the processor to identify an object having an area larger than an area corresponding to a third touch type from the plurality of nodes of the touch circuit, track the identified object in time series, and identify the information related to the touch indicating the third touch type based on a motion of the identified object being identified as satisfying a motion condition corresponding to the third touch type as a result of the tracking.

8. The electronic device of claim 7, wherein the instructions are configured to cause the processor to identify whether to switch the display to the off state based on acquiring the information related to the touch indicating the third touch type.

9. The electronic device of claim 1, wherein the instructions are configured to cause the processor to identify the information related to the touch indicating whether an ear of the user has been touched, and control the display to switch from the on state to the off state, in response to identifying that the ear has been touched.

10. The electronic device of claim 1, wherein the touch circuit is further configured to transmit information indicating whether the touch is maintained to the processor, after the display is switched from the on state to the off state, and
wherein the instructions are further configured to cause the processor to identify whether to switch the display from the off state to the on state based on the information indicating whether the touch is maintained.

11. The electronic device of claim 1, wherein the touch circuit is configured to identify touch information indicating at least some of the plurality of nodes of the touch circuit based on the touch sensing information, and transmit the touch information along with the information related to the touch to the processor or transmit the touch information alone to the processor.

12. The electronic device of claim 1,
wherein the sensor module includes a first sensor and a second sensor,
wherein the first sensor is configured to sense motion information of the electronic device, and
wherein the second sensor is configured to sense posture information of the electronic device.

13. A method of operating an electronic device including a display, a touch circuit, a sensor module, and a processor, the method comprising:
obtaining, by the touch circuit, touch sensing information indicating an input sensitivity of each of a plurality of nodes of the touch circuit;
transmitting, by the touch circuit, the touch sensing information to the processor;
controlling, by the processor, the display to be in an on state, based on performing a call with an external electronic device;
identifying, by the processor, information related to a touch of a user on the electronic device based on the touch sensing information;
obtaining information related to a motion and a posture of the electronic device using the sensor module;
determining whether to switch the display from the on state to an off state, based on the information related to the touch, the motion and the posture, while the call is performed with the external electronic device, and
based on determining to switch the display from the on state to the off state, controlling, by the processor, the display to be switched from the on state to the off state, while the call is performed with the external electronic device.

14. The method of claim 13, wherein identifying the information related to the touch comprises identifying the information related to the touch indicating at least one of a plurality of pieces of touch type information corresponding respectively to a plurality of methods in which the user touches an ear on the electronic device.

15. The method of claim 14, wherein identifying the information related to the touch comprises identifying the information related to the touch indicating a first touch type based on a number of nodes having sensitivities within a first sensitivity range among nodes included in a first area adjacent to a first side end of the touch circuit being greater than or equal to a first threshold number.

16. The method of claim 15, wherein identifying whether to switch the display to the off state comprises, based on identifying the information related to the touch indicating the first touch type, identifying whether to switch the display to the off state based on whether the motion and the posture satisfy a specified condition corresponding to the first touch type.

17. The method of claim 13,
wherein the sensor module includes a first sensor and a second sensor,
wherein the first sensor is configured to sense motion information of the electronic device, and
wherein the second sensor is configured to sense posture information of the electronic device.

* * * * *